(12) United States Patent
Kawamura et al.

(10) Patent No.: US 9,441,160 B2
(45) Date of Patent: Sep. 13, 2016

(54) FLUOROBIPHENYL-CONTAINING COMPOSITION

(71) Applicant: DIC CORPORATION, Tokyo (JP)

(72) Inventors: Joji Kawamura, Kita-adachi-gun (JP); Makoto Negishi, Kita-adachi-gun (JP); Masahiro Niwa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/416,930

(22) PCT Filed: Dec. 27, 2012

(86) PCT No.: PCT/JP2012/083852
§ 371 (c)(1),
(2) Date: Jan. 23, 2015

(87) PCT Pub. No.: WO2014/102960
PCT Pub. Date: Jul. 3, 2014

(65) Prior Publication Data
US 2015/0291881 A1 Oct. 15, 2015

(51) Int. Cl.
*C09K 19/42* (2006.01)
*C09K 19/30* (2006.01)
(Continued)

(52) U.S. Cl.
CPC ......... *C09K 19/3066* (2013.01); *C09K 19/062* (2013.01); *C09K 19/063* (2013.01);
(Continued)

(58) Field of Classification Search
None
See application file for complete search history.

(56) References Cited

U.S. PATENT DOCUMENTS

2003/0197154 A1* 10/2003 Manabe ................ C09K 19/12
252/299.63
2003/0222244 A1 12/2003 Torii et al.
(Continued)

FOREIGN PATENT DOCUMENTS

JP 10-504032 A 4/1998
JP 2003-518154 A 6/2003
(Continued)

OTHER PUBLICATIONS

International Search Report dated Jan. 29, 2013, issued in corresponding application No. PCT/JP2012/083852.
(Continued)

*Primary Examiner* — Chanceity Robinson
(74) *Attorney, Agent, or Firm* — Westerman, Hattori, Daniels & Adrian, LLP

(57) ABSTRACT

There is provided a composition containing a compound represented by General Formula (i) and a compound represented by General Formula (ii)

[Chem. 1]

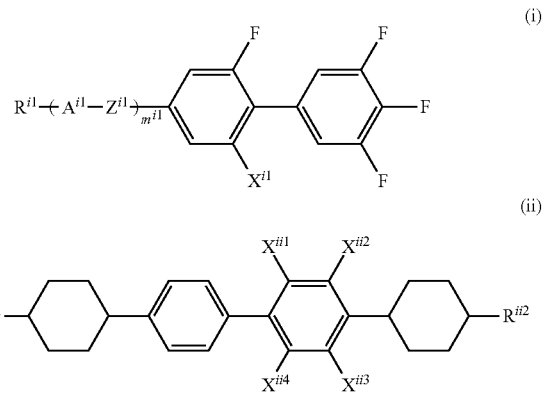

(where $R^{i1}$, $R^{ii1}$, and $R^{ii2}$ each independently represent an alkyl group having 1 to 8 carbon atoms; in the alkyl group, one —$CH_2$— group or two or more —$CH_2$— groups not adjoining each other are each independently optionally substituted with —CH=CH—, —C≡C—, —O—, —CO—, —COO—, or —OCO—; $m^{i1}$ represents 2; $A^{i1}$ represents a 1,4-cyclohexylene group or a 1,4-phenylene group of which a hydrogen atom is optionally substituted with a fluorine atom or a chlorine atom; multiple $A^{i1}$'s may be the same as or different from each other; $Z^{i1}$ represents a single bond, —CH=CH—, —C≡C—, —$CH_2CH_2$—, —COO—, or —OCO—; multiple $Z^{i1}$'s may be the same as or different from each other; and $X^{i1}$ and $X^{ii1}$ to $X^{ii4}$ each independently represent a hydrogen atom or a fluorine atom).

10 Claims, 1 Drawing Sheet

(51) Int. Cl.
*C09K 19/06* (2006.01)
*C09K 19/04* (2006.01)
*C09K 19/12* (2006.01)
*G02F 1/1333* (2006.01)
*G02F 1/1339* (2006.01)

(52) U.S. Cl.
CPC ............... *C09K2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3006* (2013.01); *C09K 2019/3009* (2013.01); *C09K 2019/3016* (2013.01); *C09K 2019/3019* (2013.01); *C09K 2019/3021* (2013.01); *C09K 2019/3071* (2013.01); *C09K 2019/3077* (2013.01); *C09K 2019/3078* (2013.01); *G02F 1/13394* (2013.01); *G02F 1/133377* (2013.01)

(56) References Cited

U.S. PATENT DOCUMENTS

| | | | |
|---|---|---|---|
| 2004/0026661 A1* | 2/2004 | Manabe | C09K 19/44 252/299.66 |
| 2004/0173774 A1* | 9/2004 | Heckmeier | C09K 19/3001 252/299.63 |
| 2006/0071195 A1 | 4/2006 | Tomi | |
| 2006/0278850 A1 | 12/2006 | Czanta et al. | |
| 2008/0088789 A1 | 4/2008 | Wittek et al. | |
| 2008/0128653 A1 | 6/2008 | Manabe et al. | |
| 2008/0260971 A1 | 10/2008 | Wittek et al. | |
| 2009/0230354 A1 | 9/2009 | Hirschmann et al. | |
| 2010/0302498 A1 | 12/2010 | Saito | |
| 2010/0308266 A1* | 12/2010 | Yanai | C09K 19/126 252/299.61 |
| 2010/0314582 A1 | 12/2010 | Wittek et al. | |
| 2010/0327226 A1 | 12/2010 | Czanta et al. | |
| 2011/0261312 A1* | 10/2011 | Saito | C09K 19/20 349/186 |
| 2012/0138852 A1 | 6/2012 | Yanai et al. | |
| 2013/0037745 A1 | 2/2013 | Hung et al. | |
| 2013/0207038 A1 | 8/2013 | Haensel et al. | |

FOREIGN PATENT DOCUMENTS

| | | |
|---|---|---|
| JP | 2003-301178 A | 10/2003 |
| JP | 2005-163047 A | 6/2005 |
| JP | 2005-220355 A | 8/2005 |
| JP | 2006-328399 A | 12/2006 |
| JP | 2007-526931 A | 9/2007 |
| JP | 2008-502754 A | 1/2008 |
| JP | 2008-95110 A | 4/2008 |
| JP | 2008-545804 A | 12/2008 |
| JP | 2009-191264 A | 8/2009 |
| JP | 2009-543908 A | 12/2009 |
| JP | 2010-6889 A | 1/2010 |
| JP | 2010-275390 A | 12/2010 |
| JP | 2011-16986 A | 1/2011 |
| JP | 2011-136998 A | 7/2011 |
| JP | 2012-1730 A | 1/2012 |
| JP | 2012-117062 A | 6/2012 |
| JP | 2012-121964 A | 6/2012 |
| JP | 2013-36038 A | 2/2013 |
| JP | 2013-166936 A | 8/2013 |
| TW | 2009-42600 A | 10/2009 |
| WO | 2004/035710 A1 | 4/2004 |
| WO | 2009/028368 A1 | 3/2009 |
| WO | 2010/024142 A1 | 3/2010 |

OTHER PUBLICATIONS

Written Opinion of the International Searching Authority dated Jan. 29, 2013, issued in corresponding application No. PCT/JP2012/083852.

\* cited by examiner

FLUOROBIPHENYL-CONTAINING COMPOSITION

TECHNICAL FIELD

The present invention particularly relates to a nematic liquid crystal composition which is useful as a liquid crystal display material and which has a positive dielectric anisotropy ($\Delta\Sigma$).

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and vertical alignment and IPS (in-plane switching) types involving use of a TFT (thin film transistor). Liquid crystal compositions used in such liquid crystal display devices need to satisfy the following requirements: being stable to external stimuli such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds in order to adjust, for example, the dielectric anisotropy ($\Delta\in$) and refractive index anisotropy ($\Delta n$) to be optimum to individual display devices.

A liquid crystal composition having a positive $\Delta\in$ is used in horizontal-alignment-type displays such as a TN type, an STN type, an IPS (in-plane switching) type, and an FFS (fringe-field-switching-mode liquid crystal display device). Another type of driving has been reported, in which the molecules of a liquid crystal composition having a positive $\Delta\in$ are vertically aligned in a state in which voltage is not applied, and then a horizontal electric field is applied for performing display. A demand for a liquid crystal composition having a positive $\Delta\in$ has therefore further increased. In these types of driving, there have been demands for driving at low voltage, a quick response, and a broad range of operating temperature. In other words, a liquid crystal composition having a positive $\Delta\in$ with a large absolute value, a low viscosity ($\eta$), and a high nematic phase-isotropic liquid phase transition temperature (Tni) has been demanded. In order to determine $\Delta n \times d$ that is a product of $\Delta n$ and a cell gap (d), the $\Delta n$ of a liquid crystal composition needs to be adjusted to be in a proper range on the basis of the cell gap. In addition, a quick response is important in liquid crystal display devices applied to television sets or other apparatuses, which generates a need for a liquid crystal composition having a small rotational viscosity ($\gamma 1$).

A liquid crystal composition containing a compound represented by Formula (A-1) and a compound represented by Formula (A-2) is disclosed as an example of liquid crystal compositions (see Patent Literature 1).

[Chem. 1]

(A-1)

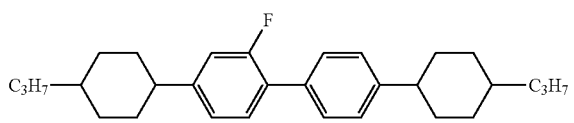

(A-2)

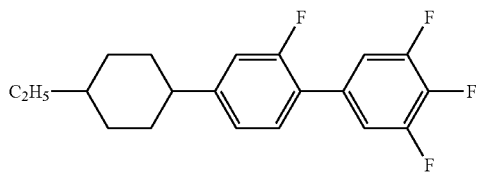

Furthermore, a liquid crystal composition containing a compound represented by Formula (A-3), a compound represented by Formula (A-4), and a compound represented by Formula (A-5) is disclosed (See Patent Literature 2).

[Chem. 2]

(A-3)

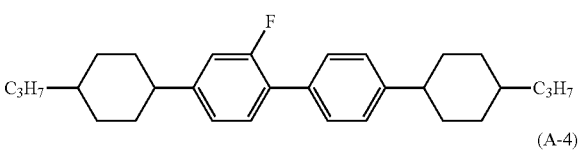

(A-4)

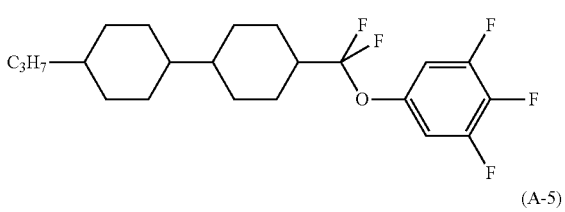

(A-5)

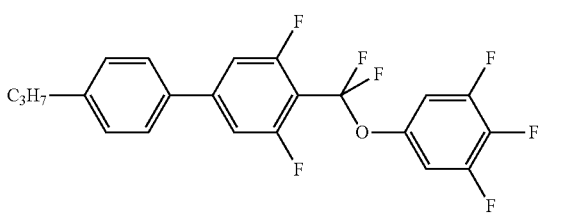

These liquid crystal compositions are characterized in that a liquid crystal compound having a positive $\Delta\in$ has three ring structures or has a —$CF_2O$— structure as a linking group.

Meanwhile, as liquid crystal display devices have come to be used in a broad range of applications, usage and manufacturing thereof have been greatly changed. In order to adapt to such changes, optimization of characteristics other than known basic physical properties has been needed. In particular, a VA type and an IPS type have become popular as liquid crystal display devices utilizing a liquid crystal composition, and these types of display devices having a very large size (e.g., 50 inches or lager) have also been practically used. An increase in the size of substrates has changed a technique for putting a liquid crystal composition between the substrates, and a one-drop-fill (ODF) technique has become mainstream in place of a typically employed vacuum injection technique. Dropping of a liquid crystal composition onto a substrate, however, generates droplet stains with the result that display quality is degraded, which has been problematic.

Furthermore, in a process for manufacturing a liquid crystal display device by an ODF technique, a liquid crystal material needs to be dropped in an amount optimum for the size of the liquid crystal display device. In the case where the amount of a liquid crystal material to be dropped largely varies from the optimum level, a predetermined balance between a refractive index and a driving electric field in a liquid crystal display device is disrupted, which causes defective display such as unevenness and defective contrast. In particular, the optimum amount of a liquid crystal material to be dropped is small in small-size liquid crystal display devices well used in smartphones which have become popular in recent years, and thus it is difficult even to control a variation from the optimum amount to be in a certain range.

Hence, in order to maintain a high yield of liquid crystal display devices, for instance, a liquid crystal composition needs to be less affected by a rapid pressure change and impact generated on dropping of the liquid crystal composition in a dropping apparatus and to be able to be stably and continuously dropped for a long time.

In terms of these circumstances, a liquid crystal composition which is used in active-matrix liquid crystal display devices driven by, for example, a TFT device needs to be developed in view of a manufacturing process of liquid crystal display devices as well as the following requirements: to maintain properties and performances needed for liquid crystal display devices, such as enabling quick response, and to have traditionally important properties such as high specific resistance, a high voltage holding ratio, and stability to external stimuli such as light and heat.

CITATION LIST

Patent Literature

PTL 1: Japanese Unexamined Patent Application Publication (Translation of PCT Application) No. 10-504032
PTL 2: Japanese Unexamined Patent Application Publication No. 2010-6889

SUMMARY OF INVENTION

Technical Problem

It is an object of the present invention to provide a composition having a positive $\Delta\in$ as a physical property inherent in liquid crystal compositions as well as stability to heat and light.

Solution to Problem

The inventor has studied a variety of compounds and found that a combination of specific compounds enables the above-mentioned object to be achieved, thereby accomplishing the present invention.

In particular, an aspect of the present invention provides a composition containing a compound represented by General Formula (i) and a compound represented by General Formula (ii).

[Chem. 3]

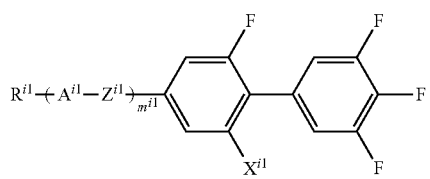

(i)

-continued

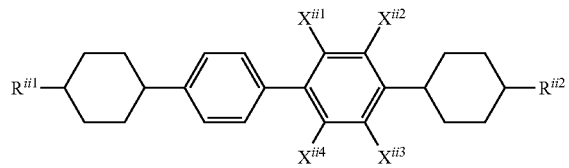

(ii)

(in the formulae, $R^{i1}$, $R^{ii1}$, and $R^{ii2}$ each independently represent an alkyl group having 1 to 8 carbon atoms; in the alkyl group, one —$CH_2$— group or two or more —$CH_2$— groups not adjoining each other are each independently optionally substituted with —CH=CH—, —C≡C—, —O—, —CO—, —COO—, or —OCO—; $m^{i1}$ represents 2; $A^{i1}$ represents a 1,4-cyclohexylene group or a 1,4-phenylene group of which a hydrogen atom is optionally substituted with a fluorine atom or a chlorine atom; multiple $A^{i1}$'s are the same as or different from each other; $Z^{i1}$ represents a single bond, —CH=CH—, —C≡C—, —$CH_2CH_2$—, —COO—, or —OCO—; multiple $Z^{i1}$'s are the same as or different from each other; and $X^{i1}$ and $X^{ii1}$ to $X^{ii4}$ each independently represent a hydrogen atom or a fluorine atom)

Advantageous Effects of Invention

The composition of the present invention can be well practically applied to products because it can have a small viscosity, exhibits a stable nematic phase at low temperature, and undergoes significantly small changes of specific resistance and a voltage holding ratio after being heated and irradiated with UV; in addition, liquid crystal display devices using this composition, such as a TN type, can quickly respond. Since the properties of the composition are stable in a process for manufacturing liquid crystal display devices, defective display due to the manufacturing process is reduced, and high-yield production is enabled; hence, such a composition is very useful.

DESCRIPTION OF EMBODIMENTS

Figure 1:
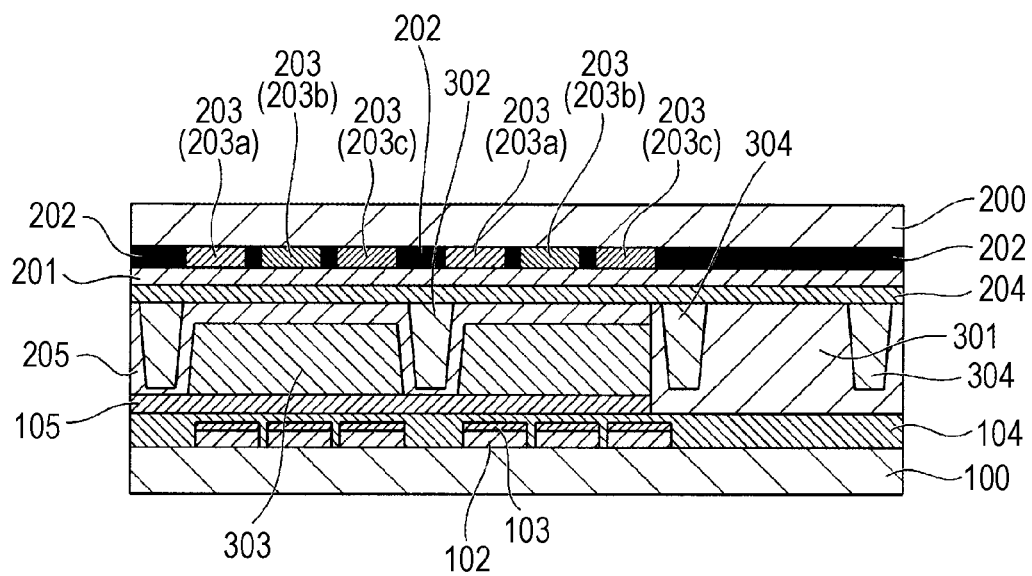
FIG. 1 is a cross-sectional view illustrating a liquid crystal display device according to the present invention; a substrate including members 100 to 105 is referred to as "backplane", and a substrate including members 200 to 205 is referred to as "frontplane".

The composition of the present invention contains a compound represented by General Formula (i) as a dielectrically positive component.

[Chem. 4]

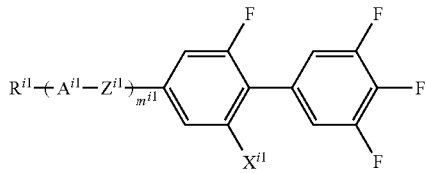

(i)

(in General Formula (i), $R^{i1}$ represents an alkyl group having 1 to 8 carbon atoms; in the alkyl group, one —CH$_2$— group or two or more —CH$_2$— groups not adjoining each other are each independently optionally substituted with —CH=CH—, —C≡C—, —O—, —CO—, —COO—, or —OCO—; $m^{i1}$ represents 2; $A^{i1}$ represents a 1,4-cyclohexylene group or a 1,4-phenylene group of which a hydrogen atom is optionally substituted with a fluorine atom or a chlorine atom; multiple $A^{i1}$'s may be the same as or different from each other; $Z^{i1}$ represents a single bond, —CH=CH—, —C≡C—, —CH$_2$CH$_2$—, —COO—, or —OCO—; multiple $Z^{i1}$'s may be the same as or different from each other; and $X^{i1}$ represents a hydrogen atom, a fluorine atom, or a chlorine atom)

In General Formula (i), $Z^{i1}$ represents a single bond, —CH=CH—, —C≡C—, —CH$_2$CH$_2$—, —COO—, or —OCO—; and preferably a single bond. $A^{i1}$ represents a 1,4-cyclohexylene group or a 1,4-phenylene group of which a hydrogen atom is optionally substituted with a fluorine atom or a chlorine atom, and preferably a 1,4-cyclohexylene group or a 1,4-phenylene group; in terms of solubility, a 1,4-cyclohexylene group is more preferably employed. The 1,4-cyclohexylene group is herein preferably a trans-1,4-cyclohexylene group.

$R^{i1}$ is preferably a linear alkyl group having 1 to 8 carbon atoms or a linear alkenyl group having 1 to 8 carbon atoms; more preferably a linear alkyl group having 1 to 5 carbon atoms or a linear alkenyl group having 1 to 5 carbon atoms; and especially preferably a methyl group, an ethyl group, a propyl group, a butyl group, a pentyl group, or any of the following structures.

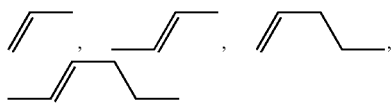

(in each of the formulae, the right end of the structure is bonded to the ring structure)

$R^{i1}$ is preferably an alkenyl group in terms of an improvement in a response speed or an alkyl group in terms of the reliability of a voltage holding ratio or another property of a liquid crystal composition.

$X^{i1}$ is preferably a hydrogen atom or a fluorine atom; in terms of compatibility with another compound (in order to prevent the precipitation of crystals or the occurrence of separation when a liquid crystal composition is cooled to low temperature), a hydrogen atom is preferred; in terms of a decrease in Δ∈, a fluorine atom is preferred.

Multiple $A^{i1}$'s may be the same as or different from each other and is preferably the same as each other.

In particular, the compound represented by General Formula (i) is preferably a compound represented by General Formula (i-1) or a compound represented by General Formula (i-2).

[Chem. 6]

(i-1)

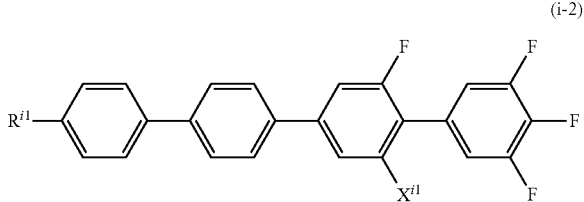

-continued (i-2)

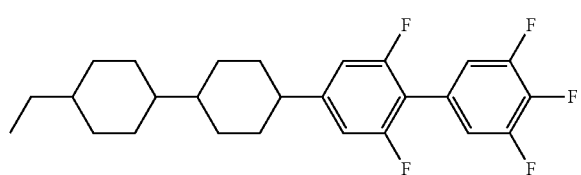

(in each of the formulae, $R^{i1}$ has the same meaning as $R^{i1}$ in General Formula (i), and $X^{i1}$ has the same meaning as $X^{i1}$ in General Formula (i))

In terms of compatibility with another compound, the compound represented by General Formula (i-1) is preferred; in terms of an enhancement in Δn, the compound represented by General Formula (i-2) is preferred.

Examples of the compound represented by General Formula (i-1) include the following compounds.

[Chem. 7]

(i-1.1)

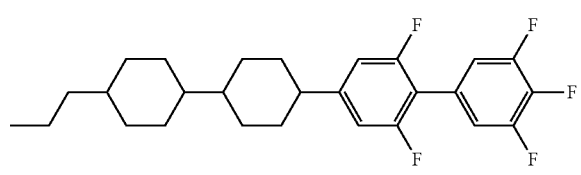

(i-1.2)

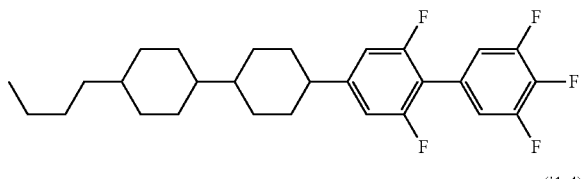

(i-1.3)

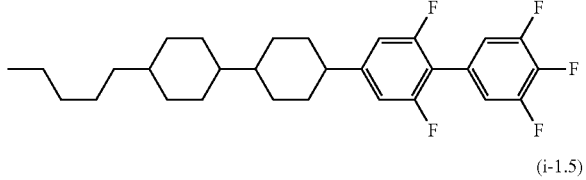

(i1.4)

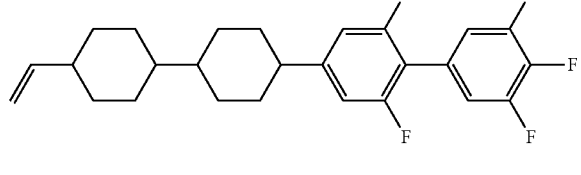

(i-1.5)

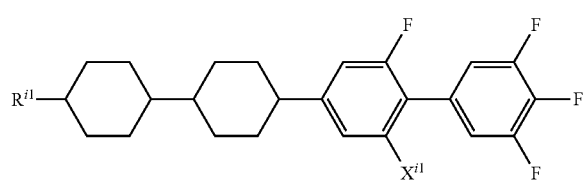

(i-1.6)
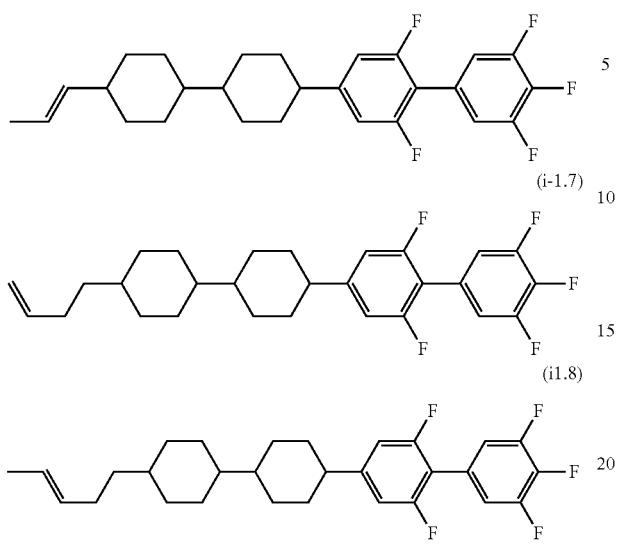
(i-1.7)
(i1.8)
[Chem. 8]
(i-1.9)
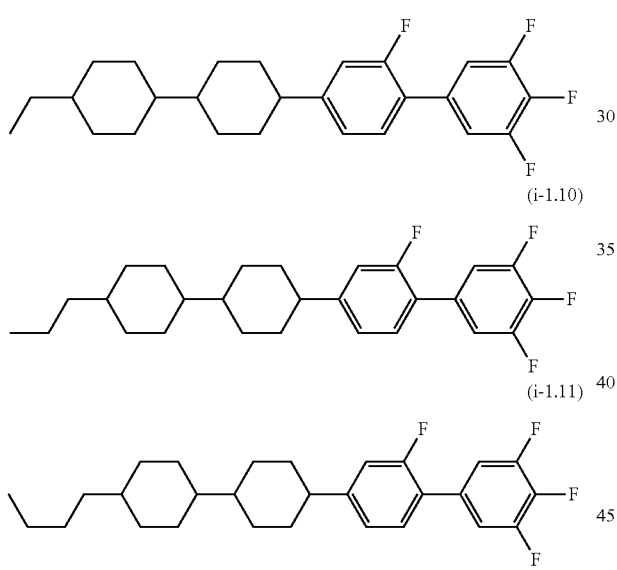
(i-1.10)
(i-1.11)
(i1.12)
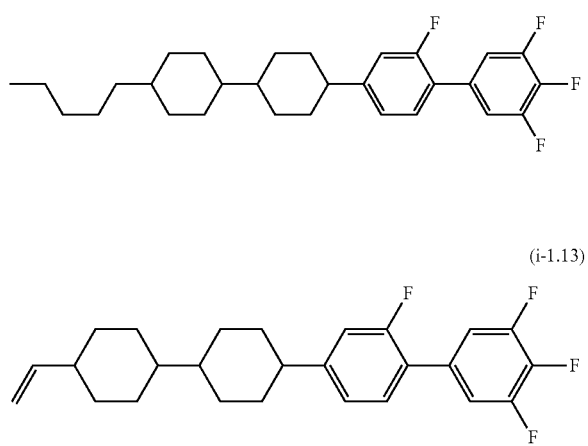
(i-1.13)
(i-1.14)
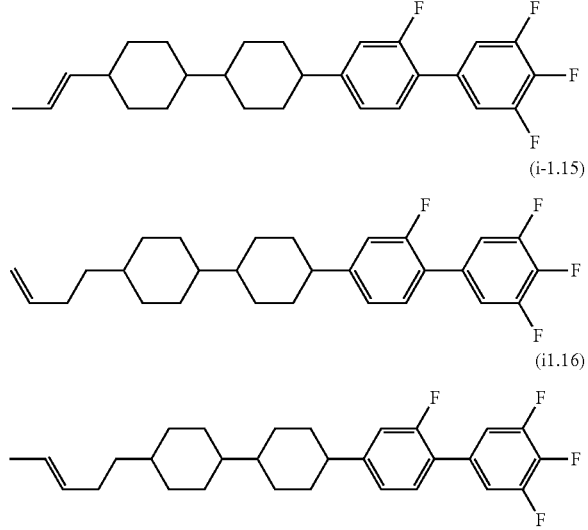
(i-1.15)
(i1.16)
Examples of the compound represented by General Formula (i-2) include the following compounds.
[Chem. 9]
(i-2.1)
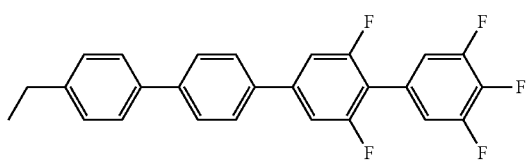
(i-2.2)
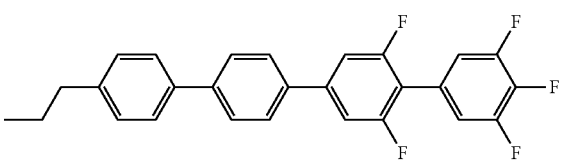
(i-2.3)
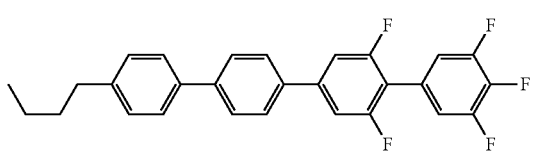
(i-2.4)
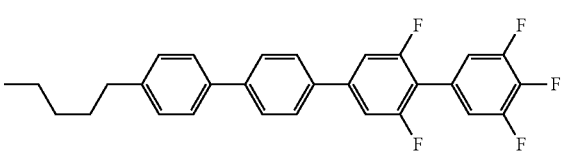

-continued (i-2.5)
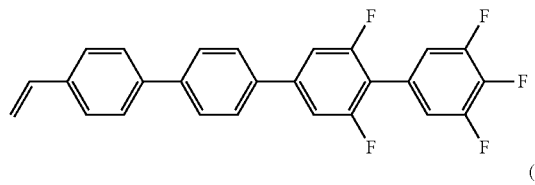

(i-2.6)
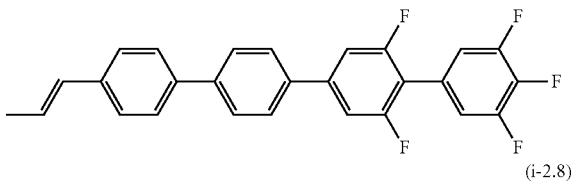

(i-2.7)
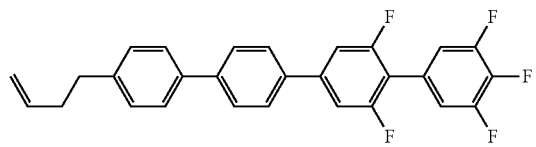

(i-2.8)
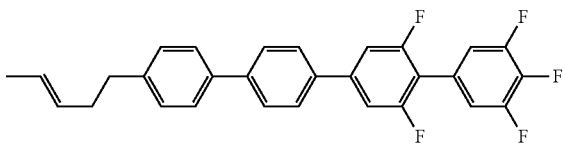

[Chem. 10]

(i-2.9)
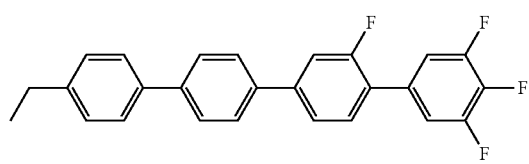

(i-2.10)
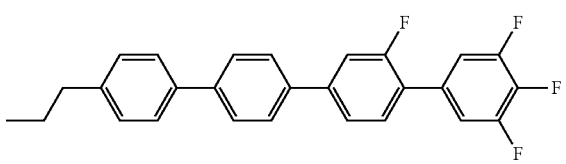

(i-2.11)
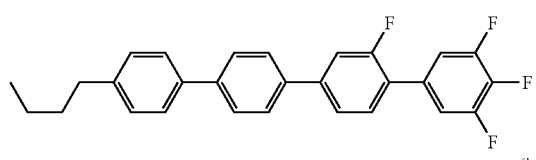

(i-2.12)
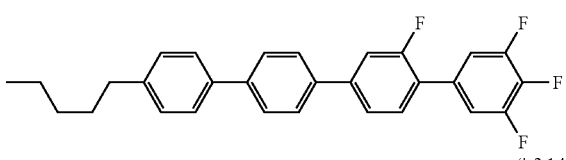

(i-2.13)
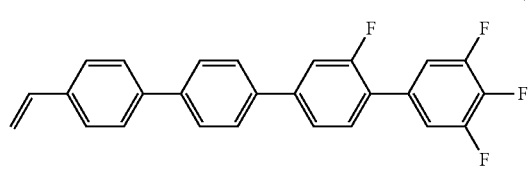

(i-2.14)
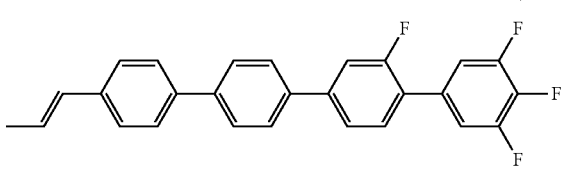

(i-2.15)
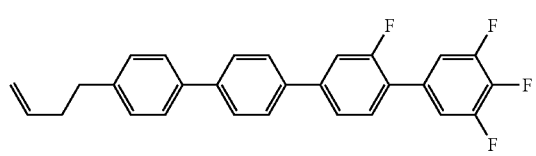

(i-2.16)
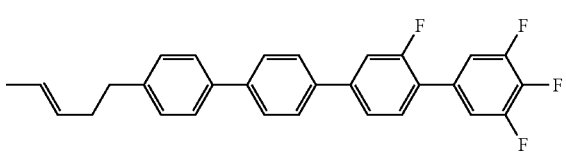

Among these compounds, the compounds represented by Formulae (i-1.10) and (i-2.10) are preferred.

In the composition of the present invention, a compound represented by General Formula (i) can be used alone; however, in terms of compatibility with another compound, two or more compounds represented by General Formula (i) are preferably used. It is preferred that two to five compounds represented by General Formula (i-1) be used, it is preferred that two to five compounds represented by General Formula (i-2) be used, and it is also preferred that a compound represented by General Formula (i-1) and a compound represented by General Formula (i-2) be used in combination. The lower limit of the amount of the compound represented by General Formula (i) is preferably 1 mass %, also preferably 2 mass %, also preferably 3 mass %, also preferably 5 mass %, and also preferably 7 mass % relative to the total amount of the composition of the present invention; and the upper limit thereof is preferably 20 mass %, also preferably 15 mass %, also preferably 13 mass %, and also preferably 10 mass % relative thereto.

The composition of the present invention contains a compound represented by General Formula (ii).

[Chem. 11]

(ii)
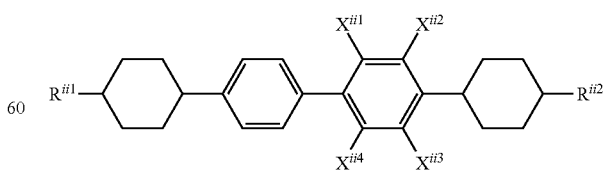

(in General Formula (ii), $R^{ii1}$ and $R^{ii2}$ each independently represent an alkyl group having 1 to 8 carton atoms; in the alkyl group, one —$CH_2$— group or two or more —$CH_2$— groups not adjoining each other are each independently optionally substituted with —CH=CH—, —C≡C—, —O—, —CO—, —COO—, or —OCO—; and $X^{ii1}$ to $X^{ii4}$ each independently represent a hydrogen atom or a fluorine atom)

In General Formula (ii), in terms of compatibility with another compound, it is preferred that one of $X^{ii1}$ to $X^{ii4}$ be a fluorine atom, and it is more preferred that only $X^{ii1}$ be a fluorine atom.

In General Formula (ii), $R^{ii1}$ and $R^{ii2}$ each have the same meaning as $R^{i1}$ in General Formula (i-1). $R^{ii1}$ and $R^{ii2}$ may be the same as or different from each other; they are preferably different from each other in terms of compatibility with another compound or preferably the same as each other in terms of easy production of the compound. The compound represented by General Formula (ii) is preferably any of compounds represented by the following formulae.

[Chem. 12]

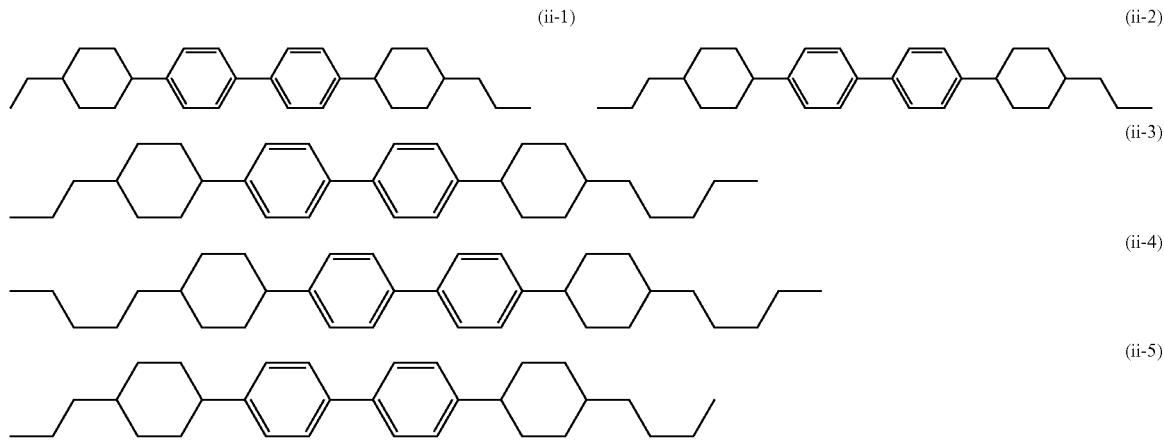

[Chem. 13]

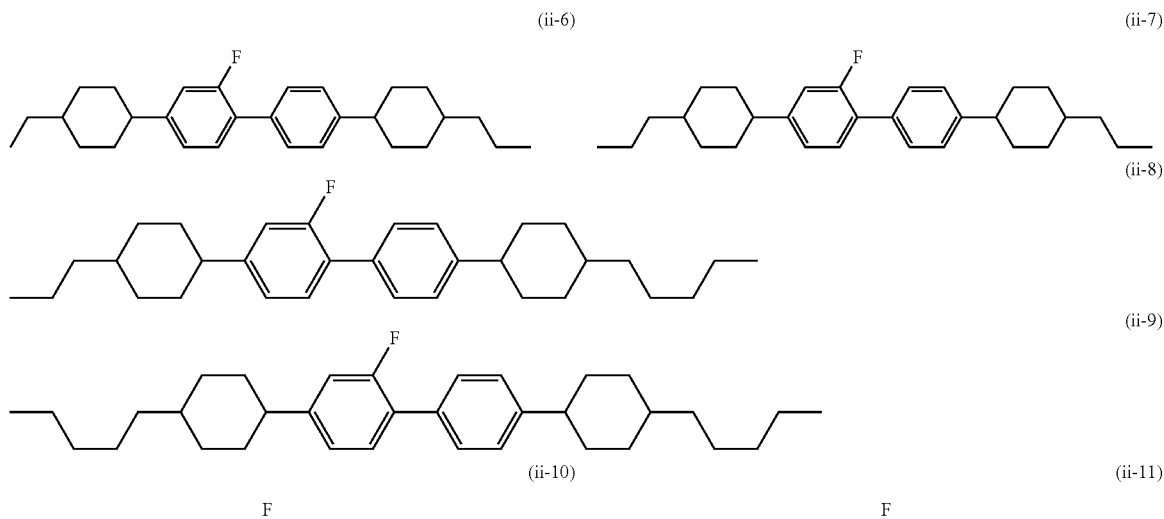

[Chem. 14]

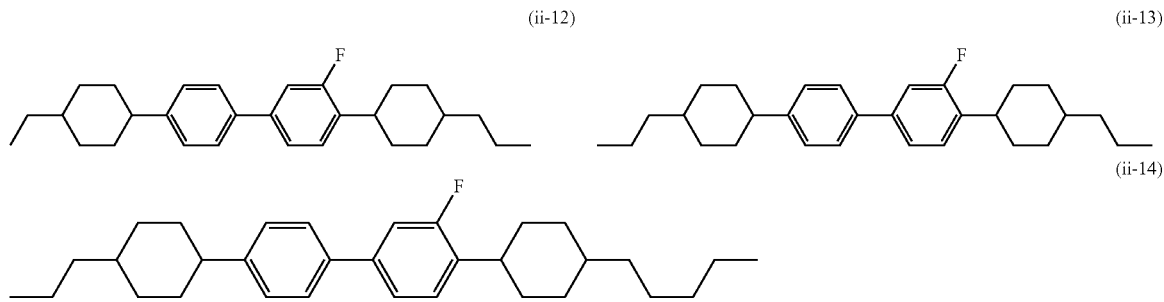

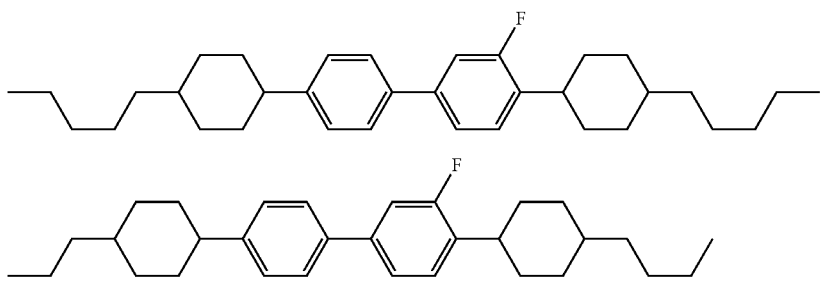

(ii-15)

(ii-16)

Among these compounds, the compounds represented by Formulae (ii-2), (ii-7), and (ii-13) are preferred.

In the composition of the present invention, the lower limit of the amount of the compound represented by General Formula (ii) is preferably 1 mass %, more preferably 2 mass %, further preferably 3 mass %, further preferably 4 mass %, and especially preferably 5 mass % relative to the total amount of the composition of the present invention. The upper limit thereof is preferably 20 mass %, more preferably 18 mass %, further preferably 15 mass %, further preferably 13 mass %, further preferably 10 mass %, and especially preferably 8 mass % relative thereto.

Only one compound represented by General Formula (ii) may be used; however, in terms of compatibility with another compound, it is preferred that two or more of the compounds be used, and it is more preferred that three or more of the compounds be used. Use of two or more of the compounds enables an increased content rate of the compound represented by General Formula (ii). In the case where two of the compounds are used in combination, the compound represented by Formula (ii-2) and the compound represented by Formula (ii-7) are preferably employed.

The lower limit of the total amount of the compound represented by General Formula (i) and the compound represented by General Formula (ii) is preferably 1 mass %, more preferably 2 mass %, further preferably 3 mass %, further preferably 4 mass %, and especially preferably 5 mass % relative to the total amount of the composition of the present invention. The upper limit thereof is preferably 20 mass % relative thereto. In particular, in the case where each of the compounds is used alone, the lower limit is preferably 1 mass %, more preferably 2 mass %, further preferably 3 mass %, and further preferably 4 mass %; the upper limit is preferably 20 mass %, more preferably 18 mass %, further preferably 15 mass %, further preferably 13 mass %, further preferably 10 mass %, and especially preferably 8 mass %. In the case where two or more compounds are selected from at least any of the compounds, the lower limit of the amount thereof is preferably 3 mass %, more preferably 5 mass %, further preferably 7 mass %, further preferably 10 mass %, and further preferably 13 mass %; the upper limit is preferably 20 mass %, more preferably 18 mass %, further preferably 17 mass %, and further preferably 16 mass %.

The liquid crystal composition of the present invention can also contain at least one compound represented by General Formula (L).

[Chem. 15]

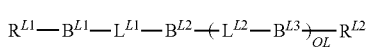

(L)

(in the formula, $R^{L1}$ and $R^{L2}$ each independently represent an alkyl group having 1 to 8 carbon atoms, and one —$CH_2$— group or two or more —$CH_2$— groups not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group (of which one —$CH_2$— group or two or more —$CH_2$— groups not adjoining each other are optionally substituted with —O—) and (b) a 1,4-phenylene group (of which one —CH= group or two or more —CH= groups not adjoining each other are optionally substituted with —N=), and the groups (a) and (b) are each independently optionally substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

in the case where OL is 2 or 3 and where $L^{L2}$ is multiple, the multiple $L^{L2}$'s may be the same as or different from each other; in the case where OL is 2 or 3 and where $B^{L3}$ is multiple, the multiple $B^{L3}$'s may be the same as or different from each other; and the compound represented by General Formula (L) excludes the compound represented by General Formula (ii))

Such compounds can be used in any combination; a proper combination of the compounds is determined on the basis of predetermined properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the liquid crystal composition of the present invention, the amount of the compound represented by General Formula (L) needs to be appropriately adjusted on the basis of desired properties such as solubility at low temperature, transition temperature, electric reliability, birefringence, process adaptability, droplet stains, screen burn-in, and dielectric anisotropy.

The preferred lower limit of the amount of the compound is, for example, 1% in an embodiment of the present invention, 10% in another embodiment of the present invention, 20% in another embodiment of the present invention, 30% in another embodiment of the present invention, 40% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, or 80% in another embodiment of the present invention relative to the total amount of the liquid crystal composition of the present invention.

The preferred upper limit of the amount of the compound is, for instance, 95% in an embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, or 25% in another embodiment of the present invention relative to the total amount of the liquid crystal composition of the present invention.

In the case where the liquid crystal composition of the present invention needs to have a viscosity kept at a low level to contribute to a high response speed, it is preferred that the above-mentioned lower limit be high and that the upper limit be high. In the case where the liquid crystal composition of the present invention needs to have a Tni kept at a high level to have a high temperature stability, it is preferred that the above-mentioned lower limit be high and that the upper limit be high. In order to increase dielectric anisotropy for keeping driving voltage at a low level, it is preferred that the above-mentioned lower limit be low and that the upper limit be low.

In the case where the ring structures bonded to $R^{L1}$ and $R^{L2}$ are phenyl groups (aromatics), $R^{L1}$ and $R^{L2}$ are each preferably a linear alkyl group having 1 to 5 carbon atoms, a linear alkoxy group having 1 to 4 (or more) carbon atoms, or an alkenyl group having 4 or 5 carbon atoms; in the case where the ring structures bonded to $R^{L1}$ and $R^{L2}$ are saturated rings such as cyclohexane, pyran, and dioxane, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

In the case where the liquid crystal composition needs to be chemically stable, it is preferred that the molecules of the compound represented by General Formula (L) be free from a chlorine atom.

The compound represented by General Formula (L) is, for example, preferably a compound selected from the group consisting of compounds represented by General Formula (I).

[Chem. 16]

$$R^{11}\text{-}A^{11}\text{-}A^{12}\text{-}R^{12} \qquad (I)$$

(in the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms; and $A^{11}$ and $A^{12}$ each independently represent a 1,4-cyclohexylene group, a 1,4-phenylene group, a 2-fluoro-1,4-phenylene group, or a 3-fluoro-1,4-phenylene group)

Such compounds can be used in any combination; a proper combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (I) needs to be appropriately adjusted on the basis of predetermined properties such as solubility at low temperature, transition temperature, electric reliability, birefringence, process adaptability, droplet stains, screen burn-in, and dielectric anisotropy.

The preferred lower limit of the amount of the compound is, for example, 3% in an embodiment of the present invention, 15% in another embodiment of the present invention, 18% in another embodiment of the present invention, 20% in another embodiment of the present invention, 29% in another embodiment of the present invention, 35% in another embodiment of the present invention, 42% in another embodiment of the present invention, 47% in another embodiment of the present invention, 53% in another embodiment of the present invention, 56% in another embodiment of the present invention, 60% in another embodiment of the present invention, or 65% in another embodiment of the present invention relative to the total amount of the liquid crystal composition of the present invention.

The preferred upper limit of the amount of the compound is, for example, 75% in an embodiment of the present invention, 65% in another embodiment of the present invention, 55% in another embodiment of the present invention, 50% in another embodiment of the present invention, 45% in another embodiment of the present invention, 40% in another embodiment of the present invention, 35% in another embodiment of the present invention, or 30% in another embodiment of the present invention relative to the total amount of the liquid crystal composition of the present invention.

In the case where the liquid crystal composition of the present invention needs to have a viscosity kept at a low level to contribute to a high response speed, it is preferred that the above-mentioned lower limit be high and that the upper limit be high. In the case where the liquid crystal composition of the present invention needs to have a Tni kept at a high level to have a good temperature stability, it is preferred that the above-mentioned lower limit be moderate and that the upper limit be moderate. In order to increase dielectric anisotropy for keeping driving voltage at a low level, it is preferred that the above-mentioned lower limit be low and that the upper limit be low.

The compound represented by General Formula (I) is preferably a compound selected from the group consisting of compounds represented by General Formula (I-1).

[Chem. 17]

(I-1)

(in the formula, $R^{11}$ and $R^{12}$ each independently represent an alkyl group having 1 to 5 carbon atoms, an alkoxy group having 1 to 5 carbon atoms, or an alkenyl group having 2 to 5 carbon atoms)

Such compounds can be used in any combination; a proper combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five or more of the compounds are used.

In the liquid crystal composition of the present invention, the amount of the compound represented by General Formula (I-1) needs to be appropriately adjusted on the basis of predetermined properties such as solubility at low temperature, transition temperature, electric reliability, birefringence, process adaptability, droplet stains, screen burn-in, and dielectric anisotropy.

The preferred lower limit of the amount of the compound is, for example, 3% in an embodiment of the present invention, 15% in another embodiment of the present invention, 18% in another embodiment of the present invention, 25% in another embodiment of the present invention, 29% in another embodiment of the present invention, 31% in another embodiment of the present invention, 35% in another embodiment of the present invention, 43% in another embodiment of the present invention, 47% in another embodiment of the present invention, 50% in another embodiment of the present invention, 53% in another embodiment of the present invention, or 56% in another embodiment of the present invention relative to the total amount of the liquid crystal composition of the present invention.

The preferred upper limit of the amount of the compound is, for instance, 70% in an embodiment of the present invention, 60% in another embodiment of the present invention, 50% in another embodiment of the present invention, 45% in another embodiment of the present invention, 40% in another embodiment of the present invention, 35% in another embodiment of the present invention, 30% in another embodiment of the present invention, or 26% in another embodiment of the present invention relative to the total amount of the liquid crystal composition of the present invention.

In the case where the liquid crystal composition of the present invention needs to have a viscosity kept at a low level to contribute to a high response speed, it is preferred that the above-mentioned lower limit be high and that the upper limit be high. In the case where the liquid crystal composition of the present invention needs to have a Tni kept at a high level to have a good temperature stability, it is preferred that the above-mentioned lower limit be moderate and that the upper limit be moderate. In order to increase dielectric anisotropy for keeping driving voltage at a low level, it is preferred that the above-mentioned lower limit be low and that the upper limit be low.

The compound represented by General Formula (I-1) is preferably a compound selected from the group consisting of compounds represented by General Formula (I-1-1).

[Chem. 18]

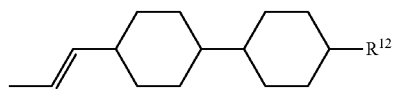

(I-1-1)

(in the formula, $R^{12}$ each independently represents an alkyl group having 1 to 5 carbon atoms, an alkenyl group having 2 to 5 carbon atoms, or an alkoxy group having 1 to 5 carbon atoms)

In the liquid crystal composition of the present invention, the amount of the compound represented by General Formula (I-1-1) needs to be appropriately adjusted on the basis of desired properties such as solubility at low temperature, transition temperature, electric reliability, birefringence, process adaptability, droplet stains, screen burn-in, and dielectric anisotropy. The preferred lower limit of the amount of the compound is, for example, 2% in an embodiment of the present invention, 4% in another embodiment of the present invention, 7% in another embodiment of the present invention, 11% in another embodiment of the present invention, 13% in another embodiment of the present invention, 15% in another embodiment of the present invention, 17% in another embodiment of the present invention, 20% in another embodiment of the present invention, 25% in another embodiment of the present invention, 30% in another embodiment of the present invention, 32% in another embodiment of the present invention, or 35% in another embodiment of the present invention relative to the total amount of the liquid crystal composition of the present invention.

The preferred upper limit of the amount of the compound is, for instance, 60% in an embodiment of the present invention, 50% in another embodiment of the present invention, 40% in another embodiment of the present invention, 35% in another embodiment of the present invention, 30% in another embodiment of the present invention, 25% in another embodiment of the present invention, 20% in another embodiment of the present invention, or 15% in another embodiment of the present invention relative to the total amount of the liquid crystal composition of the present invention.

The compound represented by General Formula (I-1-1) is preferably a compound selected from the group consisting of compounds represented by Formulae (1.1) to (1.3); among these, the compound represented by Formula (1.2) or (1.3) is preferably employed, and the compound represented by Formula (1.3) is especially preferably employed.

[Chem. 19]

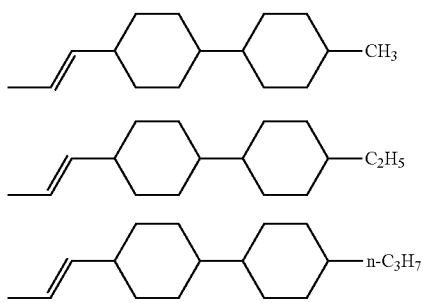

In the case where the compound represented by Formula (1.2) or (1.3) is used alone, the amount of the compound represented by Formula (1.2) is preferably large because it is effective in improving a response speed, and the amount of the compound represented by Formula (1.3) is preferably within the following ranges because it contributes to production of a liquid crystal composition which enables a quick response and which has high electric and optical reliabilities.

The amount of the compound represented by Formula (1.3) is preferably not less than 7 mass %, more preferably not less than 9 mass %, further preferably not less than 10 mass %, further preferably not less than 11 mass %, and especially preferably not less than 15 mass % relative to the total amount of the liquid crystal composition of the present invention. The amount is preferably up to 35 mass %, more preferably up to 25 mass %, and further preferably up to 20 mass %.

The compound represented by General Formula (I-1) is preferably a compound selected from the group consisting of compounds represented by General Formula (I-1-2).

[Chem. 20]

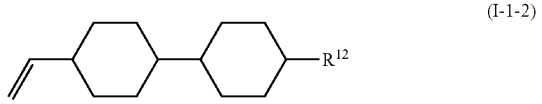

(in the formula, $R^{12}$ each independently represents an alkyl group having 1 to 5 carbon atoms, an alkoxy group having 1 to 5 carbon atoms, or an alkenyl group having 2 to 5 carbon atoms)

Such compounds can be used in any combination; a proper combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-1-2) needs to be appropriately adjusted on the basis of the intended properties such as solubility at low temperature, transition temperature, electric reliability, birefringence, process adaptability, droplet stains, screen burn-in, and dielectric anisotropy. The preferred lower limit of the amount of the compound is, for example, 7% in an embodiment of the present invention, 15% in another embodiment of the present invention, 18% in another embodiment of the present invention, 21% in another embodiment of the present invention, 24% in another embodiment of the present invention, 27% in another embodiment of the present invention, 30% in another embodiment of the present invention, 34% in another embodiment of the present invention, 37% in another embodiment of the present invention, 41% in another embodiment of the present invention, 47% in another embodiment of the present invention, or 50% in another embodiment of the present invention relative to the total amount of the liquid crystal composition of the present invention.

The preferred upper limit of the amount of the compound is, for instance, 60% in an embodiment of the present invention, 55% in another embodiment of the present invention, 45% in another embodiment of the present invention, 40% in another embodiment of the present invention, 35% in another embodiment of the present invention, 30% in another embodiment of the present invention, 25% in another embodiment of the present invention, or 20% in another embodiment of the present invention relative to the total amount of the liquid crystal composition of the present invention.

The compound represented by General Formula (I-1-2) is preferably a compound selected from the group consisting of compounds represented by Formulae (2.1) to (2.4); among these, any of the compounds represented by Formulae (2.2) to (2.4) is preferably employed. In particular, the compound represented by Formula (2.2) is preferred because it especially enhances the response speed of the liquid crystal composition of the present invention. If high Tni is needed rather than the response speed, it is preferred that the compound represented by Formula (2.3) or (2.4) be employed. In order to improve solubility at low temperature, it is preferred that the amount of each of the compounds represented by Formulae (2.3) and (2.4) be less than 30%.

[Chem. 21]

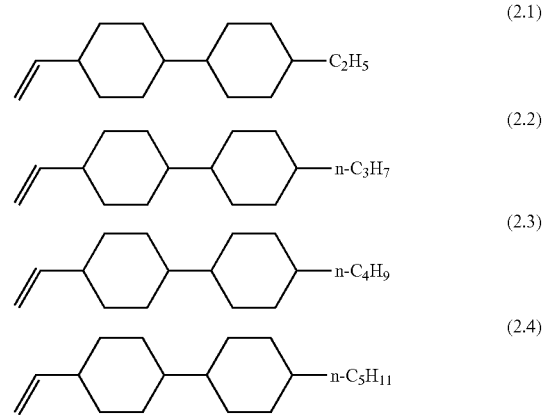

In the liquid crystal composition of the present invention, the amount of each of the compounds represented by Formulae (2.2) to (2.4) is preferably not less than 5 mass %, more preferably 10 mass %, further preferably not less than 14 mass %, further preferably not less than 17 mass %, further preferably not less than 19 mass %, further preferably not less than 22 mass %, further preferably not less than 25 mass %, further preferably not less than 27 mass %, and especially preferably not less than 30 mass % relative to the total amount of the liquid crystal composition of the present invention. The amount is preferably up to 55 mass %, more preferably up to 50 mass %, further preferably up to 45 mass %, and especially preferably up to 40 mass %.

The liquid crystal composition of the present invention can further contain a compound which is represented by Formula (2.5) and which has a structure similar to that of the compound represented by General Formula (I-1-2).

[Chem. 22]

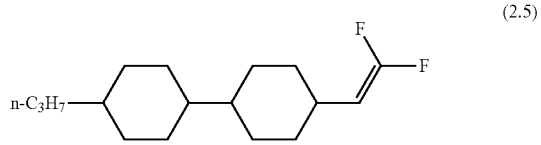

(2.5)

The amount of the compound represented by Formula (2.5) is preferably adjusted on the basis of desired properties such as solubility at low temperature, transition temperature, electric reliability, and birefringence; the amount is preferably not less than 11 mass %, more preferably not less than 15 mass %, further preferably not less than 23 mass %, further preferably not less than 26 mass %, and especially preferably not less than 28 mass % relative to the total amount of the liquid crystal composition of the present invention.

The compound represented by General Formula (I) is preferably a compound selected from the group consisting of compounds represented by General Formula (I-2).

[Chem. 23]

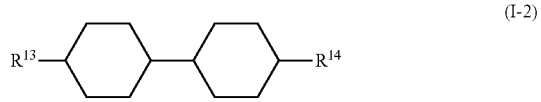

(I-2)

(in the formula, $R^{13}$ and $R^{14}$ each independently represent an alkyl group having 1 to 5 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-2) needs to be appropriately adjusted on the basis of the intended properties such as solubility at low temperature, transition temperature, electric reliability, birefringence, process adaptability, droplet stains, screen burn-in, and dielectric anisotropy. The preferred lower limit of the amount of the compound is, for example, 3% in an embodiment of the present invention, 4% in another embodiment of the present invention, 15% in another embodiment of the present invention, 25% in another embodiment of the present invention, 30% in another embodiment of the present invention, 35% in another embodiment of the present invention, 38% in another embodiment of the present invention, 40% in another embodiment of the present invention, 42% in another embodiment of the present invention, 45% in another embodiment of the present invention, 47% in another embodiment of the present invention, or 50% in another embodiment of the present invention relative to the total amount of the liquid crystal composition of the present invention.

The preferred upper limit of the amount of the compound is, for instance, 60% in an embodiment of the present invention, 55% in another embodiment of the present invention, 45% in another embodiment of the present invention, 40% in another embodiment of the present invention, 30% in another embodiment of the present invention, 20% in another embodiment of the present invention, 15% in another embodiment of the present invention, or 5% in another embodiment of the present invention relative to the total amount of the liquid crystal composition of the present invention. The compound represented by General Formula (I-2) is preferably a compound selected from the group consisting of compounds represented by Formulae (3.1) to (3.4); among these, the compound represented by Formula (3.1), (3.3), or (3.4) is preferably employed. In particular, the compound represented by Formula (3.2) is preferred because it especially enhances the response speed of the liquid crystal composition of the present invention. In the case where high Tni is needed rather than the response speed, it is preferred that the compound represented by Formula (3.3) or (3.4) be employed. In order to improve solubility at low temperature, it is preferred that the amount of each of the compounds represented by Formulae (3.3) and (3.4) be less than 20%.

The compound represented by General Formula (I-2) is preferably a compound selected from the group consisting of compounds represented by Formulae (3.1) to (3.4); among these, the compound represented by Formula (3.1), the compound represented by Formula (3.3), and/or the compound represented by Formula (3.4) are preferred.

[Chem. 24]

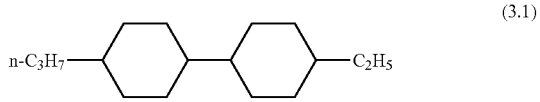

(3.1)

(3.2)

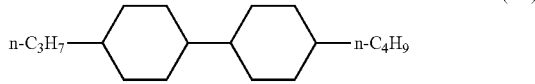

(3.3)

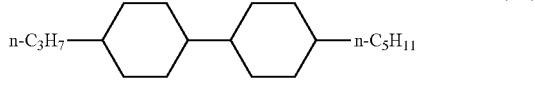

(3.4)

In the liquid crystal composition of the present invention, the amount of the compound represented by Formula (3.3) is preferably not less than 2 mass %, more preferably 3 mass %, more preferably not less than 4 mass %, further preferably not less than 10 mass %, further preferably not less than 12 mass %, further preferably not less than 14 mass %, further preferably not less than 16 mass %, further preferably not less than 20 mass %, further preferably not less than 23 mass %, further preferably not less than 26 mass %, and especially preferably not less than 30 mass % relative to the total amount of the liquid crystal composition of the present invention. The amount is preferably up to 40 mass %, more preferably up to 37 mass %, further preferably up to 34 mass %, and especially preferably up to 32 mass %.

The compound represented by General Formula (I) is preferably a compound selected from the group consisting of compounds represented by General Formula (I-3).

[Chem. 25]

(I-3)

(in the formula, $R^{13}$ represents an alkyl group having 1 to 5 carbon atoms, and $R^{15}$ represents an alkoxy group having 1 to 4 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-3) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount of the compound is, for example, 3% in an embodiment of the present invention, 4% in another embodiment of the present invention, 15% in another embodiment of the present invention, 25% in another embodiment of the present invention, 30% in another embodiment of the present invention, 35% in another embodiment of the present invention, 38% in another embodiment of the present invention, 40% in another embodiment of the present invention, 42% in another embodiment of the present invention, 45% in another embodiment of the present invention, 47% in another embodiment of the present invention, or 50% in another embodiment of the present invention relative to the total amount of the liquid crystal composition of the present invention.

The preferred upper limit of the amount of the compound is, for instance, 60% in an embodiment of the present invention, 55% in another embodiment of the present invention, 45% in another embodiment of the present invention, 40% in another embodiment of the present invention, 30% in another embodiment of the present invention, 20% in another embodiment of the present invention, 15% in another embodiment of the present invention, or 5% in another embodiment of the present invention relative to the total amount of the liquid crystal composition of the present invention.

In terms of solubility at low temperature, the amount is adjusted to be larger to produce a greater effect; in terms of response speed, the amount is adjusted to be smaller to produce a greater effect. In order to improve properties related to droplet stains and screen burn-in, the range of the amount is preferably adjusted to be intermediate.

The compound represented by General Formula (I-3) is preferably a compound selected from the group consisting of compounds represented by Formulae (4.1) to (4.3); among these, the compound represented by Formula (4.3) is preferably employed.

[Chem. 26]

(4.1)

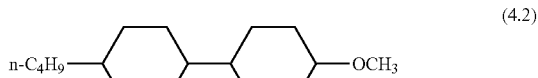

(4.2)

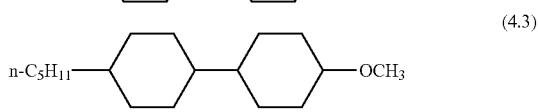

(4.3)

The amount of the compound represented by Formula (4.3) is preferably not less than 2 mass %, more preferably 4 mass %, further preferably not less than 6 mass %, further preferably not less than 8 mass %, further preferably not less than 10 mass %, further preferably not less than 12 mass %, further preferably not less than 14 mass %, further preferably not less than 16 mass %, further preferably not less than 18 mass %, further preferably not less than 20 mass %, and especially preferably not less than 22 mass % relative to the total amount of the liquid crystal composition of the present invention. The amount is preferably up to 30 mass %, more preferably up to 25 mass %, further preferably up to 24 mass %, and especially preferably up to 23 mass %.

The compound represented by General Formula (I) is preferably a compound selected from the group consisting of compounds represented by General Formula (I-4).

[Chem. 27]

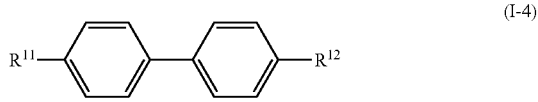

(I-4)

(in the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-4) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount of the compound is, for example, 3% in an embodiment of the present invention, 5% in another embodiment of the present invention, 6% in another embodiment of the present invention, 8% in another embodiment of the present invention, 10% in another embodiment of the present invention, 12% in another embodiment of the present invention, 15% in another embodiment of the present invention, 20% in another embodiment of the present invention, 25% in another embodiment of the present invention, 30% in another embodiment of the present invention, 35% in another embodiment of the present invention, or 40% in another embodiment of the present invention relative to the total amount of the liquid crystal composition of the present invention.

The preferred upper limit of the amount of the compound is, for instance, 50% in an embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, or 5% in another embodiment of the present invention relative to the total amount of the liquid crystal composition of the present invention.

In terms of an enhancement in birefringence, the amount is adjusted to be larger to produce a greater effect; in terms of high Tni, the amount is adjusted to be smaller to produce a greater effect. In order to improve properties related to droplet stains and screen burn-in, the range of the amount is preferably adjusted to be intermediate.

The compound represented by General Formula (I-4) is preferably a compound selected from the group consisting of compounds represented by Formulae (5.1) to (5.4); among these, any of the compounds represented by Formulae (5.2) to (5.4) is preferably employed.

[Chem. 28]

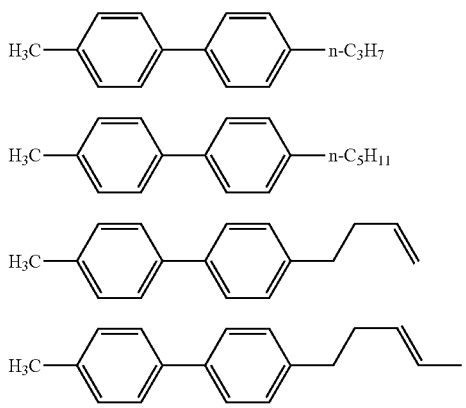

(5.1)

(5.2)

(5.3)

(5.4)

The amount of the compound represented by Formula (5.4) is preferably not less than 2 mass %, more preferably 4 mass %, further preferably not less than 6 mass %, further preferably not less than 8 mass %, and especially preferably not less than 10 mass % relative to the total amount of the liquid crystal composition of the present invention. The amount is preferably up to 30 mass %, more preferably up to 25 mass %, further preferably up to 20 mass %, and especially preferably up to 18 mass %.

The compound represented by General Formula (I) is preferably a compound selected from the group consisting of compounds represented by General Formula (I-5).

[Chem. 29]

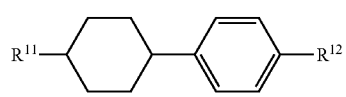

(I-5)

(in the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-5) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount of the compound is, for example, 1% in an embodiment of the present invention, 5% in another embodiment of the present invention, 8% in another embodiment of the present invention, 11% in another embodiment of the present invention, 13% in another embodiment of the present invention, 15% in another embodiment of the present invention, 17% in another embodiment of the present invention, 20% in another embodiment of the present invention, 25% in another embodiment of the present invention, 30% in another embodiment of the present invention, 35% in another embodiment of the present invention, or 40% in another embodiment of the present invention relative to the total amount of the liquid crystal composition of the present invention.

The preferred upper limit of the amount of the compound is, for instance, 50% in an embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, or 5% in another embodiment of the present invention relative to the total amount of the liquid crystal composition of the present invention.

In terms of solubility at low temperature, the amount is adjusted to be larger to produce a greater effect; in terms of response speed, the amount is adjusted to be smaller to produce a greater effect. In order to improve properties related to droplet stains and screen burn-in, the range of the amount is preferably adjusted to be intermediate.

The compound represented by General Formula (I-5) is preferably a compound selected from the group consisting of compounds represented by Formulae (6.1) to (6.6); among these, the compound represented by Formula (6.3), (6.4), or (6.6) is preferably employed.

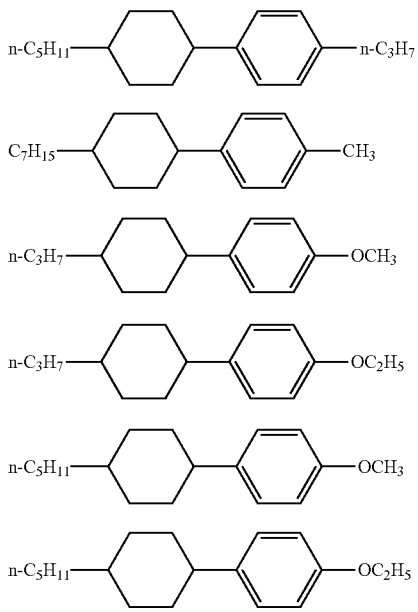

(6.1)
(6.2)
(6.3)
(6.4)
(6.5)
(6.6)

The amount of the compound represented by Formula (6.6) is, for instance, preferably not less than 2 mass %, more preferably 4 mass %, further preferably not less than 5 mass %, further preferably not less than 6 mass %, further preferably not less than 9 mass %, further preferably not less than 12 mass %, further preferably not less than 14 mass %, further preferably not less than 16 mass %, further preferably not less than 18 mass %, further preferably not less than 20 mass %, and especially preferably not less than 22 mass % relative to the total amount of the liquid crystal composition of the present invention. The amount is preferably up to 30 mass %, more preferably up to 25 mass %, further preferably up to 24 mass %, and especially preferably up to 23 mass %.

The liquid crystal composition of the present invention can further contain compounds represented by Formulae (6.7) to (6.9).

[Chem. 31]

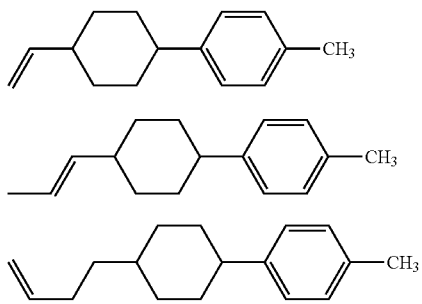

(6.7)
(6.8)
(6.9)

The amount of each of the compounds represented by Formulae (6.7) to (6.9) is preferably adjusted on the basis of desired properties such as solubility at low temperature, transition temperature, electric reliability, and birefringence; and the amount of the compound is preferably not less than 2 mass %, more preferably 3 mass %, further preferably 5 mass %, and especially preferably not less than 7 mass % relative to the total amount of the liquid crystal composition of the present invention.

The compound represented by General Formula (I) is preferably a compound selected from the group consisting of compounds represented by General Formula (I-6).

[Chem. 32]

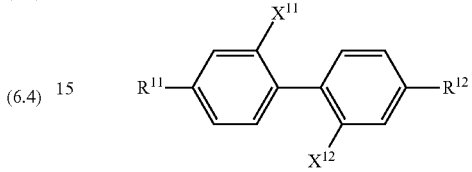

(I-6)

(in the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms; $X^{11}$ and $X^{12}$ each independently represent a fluorine atom or a hydrogen atom; and any one of $X^{11}$ and $X^{12}$ is a fluorine atom)

The amount of the compound represented by General Formula (I-6) is preferably not less than 2 mass %, more preferably 4 mass %, further preferably not less than 5 mass %, further preferably not less than 6 mass %, further preferably not less than 9 mass %, further preferably not less than 12 mass %, further preferably not less than 14 mass %, further preferably not less than 16 mass %, further preferably not less than 18 mass %, further preferably not less than 20 mass %, and especially preferably not less than 22 mass % relative to the total amount of the liquid crystal composition of the present invention. The amount is preferably up to 30 mass %, more preferably up to 25 mass %, further preferably up to 24 mass %, and especially preferably up to 23 mass %.

The compound represented by General Formula (I-6) is preferably a compound represented by Formula (7.1).

[Chem. 33]

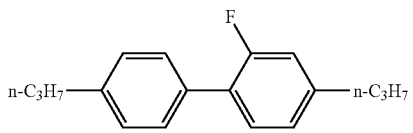

(7.1)

The compound represented by General Formula (I) is preferably a compound selected from the group consisting of compounds represented by General Formula (I-7).

[Chem. 34]

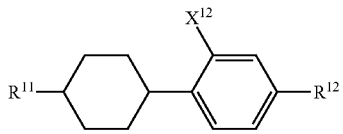

(I-7)

(in the formula, $R^{11}$ and $R^{12}$ each independently represent an alkyl group having 1 to 5 carbon atoms, an alkenyl group having 2 to 5 carbon atoms, or an alkoxy group having 1 to 4 carbon atoms; and $X^{12}$ each independently represents a fluorine atom or a chlorine atom)

The amount of the compound represented by General Formula (I-7) is preferably not less than 1 mass %, more preferably 2 mass %, further preferably not less than 3 mass %, further preferably not less than 4 mass %, further preferably not less than 6 mass %, further preferably not less than 8 mass %, further preferably not less than 10 mass %, further preferably not less than 12 mass %, further preferably not less than 15 mass %, further preferably not less than 18 mass %, and especially preferably not less than 21 mass % relative to the total amount of the liquid crystal composition of the present invention. The amount is preferably up to 30 mass %, more preferably up to 25 mass %, further preferably up to 24 mass %, and especially preferably up to 22 mass %.

The compound represented by General Formula (I-7) is preferably a compound represented by Formula (8.1).

[Chem. 35]

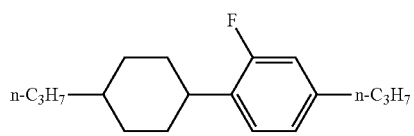

(8.1)

The compound represented by General Formula (I) is preferably a compound selected from the group consisting of compounds represented by General Formula (I-8).

[Chem. 36]

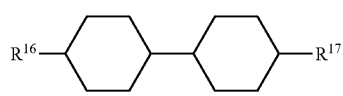

(I-8)

(in the formula, $R^{16}$ and $R^{17}$ each independently represent an alkenyl group having 2 to 5 carbon atoms)

Such compounds can be used in any combination; in view of desired properties such as solubility at low temperature, transition temperature, electric reliability, and birefringence, it is preferred that one to three of the compounds be used.

The amount of the compound represented by General Formula (I-8) is preferably not less than 5 mass %, more preferably 10 mass %, further preferably not less than 15 mass %, further preferably not less than 20 mass %, further preferably not less than 25 mass %, further preferably not less than 30 mass %, further preferably not less than 35 mass %, further preferably not less than 40 mass %, further preferably not less than 45 mass %, further preferably not less than 50 mass %, and especially preferably not less than 55 mass % relative to the total amount of the liquid crystal composition of the present invention in view of desired properties such as solubility at low temperature, transition temperature, electric reliability, birefringence, process adaptability, droplet stains, screen burn-in, and dielectric anisotropy. The amount is preferably up to 65 mass %, more preferably up to 60 mass %, further preferably up to 58 mass %, and especially preferably up to 56 mass %.

The compound represented by General Formula (I-8) is preferably a compound selected from the group consisting of compounds represented by Formulae (9.1) to (9.10); among these, any of the compounds represented by Formulae (9.2), (9.4), and (9.7) is preferably employed.

[Chem. 37]

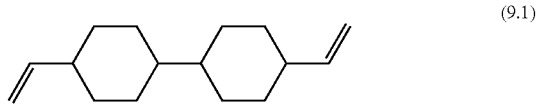

(9.1)

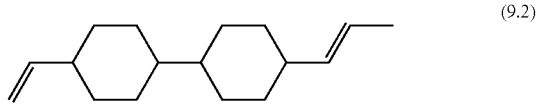

(9.2)

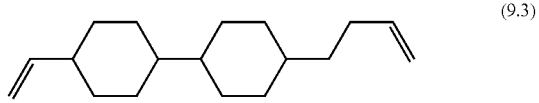

(9.3)

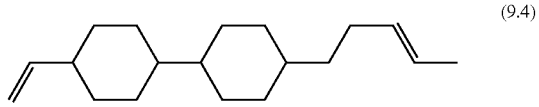

(9.4)

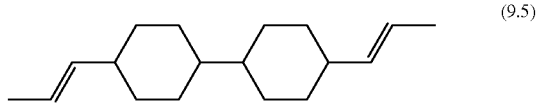

(9.5)

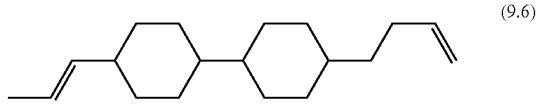

(9.6)

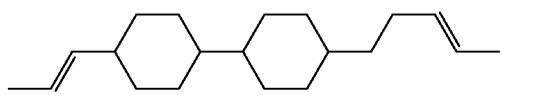

(9.7)

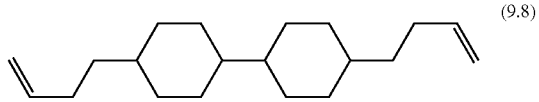

(9.8)

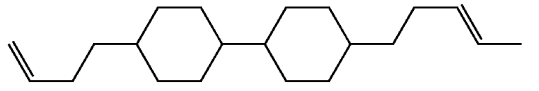

(9.9)

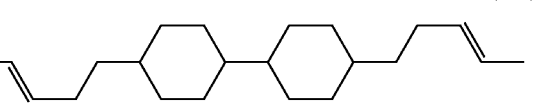

(9.10)

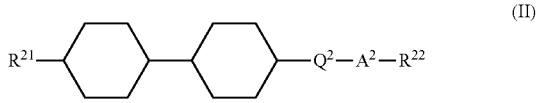

The compound represented by General Formula (L) is, for example, preferably a compound selected from compounds represented by General Formula (II).

[Chem. 38]

(II)

$R^{21}$—⬡—⬡—$Q^2$—$A^2$—$R^{22}$ ($R^{21}$ and $R^{22}$ each independently represent an alkenyl group having 2 to 5 carbon atoms, an alkyl group having 1 to 5 carbon atoms, or an alkoxy group having 1 to 4 carbon atoms; $A^2$ represents a 1,4-cyclohexylene group or a 1,4- phenylene group; and $Q^2$ represents a single bond, —COO—, —CH$_2$—CH$_2$—, or —CF$_2$O—)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

In the liquid crystal composition of the present invention, the amount of the compound represented by General Formula (II) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount of the compound is, for example, 3% in an embodiment of the present invention, 5% in another embodiment of the present invention, 7% in another embodiment of the present invention, 10% in another embodiment of the present invention, 14% in another embodiment of the present invention, 16% in another embodiment of the present invention, 20% in another embodiment of the present invention, 23% in another embodiment of the present invention, 26% in another embodiment of the present invention, 30% in another embodiment of the present invention, 35% in another embodiment of the present invention, or 40% in another embodiment of the present invention relative to the total amount of the liquid crystal composition of the present invention.

The preferred upper limit of the amount of the compound is, for instance, 50% in an embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, or 5% in another embodiment of the present invention relative to the total amount of the liquid crystal composition of the present invention.

The compound represented by General Formula (II) is, for instance, preferably a compound selected from the group consisting of compounds represented by General Formula (II-1).

[Chem. 39]

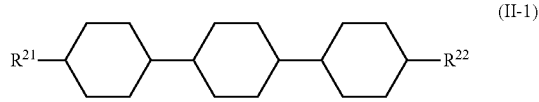

(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms)

The amount of the compound represented by General Formula (II-1) is preferably adjusted on the basis of desired properties such as solubility at low temperature, transition temperature, electric reliability, and birefringence; the amount is preferably not less than 4 mass %, more preferably not less than 8 mass %, and further preferably not less than 12 mass %. The amount is preferably up to 24 mass %, more preferably up to 18 mass %, and further preferably up to 14 mass %.

The compound represented by General Formula (II-1) is, for example, preferably any of compounds represented by Formulae (10.1) and (10.2).

[Chem. 40]

(10.1)

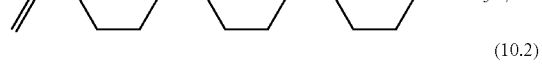

(10.2)

The compound represented by General Formula (II) is, for instance, preferably a compound selected from the group consisting of compounds represented by General Formula (II-2).

[Chem. 41]

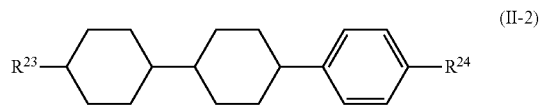

(II-2)

($R^{23}$ represents an alkenyl group having 2 to 5 carbon atoms, and $R^{24}$ represents an alkyl group having 1 to 5 carbon atoms or an alkoxy group having 1 to 4 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two or more of the compounds are used.

In the liquid crystal composition of the present invention, the amount of the compound represented by General Formula (II-2) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount of the compound is, for example, 3% in an embodiment of the present invention, 5% in another embodiment of the present invention, 7% in another embodiment of the present invention, 10% in another embodiment of the present invention, 14% in another embodiment of the present invention, 16% in another embodiment of the present invention, 20% in another embodiment of the present invention, 23% in another embodiment of the present invention, 26% in another embodiment of the present invention, 30% in another embodiment of the present invention, 35% in another embodiment of the present invention, or 40% in another embodiment of the present invention relative to the total amount of the liquid crystal composition of the present invention.

The preferred upper limit of the amount of the compound is, for instance, 50% in an embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, or 5% in another embodiment of the present invention relative to the total amount of the liquid crystal composition of the present invention.

The compound represented by General Formula (II-2) is, for example, preferably any of compounds represented by Formulae (11.1) to (11.3).

[Chem. 42]

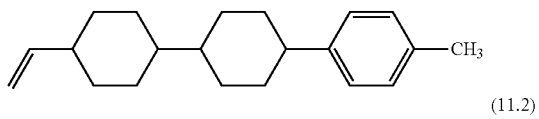

(11.1)

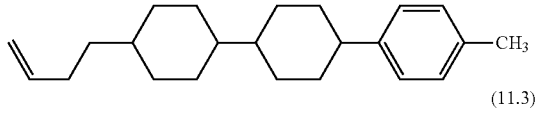

(11.2)

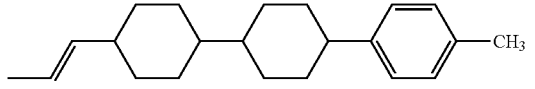

(11.3)

On the basis of desired properties such as solubility at low temperature, transition temperature, electric reliability, and birefringence, the compound represented by Formula (11.1) may be used; the compound represented by Formula (11.2) may be used; both of the compound represented by Formula (11.1) and the compound represented by Formula (11.2) may be used; or all of the compounds represented by Formulae (11.1) to (11.3) may be used. The amount of the compound represented by Formula (11.1) or (11.2) is preferably 3 mass %, more preferably not less than 5 mass %, further preferably not less than 7 mass %, further preferably not less than 9 mass %, further preferably not less than 11 mass %, further preferably not less than 12 mass %, further preferably not less than 13 mass %, further preferably not less than 18 mass %, and especially preferably not less than 21 mass % relative to the total amount of the liquid crystal composition of the present invention. The amount is preferably up to 40 mass %, more preferably up to 30 mass %, and further preferably up to 25 mass %. Moreover, the amount of the compound represented by Formula (11.2) is preferably 3 mass %, more preferably not less than 5 mass %, further preferably not less than 8 mass %, further preferably not less than 10 mass %, further preferably not less than 12 mass %, further preferably not less than 15 mass %, further preferably not less than 17 mass %, and especially preferably not less than 19 mass % relative to the total amount of the liquid crystal composition of the present invention. The amount is preferably up to 40 mass %, more preferably up to 30 mass %, and further preferably up to 25 mass %. In the case where both the compound represented by Formula (11.1) and the compound represented by Formula (11.2) are used, the total amount of these compounds is preferably not less than 15 mass %, more preferably not less than 19 mass %, further preferably not less than 24 mass %, and especially preferably not less than 30 mass % relative to the total amount of the liquid crystal composition of the present invention. The amount is preferably up to 45 mass %, more preferably up to 40 mass %, and further preferably up to 35 mass %.

The compound represented by General Formula (II) is, for example, preferably a compound selected from the group consisting of compounds represented by General Formula (II-3).

[Chem. 43]

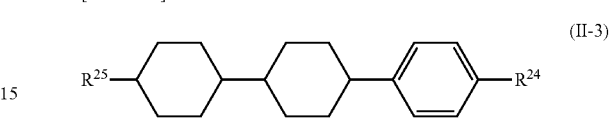

(II-3)

($R^{25}$ represents an alkyl group having 1 to 5 carbon atoms, and $R^{24}$ represents an alkyl group having 1 to 5 carbon atoms or an alkoxy group having 1 to 4 carbon atoms)

Such compounds can be used in any combination; in view of desired properties such as solubility at low temperature, transition temperature, electric reliability, and birefringence, it is preferred that one to three of the compounds be used.

The amount of the compound represented by General Formula (II-3) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount of the compound is, for example, preferably 2%, more preferably 5%, further preferably 8%, further preferably 11%, further preferably 14%, further preferably 17%, further preferably 20%, further preferably 23%, further preferably 26%, and especially preferably 29% relative to the total amount of the liquid crystal composition of the present invention. The preferred upper limit of the amount of the compound is, for instance, preferably 45%, more preferably 40%, further preferably 35%, further preferably 30%, further preferably 25%, further preferably 20%, further preferably 15%, and especially preferably 10% relative to the total amount of the liquid crystal composition of the present invention.

The compound represented by General Formula (II-3) is, for example, preferably any of compounds represented by Formulae (12.1) to (12.3).

[Chem. 44]

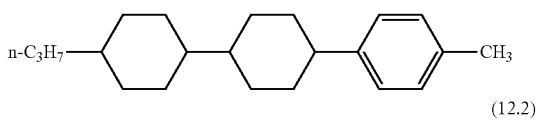

(12.1)

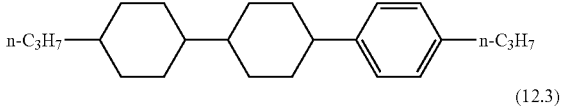

(12.2)

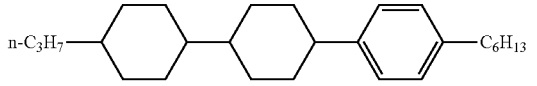

(12.3)

On the basis of desired properties such as solubility at low temperature, transition temperature, electric reliability, and birefringence, the compound represented by Formula (12.1) may be used, the compound represented by Formula (12.2) may be used, and both of the compound represented by Formula (12.1) and the compound represented by Formula (12.2) may be used. The amount of the compound represented by Formula (12.1) or (11.2) is preferably 3 mass %, more preferably not less than 5 mass %, further preferably not less than 7 mass %, further preferably not less than 9 mass %, further preferably not less than 11 mass %, further preferably not less than 12 mass %, further preferably not less than 13 mass %, further preferably not less than 18 mass %, and especially preferably not less than 21 mass % relative to the total amount of the liquid crystal composition of the present invention. The amount is preferably up to 40 mass %, more preferably up to 30 mass %, and further preferably up to 25 mass %. Moreover, the amount of the compound represented by Formula (12.2) is preferably 3 mass %, more preferably not less than 5 mass %, further preferably not less than 8 mass %, further preferably not less than 10 mass %, further preferably not less than 12 mass %, further preferably not less than 15 mass %, further preferably not less than 17 mass %, and especially preferably not less than 19 mass % relative to the total amount of the liquid crystal composition of the present invention. The amount is preferably up to 40 mass %, more preferably up to 30 mass %, and further preferably up to 25 mass %. In the case where both the compound represented by Formula (12.1) and the compound represented by Formula (12.2) are used, the total amount of these compounds is preferably not less than 15 mass %, more preferably not less than 19 mass %, further preferably not less than 24 mass %, and especially preferably not less than 30 mass % relative to the total amount of the liquid crystal composition of the present invention. The amount is preferably up to 45 mass %, more preferably up to 40 mass %, and further preferably up to 35 mass %.

The amount of the compound represented by Formula (12.3) is preferably not less than 0.05 mass %, more preferably not less than 0.1 mass %, and further preferably not less than 0.2 mass % relative to the total amount of the liquid crystal composition of the present invention. The amount is preferably up to 2 mass %, more preferably up to 1 mass %, and further preferably up to 0.5 mass %. The compound represented by Formula (12.3) may be an optically active compound.

The compound represented by General Formula (II-3) is, for example, preferably a compound selected from the group consisting of compounds represented by General Formula (II-3-1).

[Chem. 45]

(II-3-1)

($R^{25}$ represents an alkyl group having 1 to 5 carbon atoms, and $R^{26}$ represents an alkoxy group having 1 to 4 carbon atoms)

Such compounds can be used in any combination; in view of desired properties such as solubility at low temperature, transition temperature, electric reliability, and birefringence, it is preferred that one to three of the compounds be used.

The amount of the compound represented by General Formula (II-3-1) is preferably adjusted on the basis of predetermined properties such as solubility at low temperature, transition temperature, electric reliability, and birefringence; the amount is preferably not less than 1 mass %, more preferably not less than 4 mass %, and further preferably not less than 8 mass %. The amount is preferably up to 24 mass %, more preferably up to 18 mass %, and further preferably up to 14 mass %.

The compound represented by General Formula (II-3-1) is, for instance, preferably any of compounds represented by Formulae (13.1) to (13.4), and especially preferably the compound represented by Formula (13.3).

[Chem. 46]

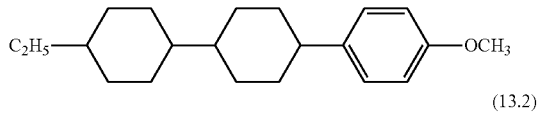

(13.1)

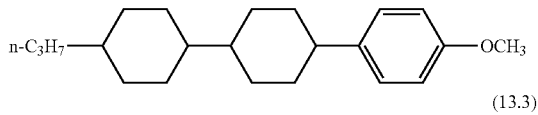

(13.2)

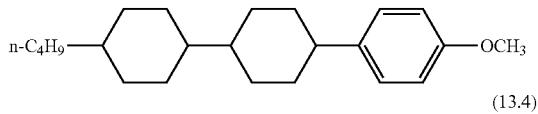

(13.3)

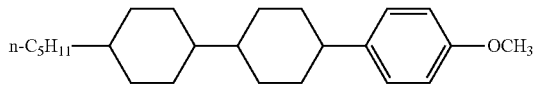

(13.4)

The compound represented by General Formula (II) is, for example, preferably a compound selected from the group consisting of compounds represented by General Formula (II-4).

[Chem. 47]

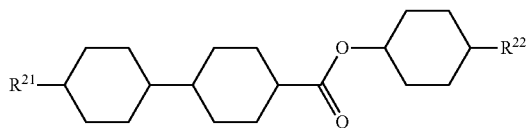

(II-4)

($R^{21}$ and $R^{22}$ each independently represent an alkenyl group having 2 to 5 carbon atoms, an alkyl group having 1 to 5 carbon atoms, or an alkoxy group having 1 to 4 carbon atoms)

Such compounds may be used alone or in combination, and it is preferred that a proper combination thereof be determined on the basis of desired properties. The compounds can be used in any combination; in view of the intended properties such as solubility at low temperature, transition temperature, electric reliability, and birefringence, it is preferred that one or two of the compounds be used, and it is especially preferred that one to three of the compounds be used.

The amount of the compound represented by General Formula (II-4) is preferably not less than 1 mass %, more preferably not less than 2 mass %, further preferably not less than 3 mass %, further preferably not less than 4 mass %, and especially preferably not less than 5 mass % relative to the total amount of the liquid crystal composition of the present invention. The amount is preferably up to 15 mass %, more preferably up to 12 mass %, and further preferably up to 7 mass %.

The compound represented by General Formula (II-4) is, for instance, preferably any of compounds represented by Formulae (14.1) to (14.5), and especially preferably the compound represented by Formula (14.2) and/or the compound represented by Formula (14.5).

[Chem. 48]

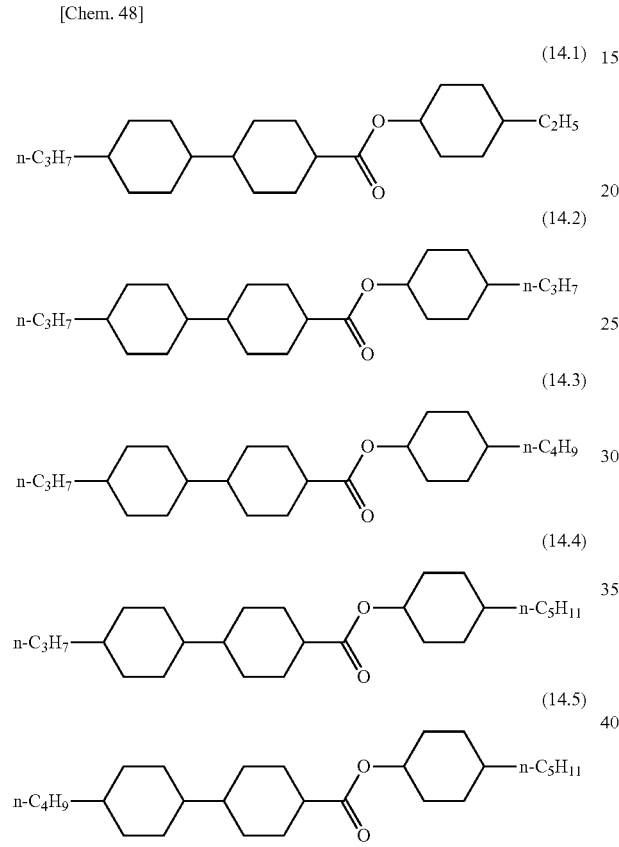

The compound represented by General Formula (L) is preferably a compound selected from the group consisting of compounds represented by General Formula (III).

[Chem. 49]

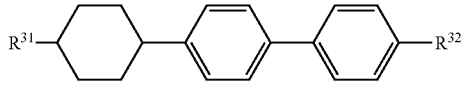

($R^{31}$ and $R^{32}$ each independently represent an alkenyl group having 2 to 5 carbon atoms, an alkyl group having 1 to 5 carbon atoms, or an alkoxy group having 1 to 4 carbon atoms)

In view of desired solubility, birefringence, and another property, the amount of the compound represented by General Formula (III) is preferably not less than 3 mass %, more preferably not less than 5 mass %, and further preferably not less than 7 mass % relative to the total amount of the liquid crystal composition of the present invention. The amount is preferably up to 25 mass %, more preferably up to 20 mass %, and further preferably up to 15 mass %.

The compound represented by General Formula (III) is, for instance, preferably any of compounds represented by Formulae (15.1) to (15.3), and especially preferably the compound represented by Formula (15.3).

[Chem. 50]

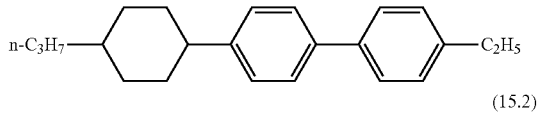

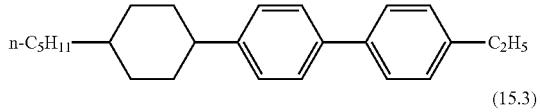

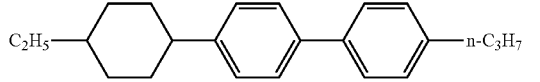

The compound represented by General Formula (III) is preferably a compound selected from the group consisting of compounds represented by General Formula (III-1).

[Chem. 51]

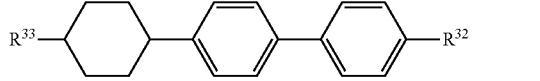

($R^{33}$ represents an alkenyl group having 2 to 5 carbon atoms, and $R^{32}$ each independently represents an alkyl group having 1 to 5 carbon atoms or an alkoxy group having 1 to 4 carbon atoms)

The amount of the compound is preferably adjusted on the basis of desired properties such as solubility at low temperature, transition temperature, electric reliability, and birefringence; the amount is preferably not less than 4 mass %, more preferably not less than 6 mass %, and further preferably not less than 10 mass %. The amount is preferably up to 23 mass %, more preferably up to 18 mass %, and further preferably up to 13 mass %.

The compound represented by General Formula (III-1) is, for example, preferably a compound represented by Formula (16.1) or (16.2).

[Chem. 52]

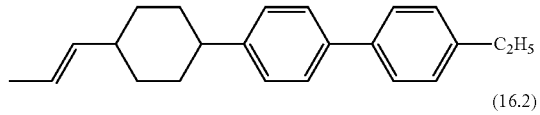

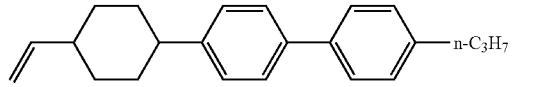

The compound represented by General Formula (III) is preferably a compound selected from the group consisting of compounds represented by General Formula (III-2).

[Chem. 53]

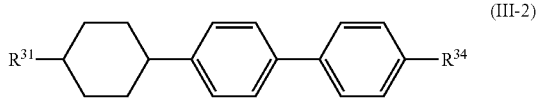

(III-2)

($R^{31}$ represents an alkyl group having 1 to 5 carbon atoms, and $R^{34}$ represents an alkoxy group having 1 to 4 carbon atoms)

The amount of the compound represented by General Formula (III-2) is preferably adjusted on the basis of desired properties such as solubility at low temperature, transition temperature, electric reliability, and birefringence; the amount is preferably not less than 4 mass %, more preferably not less than 6 mass %, and further preferably not less than 10 mass %. The amount is preferably up to 23 mass %, more preferably up to 18 mass %, and further preferably up to 13 mass %.

The compound represented by General Formula (III-2) is, for instance, preferably a compound selected from the group consisting of compounds represented by Formulae (17.1) to (17.3), and especially preferably the compound represented by Formula (17.3).

[Chem. 54]

(17.1)

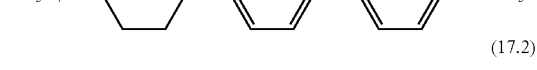

(17.2)

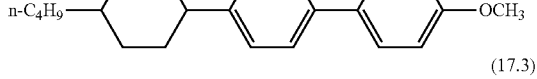

(17.3)

The compound represented by General Formula (L) is preferably a compound selected from the group consisting of compounds represented by General Formula (IV).

[Chem. 55]

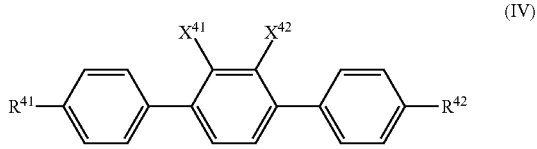

(IV)

(in the formula, $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

The compound represented by General Formula (IV) is, for instance, preferably a compound selected from the group consisting of compounds represented by General Formula (IV-1).

[Chem. 56]

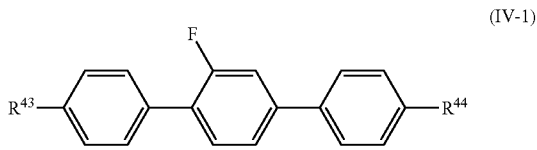

(IV-1)

(in the formula, $R^{43}$ and $R^{44}$ each independently represent an alkyl group having 1 to 5 carbon atoms)

The amount of the compound represented by General Formula (IV-1) needs to be appropriately adjusted on the basis of desired properties such as solubility at low temperature, transition temperature, electric reliability, birefringence, process adaptability, droplet stains, screen burn-in, and dielectric anisotropy. The preferred lower limit of the amount of the compound is, for example, 1% in an embodiment, 2% in another embodiment of the present invention, 4% in another embodiment of the present invention, 6% in another embodiment of the present invention, 8% in another embodiment of the present invention, 10% in another embodiment of the present invention, 12% in another embodiment of the present invention, 15% in another embodiment of the present invention, 18% in another embodiment of the present invention, or 21% in another embodiment of the present invention relative to the total amount of the liquid crystal composition of the present invention.

The preferred upper limit of the amount of the compound is, for instance, 40% in an embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, or 4% in another embodiment of the present invention relative to the total amount of the liquid crystal composition of the present invention.

The compound represented by General Formula (IV-1) is, for instance, preferably any of compounds represented by Formulae (18.1) to (18.9).

[Chem. 57]

(18.1)
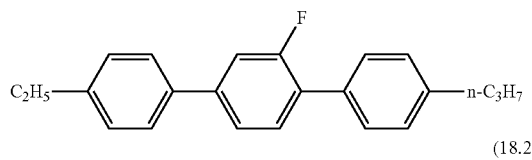

(18.2)
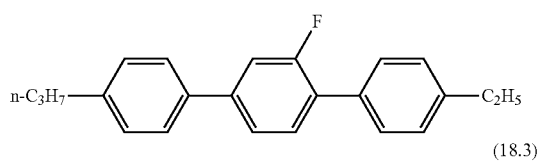

(18.3)
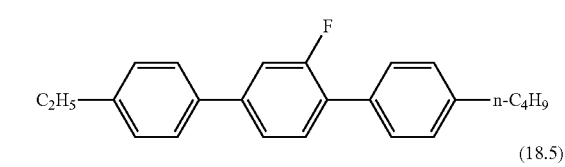

(18.4)
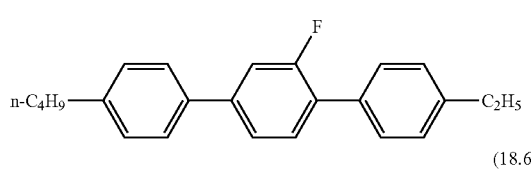

(18.5)
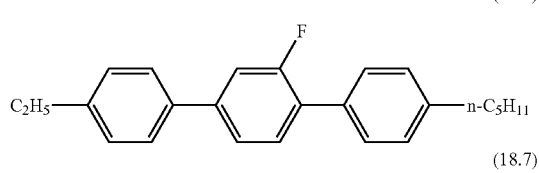

(18.6)
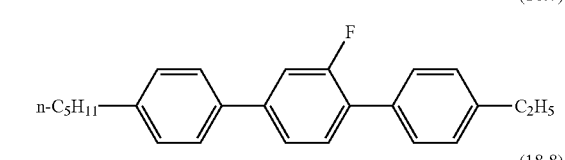

(18.7)
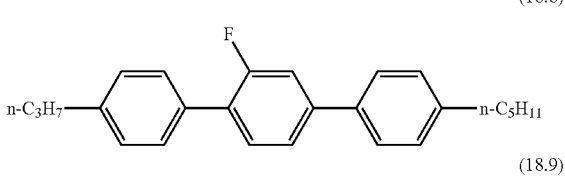

(18.8)

(18.9)

Such compounds can be used in any combination; it is preferred that one to three of the compounds be used, and it is more preferred that one to four of the compounds be used. Use of a compound having a broad molecular weight distribution is also effective in solubility; hence, a preferred example of use of these compounds is as follows: one compound is selected from the compounds represented by Formulae (18.1) and (18.2), one compound is selected from the compounds represented by Formulae (18.4) and (18.5), one compound is selected from the compounds represented by Formulae (18.6) and (18.7), one compound is selected from the compounds represented by Formulae (18.8) and (18.9), and a proper combination of the selected compounds is determined. In particular, the compounds represented by Formulae (18.1), (18.3), (18.4), (18.6), and (18.9) are preferably employed.

The compound represented by General Formula (IV) is, for example, preferably a compound selected from the group consisting of compounds represented by General Formula (IV-2).

[Chem. 58]

(IV-2)
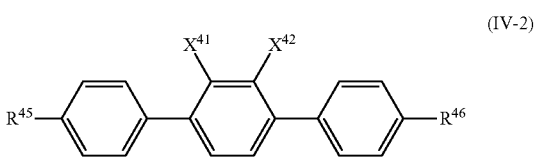

(in the formula, $R^{45}$ and $R^{46}$ each independently represent an alkyl group having 1 to 5 carbon atoms or an alkenyl group having 2 to 5 carbon atoms, and at least one of them represents an alkenyl group having 2 to 5 carbon atoms; and $X^{41}$ and $X^{42}$ each independently represent a hydrogen atom or a fluorine atom)

Such compounds can be used in any combination; a combination of the compounds is determined on the basis of desired properties such as solubility at low temperature, transition temperature, electric reliability, and birefringence.

The amount of the compound represented by General Formula (IV-2) needs to be appropriately adjusted on the basis of predetermined properties such as solubility at low temperature, transition temperature, electric reliability, birefringence, process adaptability, droplet stains, screen burn-in, and dielectric anisotropy. The preferred lower limit of the amount is, for example, preferably 0.5%, more preferably 1%, further preferably 2%, further preferably 3%, further preferably 5%, further preferably 7%, further preferably 9%, further preferably 12%, further preferably 15%, and especially preferably 20% relative to the total amount of the liquid crystal composition of the present invention. The preferred upper limit of the amount is, for instance, preferably 40%, more preferably 30%, further preferably 25%, further preferably 20%, further preferably 15%, further preferably 10%, further preferably 5%, and especially preferably 4% relative to the total amount of the liquid crystal composition of the present invention.

The compound represented by General Formula (IV-2) is, for instance, preferably any of compounds represented by Formulae (19.1) to (19.8); among these, the compound represented by Formula (19.2) is preferably employed.

[Chem. 59]

(19.1)
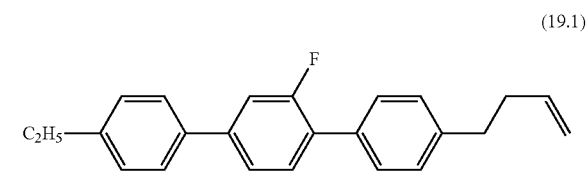

-continued (19.2)
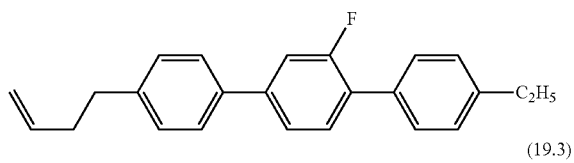

(19.3)
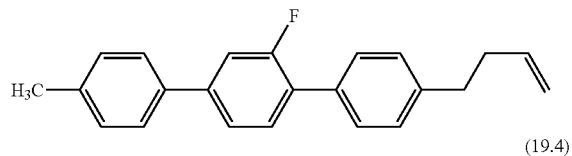

(19.4)
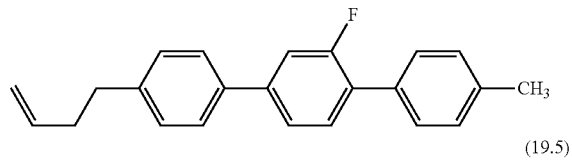

(19.5)
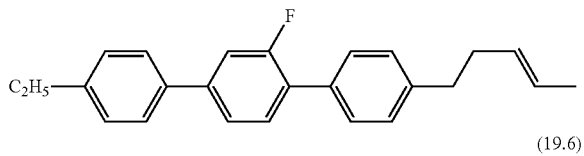

(19.6)
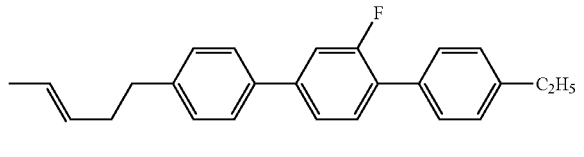

(19.7)
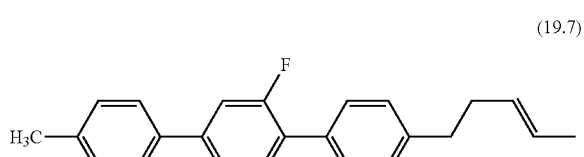

(19.8)
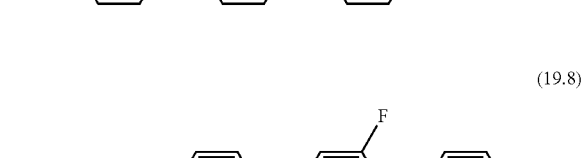

Use of a compound having a broad molecular weight distribution as a component of the liquid crystal composition is also effective in solubility; hence, a preferred example of use of these compounds is as follows: one compound is selected from the compounds represented by Formulae (19.1) and (19.2), one compound is selected from the compounds represented by Formulae (19.3) and (19.4), one compound is selected from the compounds represented by Formulae (19.5) and (19.6), one compound is selected from the compounds represented by Formulae (19.7) and (19.8), and a proper combination of these selected compounds is determined.

The compound represented by General Formula (L) is preferably a compound selected from the group consisting of compounds represented by General Formula (V).

[Chem. 60]

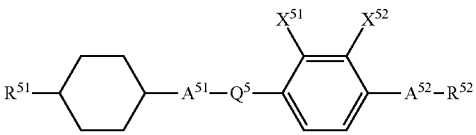

(V)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms; $A^{51}$ and $A^{52}$ each independently represent a 1,4-cyclohexylene group or a 1,4-phenylene group; $Q^5$ represents a single bond or —COO—; and $X^{51}$ and $X^{52}$ each independently represent a fluorine atom or a hydrogen atom, where the compound represented by General Formula (V) excludes the compound represented by General Formula (ii))

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used.

The preferred lower limit of the amount is, for example, 2% in an embodiment, 4% in another embodiment of the present invention, 7% in another embodiment of the present invention, 10% in another embodiment of the present invention, 12% in another embodiment of the present invention, 15% in another embodiment of the present invention, 17% in another embodiment of the present invention, 18% in another embodiment of the present invention, 20% in another embodiment of the present invention, or 22% in another embodiment of the present invention relative to the total amount of the liquid crystal composition of the present invention.

The preferred upper limit of the amount is, for instance, 40% in an embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, or 4% in another embodiment of the present invention relative to the total amount of the liquid crystal composition of the present invention.

The compound represented by General Formula (V) is preferably any of compounds represented by General Formula (V-2).

[Chem. 61]

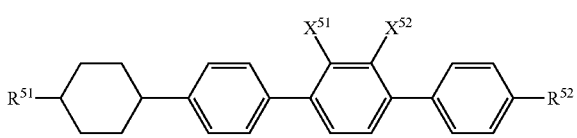

(V-2)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two or more of the compounds are used.

The preferred lower limit of the amount is, for example, 2% in an embodiment, 4% in another embodiment of the present invention, 7% in another embodiment of the present invention, 10% in another embodiment of the present invention, 12% in another embodiment of the present invention, 15% in another embodiment of the present invention, 17% in another embodiment of the present invention, 18% in another embodiment of the present invention, 20% in another embodiment of the present invention, or 22% in another embodiment of the present invention relative to the total amount of the liquid crystal composition of the present invention.

The preferred upper limit of the amount is, for instance, 40% in an embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, or 4% in another embodiment of the present invention relative to the total amount of the liquid crystal composition of the present invention.

In an embodiment in which the liquid crystal composition of the present invention needs to have a high Tni, the amount of the compound represented by Formula (V-2) is preferably adjusted to be larger; in an embodiment in which the liquid crystal composition needs to have a low viscosity, the amount thereof is preferably adjusted to be smaller.

The compound represented by General Formula (V-2) is preferably any of compounds represented by General Formula (V-2-1).

[Chem. 62]

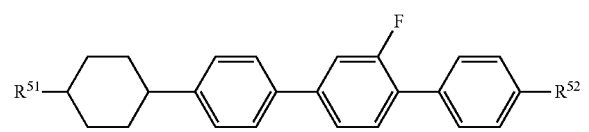

(V-2-1)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms)

The compound represented by General Formula (V-2-1) is preferably any of compounds represented by Formulae (23.1) to (23.4); among these, the compound represented by Formula (23.1) and/or the compound represented by Formula (23.2) are preferably employed.

[Chem. 63]

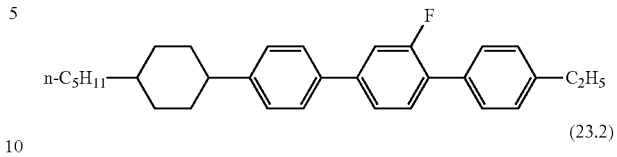

(23.1)

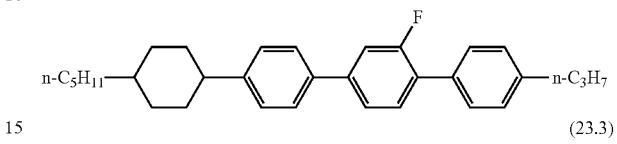

(23.2)

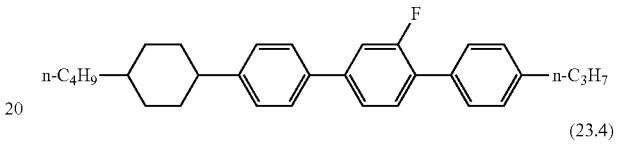

(23.3)

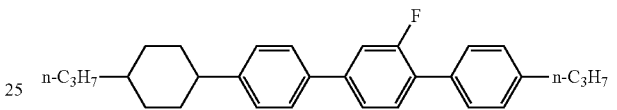

(23.4)

The compound represented by General Formula (V-2) is preferably any of compounds represented by General Formula (V-2-2).

[Chem. 64]

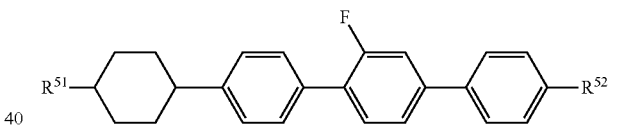

(V-2-2)

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms)

The compound represented by General Formula (V-2-2) is preferably any of compounds represented by Formulae (24.1) to (24.4); among these, the compound represented by Formula (24.1) and/or the compound represented by Formula (24.2) are preferably employed.

[Chem. 65]

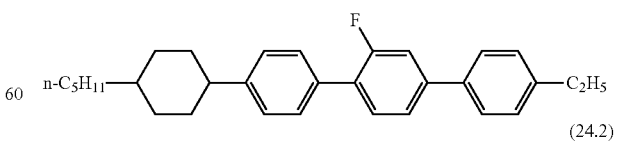

(24.1)

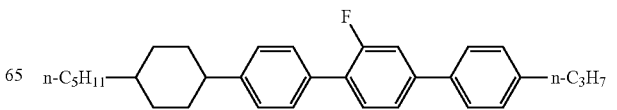

(24.2)

-continued (24.3)

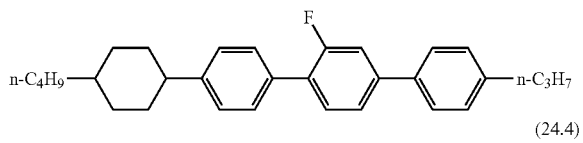

(24.4)

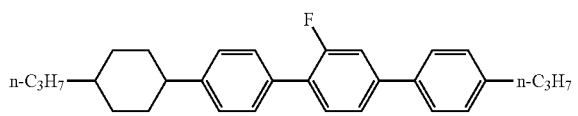

The compound represented by General Formula (V) is preferably any of compounds represented by General Formula (V-3).

[Chem. 66]

(V-3)

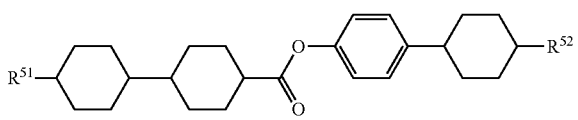

(in the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (V-3) is preferably not less than 2 mass %, more preferably not less than 4 mass %, further preferably not less than 7 mass %, and especially preferably not less than 8 mass % relative to the total amount of the liquid crystal composition of the present invention. The amount is preferably up to 16 mass %, more preferably up to 13 mass %, and further preferably up to 11 mass %.

The compound represented by General Formula (V-3) is preferably any of compounds represented by Formulae (25.1) to (25.3).

[Chem. 67]

(25.1)

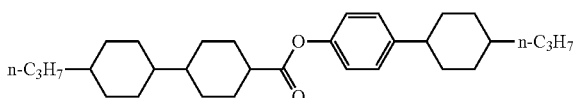

(25.2)

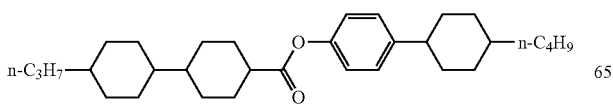

(25.3)

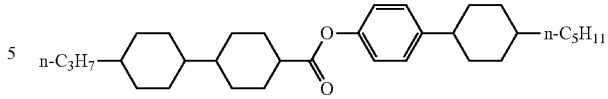

The liquid crystal composition of the present invention can further contain at least one compound represented by General Formula (VI).

[Chem. 68]

(VI)

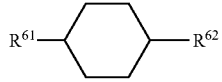

(in the formula, $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms)

Such compounds can be used in any combination; on the basis of desired properties such as solubility at low temperature, transition temperature, electric reliability, and birefringence, it is preferred that one to three of such compounds be used, it is more preferred that one to four of the compounds be used, and it is especially preferred that one to five or more of the compounds be used. The amount thereof is preferably up to 35 mass %, more preferably up to 25 mass %, and further preferably up to 15 mass %.

In particular, preferred examples of usable compounds represented by General Formula (VI) include the following compounds.

[Chem. 69]

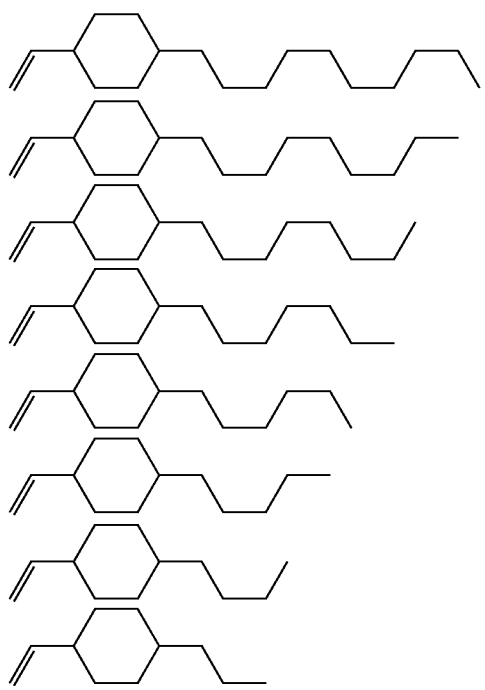

-continued
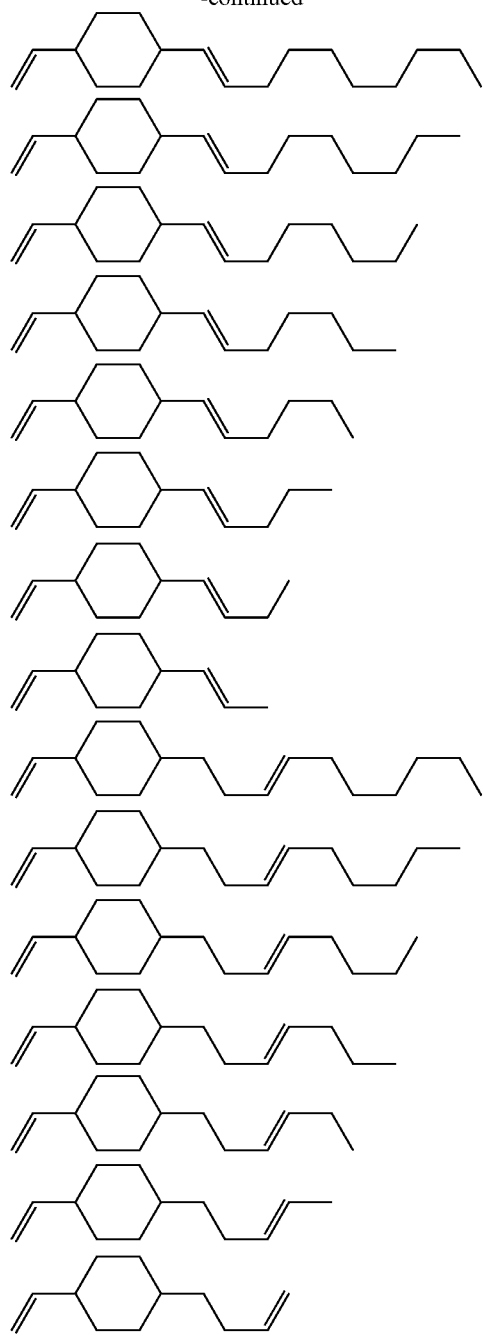
[Chem. 70]
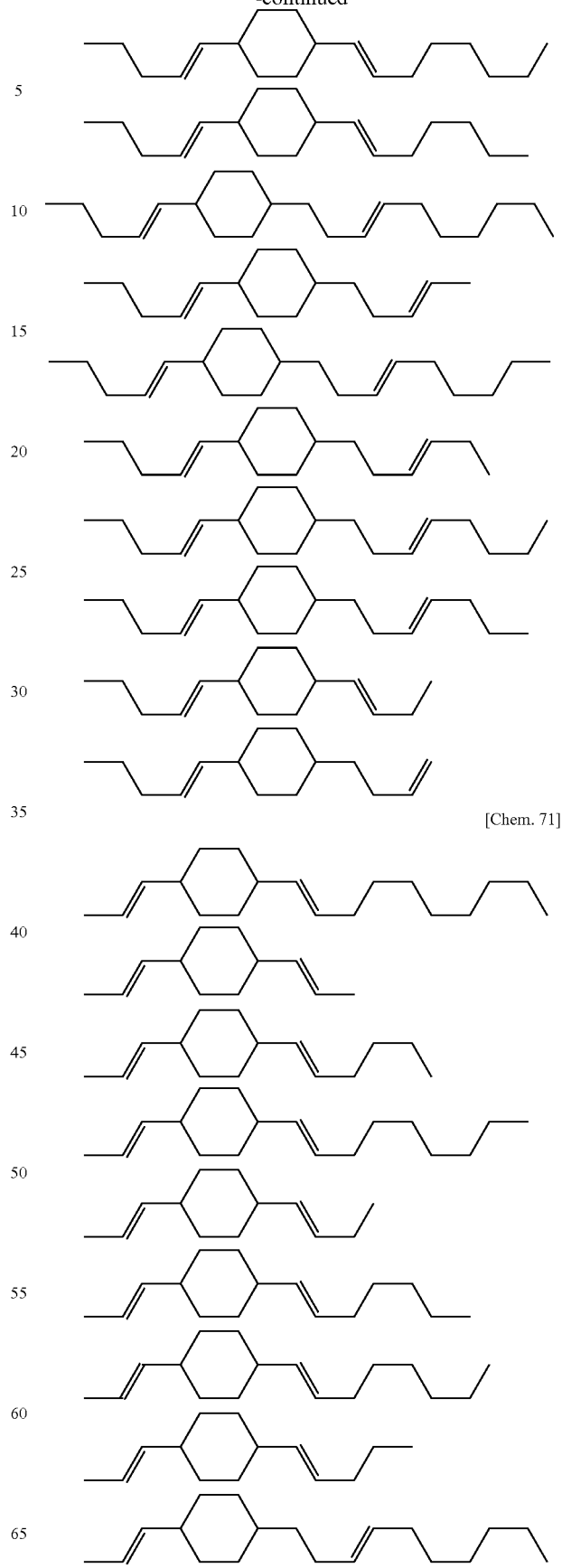
[Chem. 71]

-continued

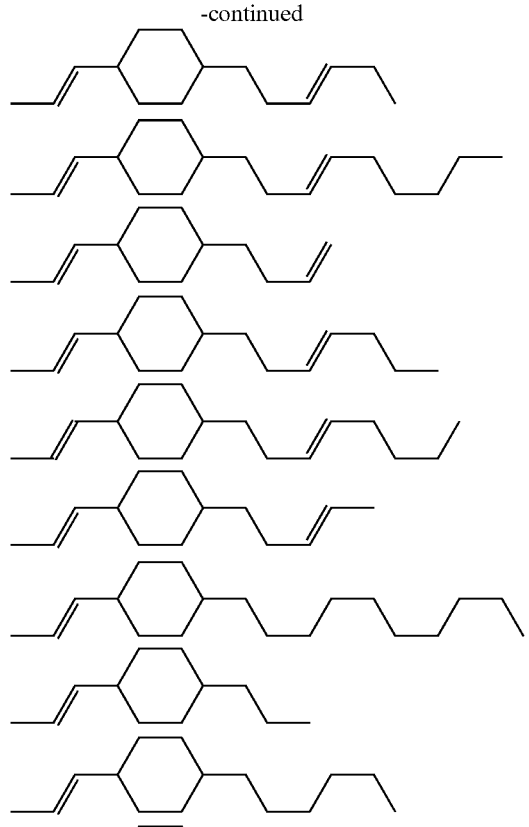

[Chem. 72]

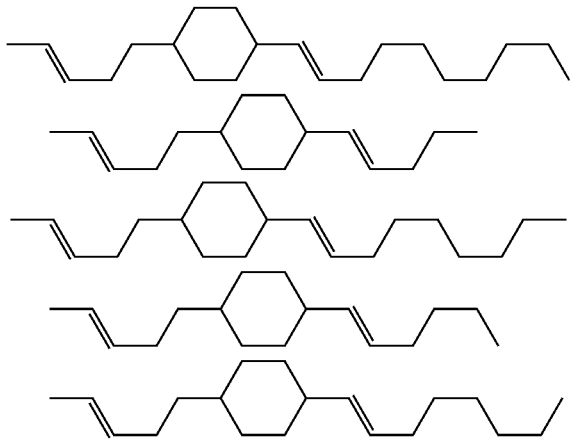

-continued

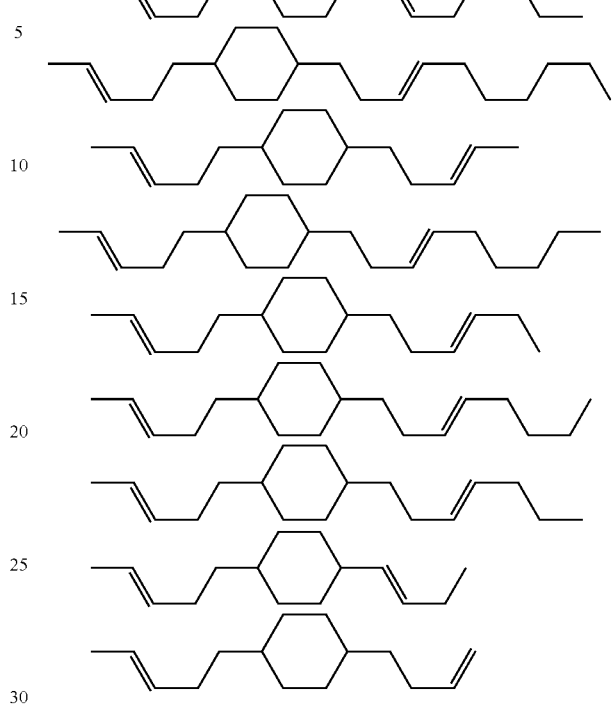

The liquid crystal composition of the present invention can further contain at least one compound represented by General Formula (VII).

[Chem. 73]

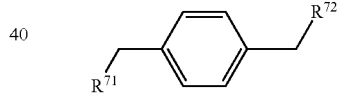

(VII)

(in the formula, $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms)

Such compounds can be used in any combination; on the basis of desired properties such as solubility at low temperature, transition temperature, electric reliability, and birefringence, it is preferred that one to three of such compounds be used, it is more preferred that one to four of the compounds be used, and it is especially preferred that one to five or more of the compounds be used. The amount thereof is preferably up to 35 mass %, more preferably up to 25 mass %, and further preferably up to 15 mass %.

In particular, preferred examples of usable compounds represented by General Formula (VII) include the following compounds.

[Chem. 74]

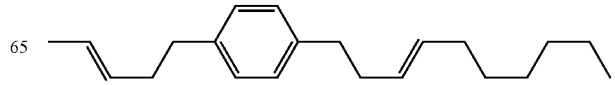

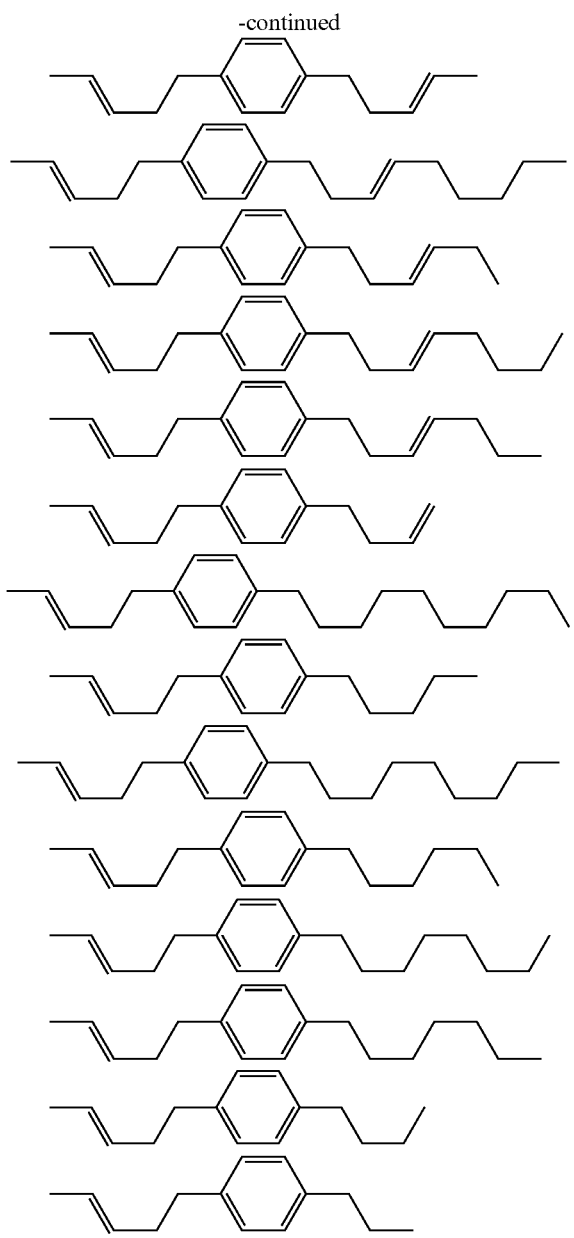

The liquid crystal composition of the present invention also preferably contains any of compounds represented by General Formula (M).

[Chem. 75]

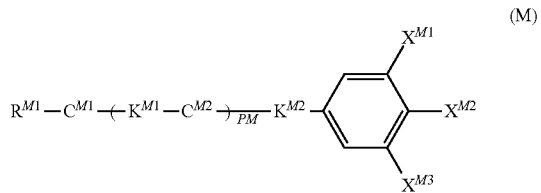

(in the formula, $R^{M1}$ represents an alkyl group having 1 to 8 carbon atoms, and one —$CH_2$— group or two or more —$CH_2$— groups not adjoining each other in the alkyl group are each independently optionally substituted with —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —$CH_2$— group or two or more —$CH_2$— groups not adjoining each other are optionally substituted with —O— or —S—) and (e) a 1,4-phenylene group (of which one —CH= group or two or more —CH= groups not adjoining each other are optionally substituted with —N=), and the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the multiple $K^{M1}$'s are the same as or different from each other; in the case where PM is 2, 3, or 4 and where $C^{M2}$ is multiple, the multiple $C^{M2}$'s are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (i))

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven or more of the compounds are used.

In the liquid crystal composition of the present invention, the amount of the compound represented by General Formula (M) needs to be appropriately adjusted on the basis of predetermined properties such as solubility at low temperature, transition temperature, electric reliability, birefringence, process adaptability, droplet stains, screen burn-in, and dielectric anisotropy.

The preferred lower limit of the amount is, for example, 1% in an embodiment of the present invention, 10% in another embodiment of the present invention, 20% in another embodiment of the present invention, 30% in another embodiment of the present invention, 40% in another embodiment of the present invention, 45% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, or 80% in another embodiment of the present invention relative to the total amount of the liquid crystal composition of the present invention.

The preferred upper limit of the amount is, for instance, 95% in an embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, or 25% in another embodiment of the present invention relative to the total amount of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to have a high temperature stability, it is preferred that the above-mentioned lower limit be low and that the upper limit be low. In order to increase dielectric anisotropy for keeping driving voltage at a low level, it is preferred that the above-mentioned lower limit be high and that the upper limit be high.

In the case where the ring structure bonded to $R^{M1}$ is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms; in the case where the ring structure bonded to $R^{M1}$ is a saturated ring such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

In the case where the ring structure bonded to $R^{M1}$ is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms; in the case where the ring structure bonded to $R^{M1}$ is a saturated ring such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms. In the case where the liquid crystal composition needs to be chemically stable, it is preferred that the molecules of the compound represented by General Formula (M) be free from a chlorine atom. The amount of a chlorine-atom-containing compound in the liquid crystal composition is preferably not more than 5%, also preferably not more than 3%, also preferably not more than 1%, and also preferably not more than 0.5%; and it is also preferred that the liquid crystal composition be substantially free from a chlorine-atom-containing compound. The term "substantially free from a chlorine-atom-containing compound" refers to that only a compound unavoidably containing a chlorine atom, such as a compound generated as an impurity in production of another compound, is contained in the liquid crystal composition.

The compound represented by General Formula (M) is, for instance, preferably a compound selected from the group consisting of compounds represented by General Formula (VIII).

[Chem. 76]

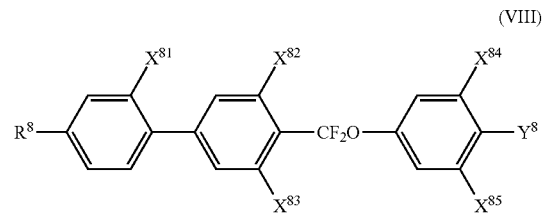

(VIII)

(in the formula, $R^8$ represents an alkyl group having 1 to 5 carbon atoms, an alkenyl group having 2 to 5 carbon atoms, or an alkoxy group having 1 to 4 carbon atoms; $X^{81}$ to $X^{85}$ each independently represent a hydrogen atom or a fluorine atom; and $Y^8$ represents a fluorine atom or —$OCF_3$)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

In the liquid crystal composition of the present invention, the amount of the compound represented by General Formula (VIII) needs to be appropriately adjusted on the basis of predetermined properties such as solubility at low temperature, transition temperature, electric reliability, birefringence, process adaptability, droplet stains, screen burn-in, and dielectric anisotropy.

The preferred lower limit of the amount is, for example, 2% in an embodiment of the present invention, 4% in another embodiment of the present invention, 5% in another embodiment of the present invention, 6% in another embodiment of the present invention, 7% in another embodiment of the present invention, 8% in another embodiment of the present invention, 9% in another embodiment of the present invention, 10% in another embodiment of the present invention, 11% in another embodiment of the present invention, 12% in another embodiment of the present invention, 14% in another embodiment of the present invention, 15% in another embodiment of the present invention, 21% in another embodiment of the present invention, or 23% in another embodiment of the present invention relative to the total amount of the liquid crystal composition of the present invention.

The preferred upper limit of the amount is, for instance, 40% in an embodiment of the present invention, 30% in another embodiment of the present invention, 25% in another embodiment of the present invention, 21% in another embodiment of the present invention, 16% in another embodiment of the present invention, 12% in another embodiment of the present invention, 8% in another embodiment of the present invention, or 5% in another embodiment of the present invention relative to the total amount of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to have a high temperature stability, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (VIII) is preferably any of compounds represented by General Formula (VIII-1).

[Chem. 77]

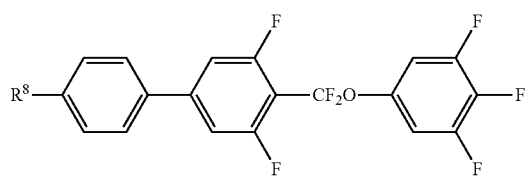
(VIII-1)

(in the formula, $R^8$ represents an alkyl group having 1 to 5 carbon atoms, an alkenyl group having 2 to 5 carbon atoms, or an alkoxy group having 1 to 4 carbon atoms)

Such compounds can be used in any combination; a combination of the compounds can be determined on the basis of desired properties such as solubility at low temperature, transition temperature, electric reliability, and birefringence. In an embodiment of the present invention, for example, one of such compounds is used. In another embodiment of the present invention, two or more of the compounds are used.

In particular, the compound represented by General Formula (VIII-1) is preferably any of compounds represented by Formulae (26.1) to (26.4); among these, the compound represented by Formula (26.1) or (26.2) is preferably employed, and the compound represented by Formula (26.2) is more preferably employed.

[Chem. 78]

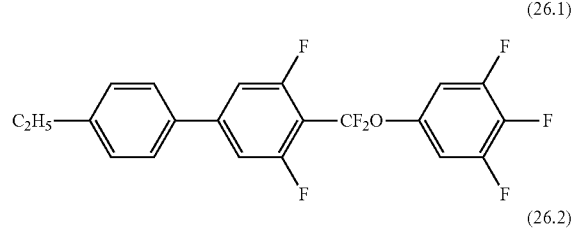
(26.1)

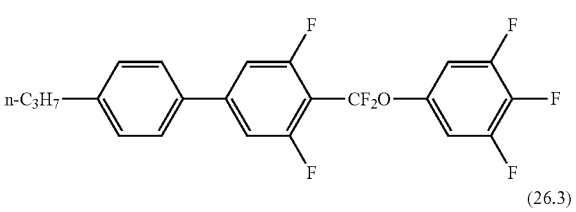
(26.2)

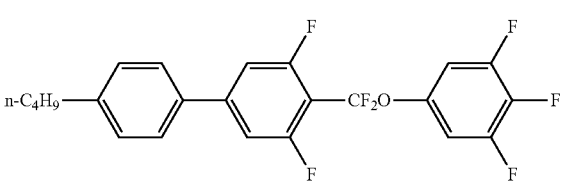
(26.3)

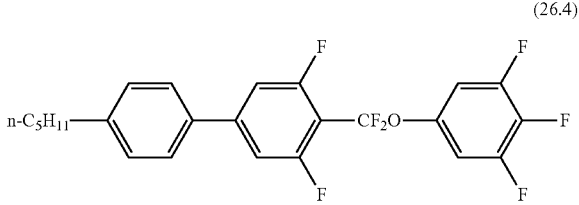
(26.4)

The amount of the compound represented by Formula (26.2) is preferably not less than 2 mass %, and more preferably not less than 4 mass % relative to the total amount of the liquid crystal composition of the present invention in view of solubility at low temperature, transition temperature, electric reliability, birefringence, and another property. The amount is preferably up to 40 mass %, more preferably up to 35 mass %, further preferably up to 30 mass %, and especially preferably up to 25 mass % in view of solubility at low temperature, transition temperature, electric reliability, and another property.

The compound represented by General Formula (VIII) is preferably any of compounds represented by General Formula (VIII-2).

[Chem. 79]

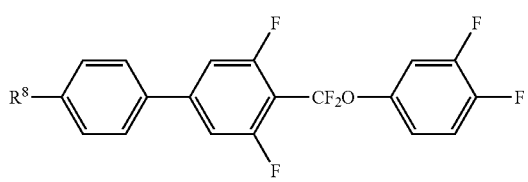
(VIII-2)

(in the formula, $R^8$ represents an alkyl group having 1 to 5 carbon atoms, an alkenyl group having 2 to 5 carbon atoms, or an alkoxy group having 1 to 4 carbon atoms)

Such compounds can be used in any combination; a combination of the compounds can be determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (VIII-2) is preferably not less than 2.5 mass %, more preferably not less than 8 mass %, further preferably 10 mass %, and further preferably not less than 12 mass % in view of solubility at low temperature, transition temperature, electric reliability, birefringence, and another property. The amount is preferably up to 25 mass %, more preferably up to 20 mass %, and further preferably up to 15 mass %.

The compound represented by General Formula (VIII-2) is preferably any of compounds represented by Formulae (27.1) to (27.4); among these, the compound represented by Formula (27.2) is preferably employed.

[Chem. 80]

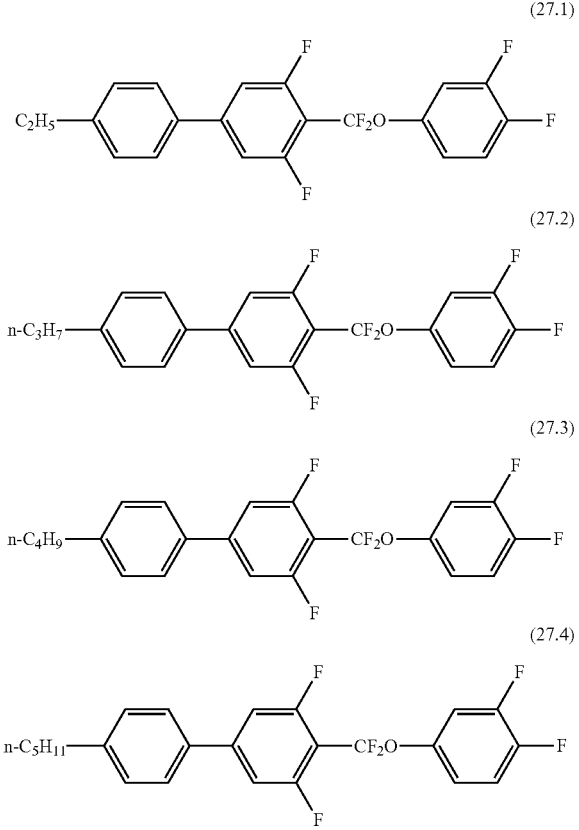

The compound represented by General Formula (M) is, for instance, preferably a compound selected from the group consisting of compounds represented by General Formula (IX).

[Chem. 81]

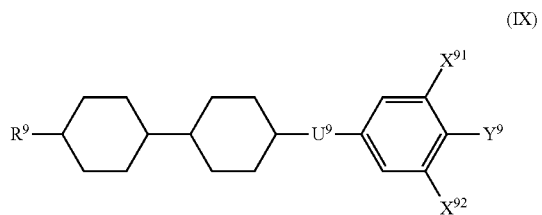

(in the formula, $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; $Y^9$ represents a fluorine atom, a chlorine atom, or —$OCF_3$; and $U^9$ represents a single bond, —COO—, or —$CF_2O$—)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (Ix) needs to be appropriately adjusted on the basis of predetermined properties such as solubility at low temperature, transition temperature, electric reliability, birefringence, process adaptability, droplet stains, screen burn-in, and dielectric anisotropy.

The preferred lower limit of the amount is, for example, 3% in an embodiment of the present invention, 5% in another embodiment of the present invention, 8% in another embodiment of the present invention, 10% in another embodiment of the present invention, 12% in another embodiment of the present invention, 15% in another embodiment of the present invention, 17% in another embodiment of the present invention, 20% in another embodiment of the present invention, 24% in another embodiment of the present invention, 28% in another embodiment of the present invention, 30% in another embodiment of the present invention, 34% in another embodiment of the present invention, 39% in another embodiment of the present invention, 40% in another embodiment of the present invention, 42% in another embodiment of the present invention, or 45% in another embodiment of the present invention relative to the total amount of the liquid crystal composition of the present invention.

The preferred upper limit of the amount is, for instance, 70% in an embodiment of the present invention, 60% in another embodiment of the present invention, 55% in another embodiment of the present invention, 50% in another embodiment of the present invention, 45% in another embodiment of the present invention, 40% in another embodiment of the present invention, 35% in another embodiment of the present invention, 30% in another embodiment of the present invention, 25% in another embodiment of the present invention, 20% in another embodiment of the present invention, 15% in another embodiment of the present invention, or 10% in another embodiment of the present invention relative to the total amount of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to serve for a reduction in screen burn-in, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (IX) is preferably any of compounds represented by General Formula (IX-1).

[Chem. 82]

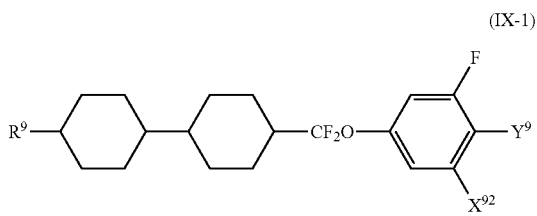

(IX-1)

(in the formula, $R^9$ represents an alkyl group having 1 to 5 carbon atoms, an alkenyl group having 2 to 5 carbon atoms, or an alkoxy group having 1 to 4 carbon atoms; $X^{92}$ represents a hydrogen atom or a fluorine atom; and $Y^9$ represents a fluorine atom or —$OCF_3$)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

The compound represented by General Formula (IX-1) is preferably any of compounds represented by General Formula (IX-1-1).

[Chem. 83]

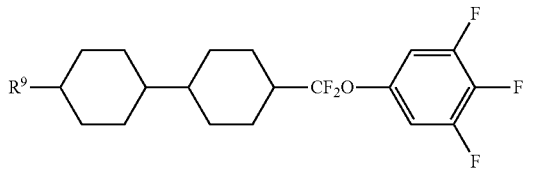

(IX-1-1)

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; a combination of the compounds is determined on the basis of desired properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The preferred upper limit and lower limit of the amount of the compound represented by General Formula (IX-1-1) are determined for an embodiment in view of solubility at low temperature, transition temperature, electric reliability, birefringence, and another property. The preferred lower limit of the amount is, for example, 1% in an embodiment, 2% in another embodiment, 4% in another embodiment, 10% in another embodiment, 14% in another embodiment, 16% in another embodiment, or 21% in another embodiment relative to the total amount of the liquid crystal composition of the present invention.

The preferred upper limit of the amount is, for instance, 40% in an embodiment, 35% in another embodiment, 30% in another embodiment, 25% in another embodiment, 10% in another embodiment, 7% in another embodiment, or 5% in another embodiment.

The compound represented by General Formula (IX-1-1) is preferably any of compounds represented by Formulae (28.1) to (28.5); among these, the compound represented by Formula (28.3) and/or the compound represented by Formula (28.5) are preferably employed.

[Chem. 84]

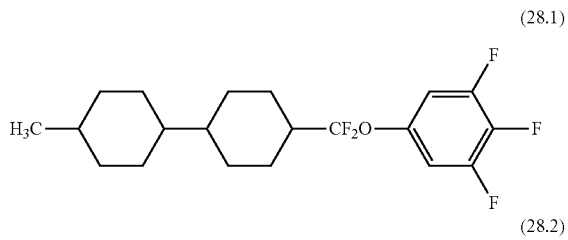

(28.1)

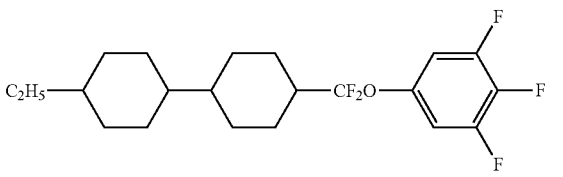

(28.2)

(28.3)

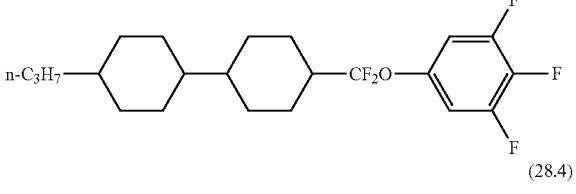

(28.4)

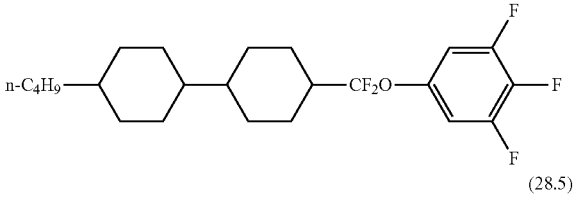

(28.5)

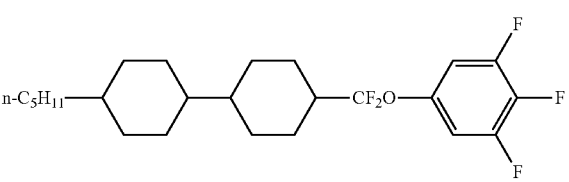

In the liquid crystal composition of the present invention, the amount of the compound represented by Formula (28.3) is preferably not less than 1 mass %, more preferably not less than 5 mass %, further preferably not less than 8 mass %, further preferably not less than 10 mass %, further preferably not less than 14 mass %, and especially preferably not less than 16 mass % relative to the total amount of the liquid crystal composition of the present invention. The amount is preferably up to 30 mass %, more preferably up to 25 mass %, further preferably up to 22 mass %, and especially preferably less than 20 mass % in view of solubility at low temperature, transition temperature, electric reliability, and another property.

In the liquid crystal composition of the present invention, the amount of the compound represented by Formula (28.5) is preferably not less than 3 mass %, more preferably not less than 7 mass %, and especially preferably not less than 10 mass % relative to the total amount of the liquid crystal composition of the present invention. The amount is preferably up to 25 mass %, more preferably less than 20 mass %, further preferably up to 15 mass %, and especially preferably less than 13 mass % in view of solubility at low temperature, transition temperature, electric reliability, and another property.

The compound represented by General Formula (IX-1) is preferably any of compounds represented by General Formula (IX-1-2).

[Chem. 85]

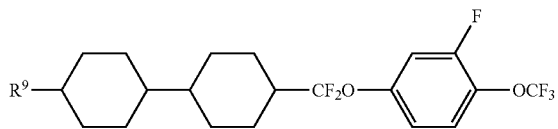

(IX-1-2)

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one to three of the compounds be used, and it is more preferred that one to four of the compounds be used.

The amount of the compound represented by General Formula (IX-1-2) is preferably not less than 1 mass %, more preferably not less than 5 mass %, further preferably not less than 8 mass %, further preferably not less than 10 mass %, further preferably not less than 14 mass %, and especially preferably not less than 16 mass % relative to the total amount of the liquid crystal composition of the present invention. The amount is preferably up to 30 mass %, more preferably up to 25 mass %, further preferably up to 22 mass %, and especially preferably less than 20 mass % in view of solubility at low temperature, transition temperature, electric reliability, and another property.

The compound represented by General Formula (IX-1-2) is preferably any of compounds represented by Formulae (29.1) to (29.4); among these, the compound represented by Formula (29.2) and/or the compound represented by Formula (29.4) are preferably employed.

[Chem. 86]

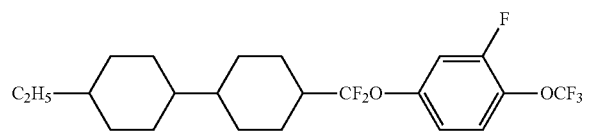

(29.1)

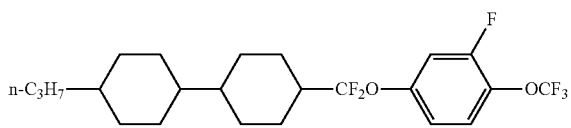

(29.2)

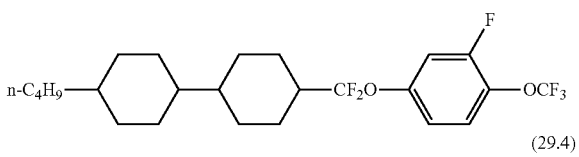

(29.3)

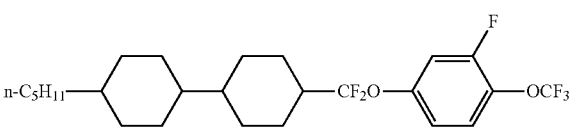

(29.4)

The compound represented by General Formula (IX) is preferably any of compounds represented by General Formula (IX-2).

[Chem. 87]

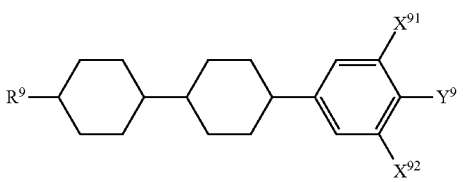

(IX-2)

(in the formula, $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$)

Such compounds can be used in any combination; a proper combination of the compounds for an embodiment is determined in view of solubility at low temperature, transition temperature, electric reliability, birefringence, and another property. For example, one of such compounds is used in an embodiment of the present invention; two of the compounds are used in another embodiment, three of the compounds are used in another embodiment, four of the compounds are used in another embodiment, five of the compounds are used in another embodiment, and six or more of the compounds are used in another embodiment.

The compound represented by General Formula (IX-2) is preferably any of compounds represented by General Formula (IX-2-1).

[Chem. 88]

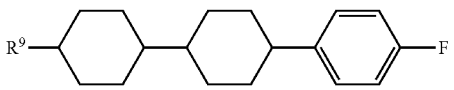

(IX-2-1)

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one to three of the compounds be used.

The preferred upper limit and lower limit of the amount of the compound represented by General Formula (IX-2-1) are determined for an embodiment in view of properties such as solubility at low temperature, transition temperature, electric reliability, and birefringence. The lower limit of the amount is, for example, 1% in an embodiment of the present invention, 2% in another embodiment, 4% in another embodiment, 10% in another embodiment, 14% in another embodiment, 16% in another embodiment, or 21% in another embodiment relative to the total amount of the liquid crystal composition of the present invention. The upper limit of the amount is, for instance, 40% in an embodiment of the present invention, 35% in another embodiment, 30% in another embodiment, 25% in another embodiment, 22% in another embodiment, 20% in another embodiment, 10% in another embodiment, 7% in another embodiment, or 5% in another embodiment.

The compound represented by General Formula (IX-2-1) is preferably any of compounds represented by Formulae (30.1) to (30.4); among these, any of the compounds represented by Formula (30.1) and (30.2) is preferably employed.

[Chem. 89]

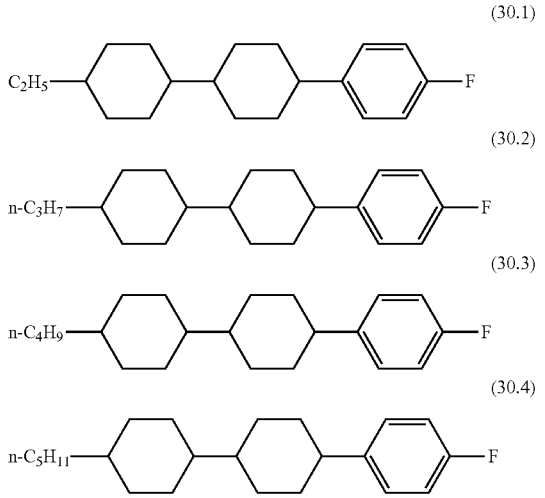

The compound represented by General Formula (IX-2) is preferably any of compounds represented by General Formula (IX-2-2).

[Chem. 90]

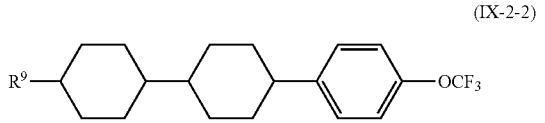

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one to three of the compounds be used, and it is more preferred that one to four of the compounds be used.

The upper limit and lower limit of the amount of the compound represented by General Formula (IX-2-2) are determined for an embodiment in view of properties such as solubility at low temperature, transition temperature, electric reliability, and birefringence. The lower limit of the amount is, for example, 1% in an embodiment of the present invention, 2% in another embodiment, 4% in another embodiment, 10% in another embodiment, 14% in another embodiment, 16% in another embodiment, or 21% in another embodiment relative to the total amount of the liquid crystal composition of the present invention. The upper limit of the amount is, for instance, 40% in an embodiment of the present invention, 35% in another embodiment, 30% in another embodiment, 25% in another embodiment, 22% in another embodiment, 15% in another embodiment, 12% in another embodiment, 8% in another embodiment, or 4% in another embodiment.

The compound represented by General Formula (IX-2-2) is preferably any of compounds represented by Formulae (31.1) to (31.4); among these, any of the compounds represented by Formulae (31.1) to (31.4) is preferably employed.

[Chem. 91]

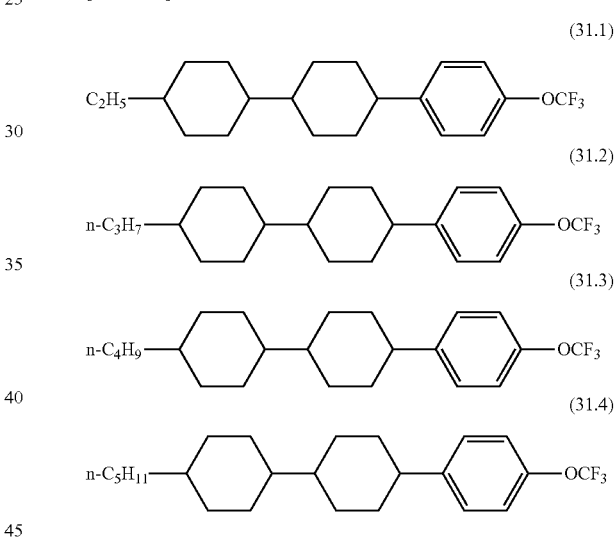

The compound represented by General Formula (IX-2) is preferably any of compounds represented by General Formula (IX-2-3).

[Chem. 92]

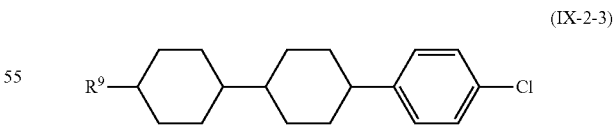

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two of the compounds be used.

The amount of the compound represented by General Formula (IX-2-3) is preferably not less than 1 mass %, more preferably not less than 3 mass %, further preferably not less than 6 mass %, further preferably not less than 8 mass %, and especially preferably not less than 15 mass % relative to the total amount of the liquid crystal composition of the present invention. The amount is preferably up to 30 mass %, more preferably less than 20 mass %, further preferably up to 15 mass %, and especially preferably less than 10 mass % in view of solubility at low temperature, transition temperature, electric reliability, and another property.

The compound represented by General Formula (IX-2-3) is preferably any of compounds represented by Formulae (32.1) to (32.4); among these, the compound represented by Formula (32.2) and/or the compound represented by Formula (32.4) are preferably employed.

[Chem. 93]

(32.1)

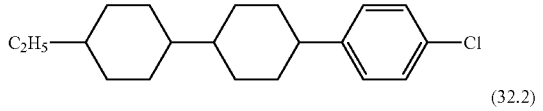
(32.2)

(32.3)

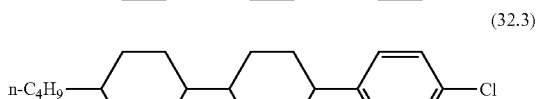
(32.4)

The compound represented by General Formula (IX-2) is preferably any of compounds represented by General Formula (IX-2-4).

[Chem. 94]

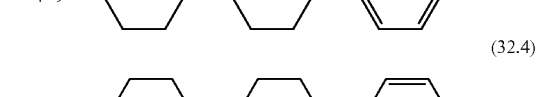
(IX-2-4)

(in the formula, $R^9$ represents an alkyl group having 1 to 5 carbon atoms, an alkenyl group having 2 to 5 carbon atoms, or an alkoxy group having 1 to 4 carbon atoms)

The amount of the compound represented by General Formula (IX-2-4) is preferably not less than 1 mass %, more preferably not less than 3 mass %, further preferably not less than 6 mass %, and especially preferably not less than 8 mass % relative to the total amount of the liquid crystal composition of the present invention. The amount is preferably up to 30 mass %, more preferably up to 20 mass %, further preferably up to 15 mass %, and especially preferably less than 10 mass % in view of solubility at low temperature, transition temperature, electric reliability, and another property.

The compound represented by General Formula (IX-2-4) is preferably any of compounds represented by Formulae (33.1) to (33.5); in particular, the compound represented by Formula (33.1) and/or the compound represented by Formula (33.3) are preferably employed.

[Chem. 95]

(33.1)

(33.2)

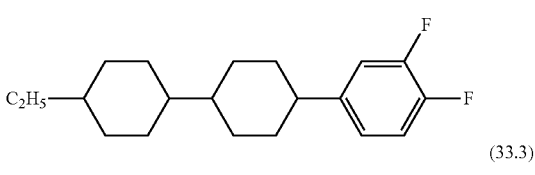
(33.3)

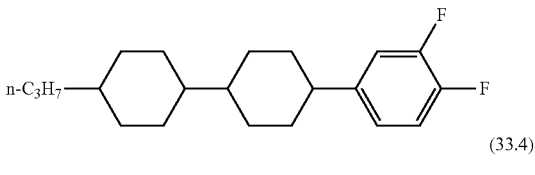
(33.4)

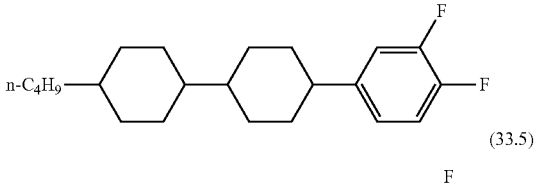
(33.5)

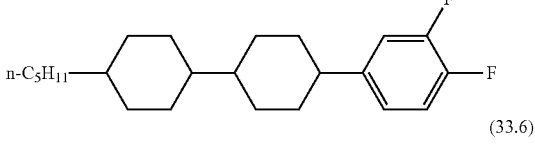
(33.6)

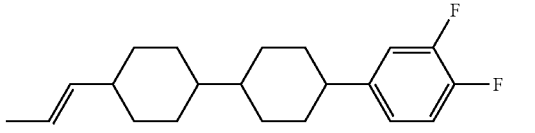

The compound represented by General Formula (IX-2) is preferably any of compounds represented by General Formula (IX-2-5).

[Chem. 96]

(IX-2-5)

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment, three of the compounds are used in another embodiment, and four or more of the compounds are used in another embodiment.

The upper limit and lower limit of the amount of the compound represented by General Formula (IX-2-5) are determined for an embodiment in view of properties such as solubility at low temperature, transition temperature, electric reliability, and birefringence. The lower limit of the amount is, for example, 4% in an embodiment of the present invention, 8% in another embodiment, 12% in another embodiment, 21% in another embodiment, 30% in another embodiment, 31% in another embodiment, or 34% in another embodiment relative to the total amount of the liquid crystal composition of the present invention. The upper limit of the amount is, for instance, 45% in an embodiment of the present invention, 40% in another embodiment, 35% in another embodiment, 32% in another embodiment, 22% in another embodiment, 13% in another embodiment, 9% in another embodiment, 8% in another embodiment, or 5% in another embodiment.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to serve for a reduction in screen-burn in, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (IX-2-5) is preferably any of compounds represented by Formulae (34.1) to (34.5); in particular, the compound represented by Formula (34.1), the compound represented by Formula (34.2), the compound represented by Formula (34.3), and/or the compound represented by Formula (34.5) are preferably employed.

[Chem. 97]

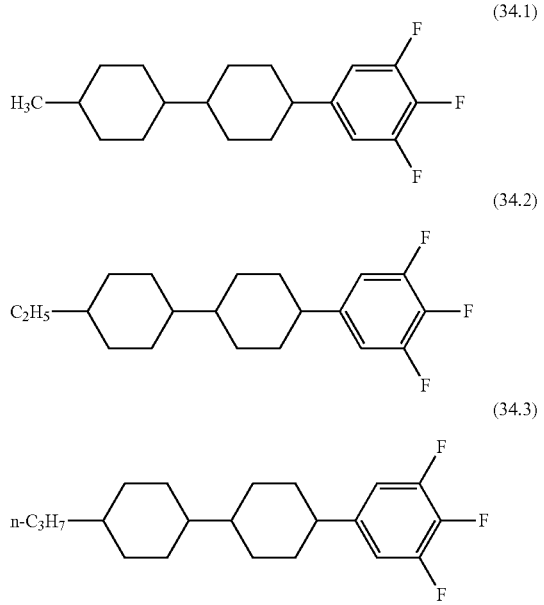

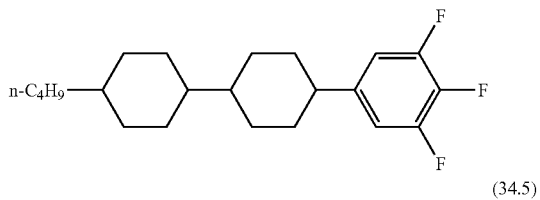

(34.4)

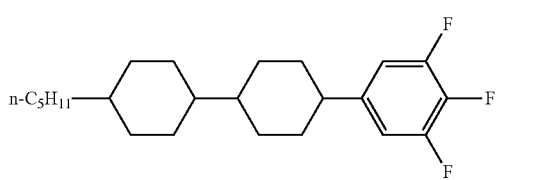

(34.5)

The compound represented by General Formula (IX) is preferably any of compounds represented by General Formula (IX-3).

[Chem. 98]

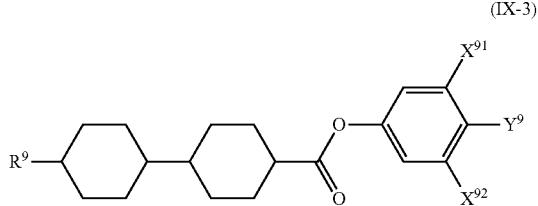

(IX-3)

(in the formula, $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$)

The compound represented by General Formula (IX-3) is preferably any of compounds represented by General Formula (IX-3-1).

[Chem. 99]

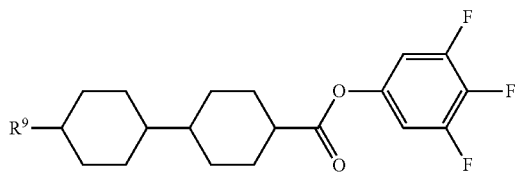

(IX-3-1)

(in the formula, $R^9$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two of the compounds be used.

The amount of the compound represented by General Formula (IX-3-1) is preferably not less than 3 mass %, more preferably not less than 7 mass %, further preferably not less than 13 mass %, and especially preferably not less than 15 mass % relative to the total amount of the liquid crystal composition of the present invention. The amount of the compound is preferably up to 30 mass %, more preferably up to 20 mass %, further preferably up to 18%, and especially preferably less than 10 mass % in view of solubility at low temperature, transition temperature, electric reliability, and another property.

The compound represented by General Formula (IX-3-1) is preferably any of compounds represented by Formulae (35.1) to (35.4); in particular, the compound represented by Formula (35.1) and/or the compound represented by Formula (35.2) are preferably employed.

[Chem. 100]

(35.1)

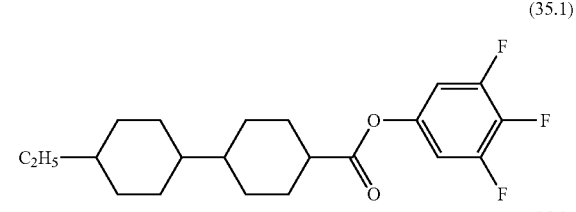

(35.2)

(35.3)

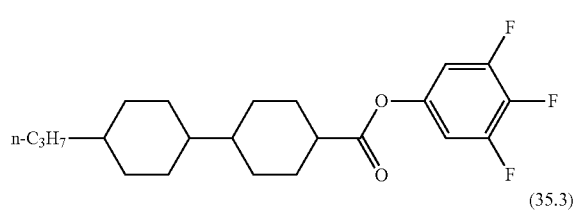

(35.4)

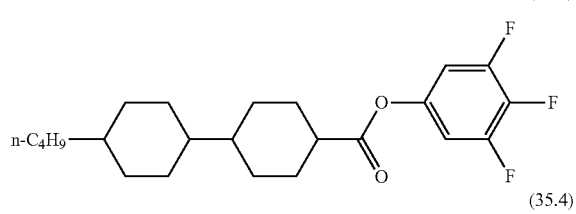

The compound represented by General Formula (M) is preferably any of compounds represented by General Formula (X).

[Chem. 101]

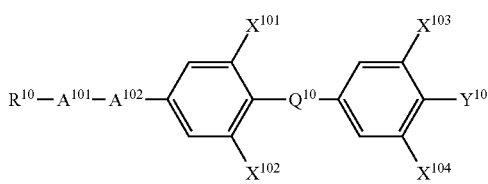

(X)

(in the formula, $X^{101}$ to $X^{104}$ each independently represent a fluorine atom or a hydrogen atom; $Y^{10}$ represents a fluorine atom, a chlorine atom, or —$OCF_3$; $Q^{10}$ represents a single bond or —$CF_2O$—; $R^{10}$ represents an alkyl group having 1 to 5 carbon atoms, an alkenyl group having 2 to 5 carbon atoms, or an alkoxy group having 1 to 4 carbon atoms; and $A^{101}$ and $A^{102}$ each independently represent a 1,4-cyclohexylene group, a 1,4-phenylene group, or any of groups represented by the following formulae, and

[Chem. 102]

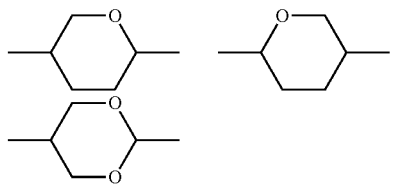

a hydrogen atom of the 1,4-phenylene group is optionally substituted with a fluorine atom, where the compound represented by General Formula (X) excludes the compound represented by General Formula (i))

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The upper limit and lower limit of the amount of the compound represented by General Formula (X) are determined for an embodiment in view of properties such as solubility at low temperature, transition temperature, electric reliability, and birefringence. The lower limit of the amount is, for example, 2% in an embodiment of the present invention, 3% in another embodiment, 6% in another embodiment, 8% in another embodiment, 9% in another embodiment, 11% in another embodiment, 12% in another embodiment, 18% in another embodiment, 19% in another embodiment, 23% in another embodiment, or 25% in another embodiment relative to the total amount of the liquid crystal composition of the present invention. The upper limit of the amount is, for instance, 45% in an embodiment of the present invention, 35% in another embodiment, 30% in another embodiment, 25% in another embodiment, 20% in another embodiment, 13% in another embodiment, 9% in another embodiment, 6% in another embodiment, or 3% in another embodiment.

In the case where the liquid crystal composition of the present invention needs to have a viscosity kept at a low level to contribute to a high response speed, it is preferred that the above-mentioned lower limit be low and that the upper limit be low. In the case where the liquid crystal composition needs to serve for a reduction in screen burn-in, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (X), which is used in the liquid crystal composition of the present invention, is preferably any of compounds represented by General Formula (X-1).

[Chem. 103]

(X-1)

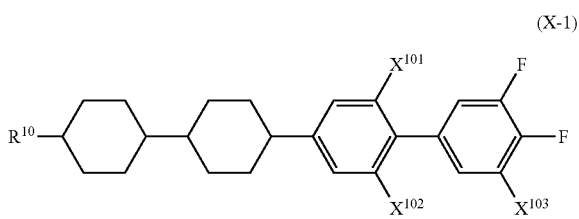

(in the formula, $X^{101}$ to $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms, where the compound represented by General Formula (X-1) excludes the compound represented by General Formula (i))

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The upper limit and lower limit of the amount of the compound represented by General Formula (X-1) are determined for an embodiment in view of properties such as solubility at low temperature, transition temperature, electric reliability, and birefringence. The lower limit of the amount is, for example, 2% in an embodiment of the present invention, 3% in another embodiment, 5% in another embodiment, 6% in another embodiment, 7% in another embodiment, 8% in another embodiment, 9% in another embodiment, 13% in another embodiment, 18% in another embodiment, or 23% in another embodiment relative to the total amount of the liquid crystal composition of the present invention.

The upper limit of the amount is, for instance, 40% in an embodiment of the present invention, 30% in another embodiment, 25% in another embodiment, 20% in another embodiment, 15% in another embodiment, 10% in another embodiment, 6% in another embodiment, 4% in another embodiment, or 2% in another embodiment.

The compound represented by General Formula (X-1), which is used in the liquid crystal composition of the present invention, is preferably any of compounds represented by General Formula (X-1-1).

[Chem. 104]

(X-1-1)

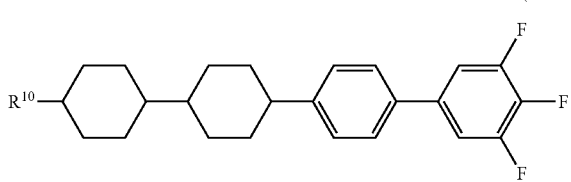

(in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; a proper combination of the compounds for an embodiment is determined in view of solubility at low temperature, transition temperature, electric reliability, birefringence, and another property. For instance, one of such compounds is used in an embodiment of the present invention, two of the compounds are used in another embodiment of the present invention, three of the compounds are used in another embodiment, and four or more of the compounds are used in another embodiment.

The upper limit and lower limit of the amount of the compound represented by General Formula (X-1-1) are determined for an embodiment in view of properties such as solubility at low temperature, transition temperature, electric reliability, and birefringence. The lower limit of the amount is, for example, 3% in an embodiment of the present invention, 4% in another embodiment, 6% in another embodiment, 9% in another embodiment, 12% in another embodiment, 15% in another embodiment, 18% in another embodiment, or 21% in another embodiment relative to the total amount of the liquid crystal composition of the present invention.

The upper limit of the amount is, for instance, 30% in an embodiment of the present invention, 20% in another embodiment, 13% in another embodiment, 10% in another embodiment, 7% in another embodiment, or 3% in another embodiment.

In particular, the compound represented by General Formula (X-1-1), which is used in the liquid crystal composition of the present invention, is preferably any of compounds represented by Formulae (36.1) to (36.4); among these, the compound represented by Formula (36.1) and/or the compound represented by Formula (36.2) are preferably used.

[Chem. 105]

(36.1)

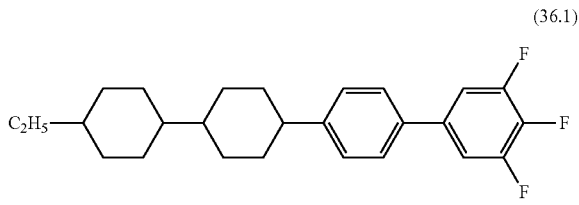

(36.2)

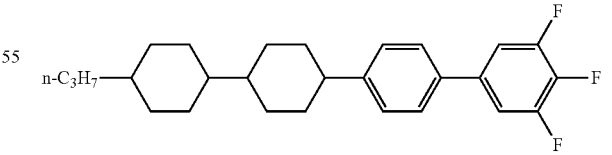

(36.3)

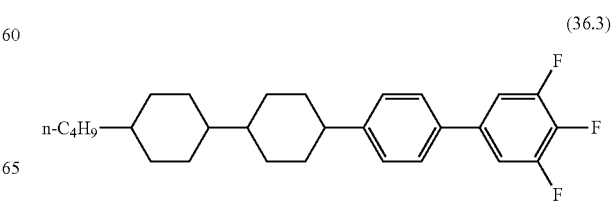

-continued (36.4)

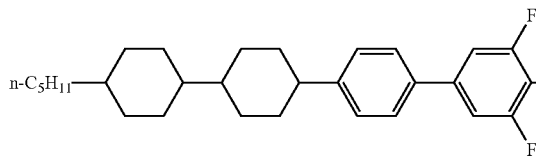

The compound represented by General Formula (X-1), which is used in the liquid crystal composition of the present invention, is preferably any of compounds represented by General Formula (X-1-3).

[Chem. 106]

(X-1-3)

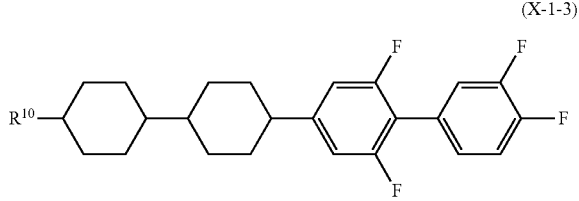

(in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; one or more of the compounds are preferably used in view of solubility at low temperature, transition temperature, electric reliability, birefringence, and another property.

The amount of the compound represented by General Formula (X-1-3) is preferably not less than 1 mass %, more preferably not less than 2 mass %, and further preferably not less than 6 mass % relative to the total amount of the liquid crystal composition of the present invention. The amount is preferably up to 20 mass %, more preferably up to 16 mass %, further preferably up to 12 mass %, and especially preferably up to 10 mass % in view of solubility at low temperature, transition temperature, electric reliability, and another property.

In particular, the compound represented by General Formula (X-1-3), which is used in the liquid crystal composition of the present invention, is preferably any of compounds represented by Formula (38.1) to (38.4); among these, the compound represented by Formula (38.2) is preferably used.

[Chem. 107]

(38.1)

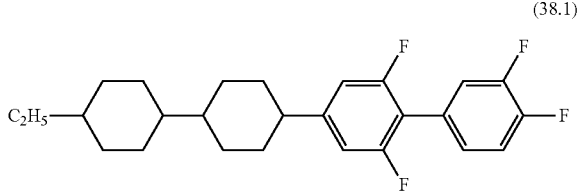

(38.2)

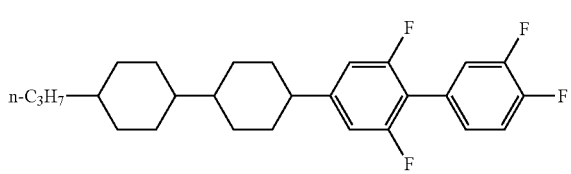

-continued (38.3)

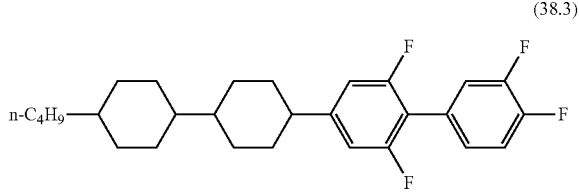

(38.4)

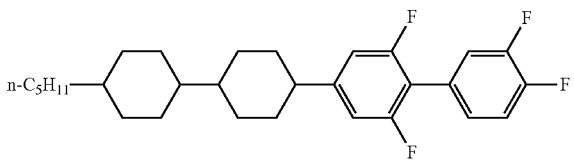

The compound represented by General Formula (X), which is used in the liquid crystal composition of the present invention, is preferably any of compounds represented by General Formula (X-2).

[Chem. 108]

(X-2)

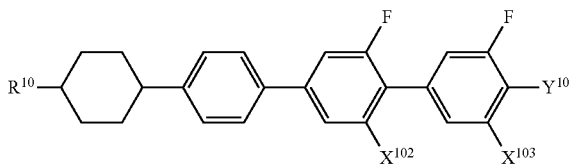

(in the formula, $X^{102}$ and $X^{103}$ each independently represent a fluorine atom or a hydrogen atom; $Y^{10}$ represents a fluorine atom, a chlorine atom, or $-OCF_3$; and $R^{10}$ represents an alkyl group having 1 to 5 carbon atoms, an alkenyl group having 2 to 5 carbon atoms, or an alkoxy group having 1 to 4 carbon atoms, where the compound represented by General Formula (X-2) excludes the compound represented by General Formula (i))

Such compounds can be used in any combination; in view of solubility at low temperature, transition temperature, electric reliability, birefringence, and another property, the compounds are preferably used alone or in combination.

The compound represented by General Formula (X-2), which is used in the liquid crystal composition of the present invention, is preferably any of compounds represented by General Formula (X-2-1).

[Chem. 109]

(X-2-1)

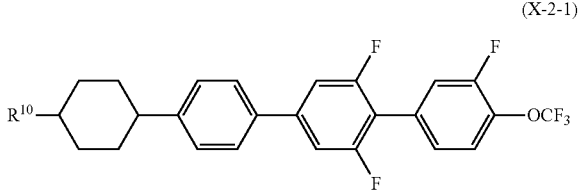

(in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

The amount of the compound represented by General Formula (X-2-1) is preferably not less than 3 mass %, more preferably not less than 4 mass %, and further preferably not less than 5 mass % relative to the total amount of the liquid crystal composition of the present invention. The amount is preferably up to 20 mass %, more preferably up to 16 mass %, further preferably up to 12 mass %, and especially preferably up to 10 mass % in view of solubility at low temperature, transition temperature, electric reliability, and another property.

In particular, the compound represented by General Formula (X-2-1), which is used in the liquid crystal composition of the present invention, is preferably any of compounds represented by Formulae (39.1) to (39.4); among these, the compound represented by Formula (39.2) is preferably used.

[Chem. 110]

(39.1)

$C_2H_5$—⬡—⬢—⬢—⬢—$OCF_3$ (39.2)

n-$C_3H_7$—⬡—⬢—⬢—⬢—$OCF_3$ (39.3)

n-$C_4H_9$—⬡—⬢—⬢—⬢—$OCF_3$ (39.4)

n-$C_5H_{11}$—⬡—⬢—⬢—⬢—$OCF_3$

The compound represented by General Formula (X-2), which is used in the liquid crystal composition of the present invention, is preferably any of compounds represented by General Formula (X-2-2).

[Chem. 111]

(X-2-2)

$R^{10}$—⬡—⬢—⬢—⬢—$OCF_3$ (in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, the compounds are preferably used alone or in combination.

The amount of the compound represented by General Formula (X-2-2) is preferably not less than 3 mass %, more preferably not less than 6 mass %, and further preferably not less than 9 mass % relative to the total amount of the liquid crystal composition of the present invention. The amount of the compound is preferably up to 20 mass %, more preferably up to 16 mass %, further preferably up to 12 mass %, and especially preferably up to 10 mass % in view of solubility at low temperature, transition temperature, electric reliability, and another property.

In particular, the compound represented by General Formula (X-2-2), which is used in the liquid crystal composition of the present invention, is preferably any of compounds represented by Formulae (40.1) to (40.4); among these, the compound represented by Formula (40.2) is preferably used.

[Chem. 112]

(40.1)

$C_2H_5$—⬡—⬢—⬢—⬢—$OCF_3$ (40.2)

n-$C_3H_7$—⬡—⬢—⬢—⬢—$OCF_3$ (40.3)

n-$C_4H_9$—⬡—⬢—⬢—⬢—$OCF_3$ (40.4)

n-$C_5H_{11}$—⬡—⬢—⬢—⬢—$OCF_3$

The compound represented by General Formula (X) is preferably any of compounds represented by General Formula (X-3).

[Chem. 113]

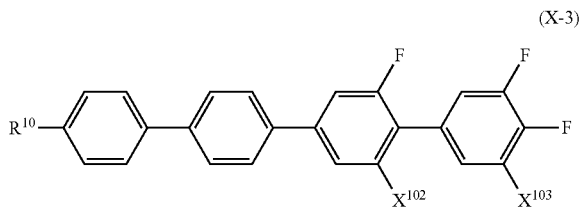

(X-3)

(in the formula, $X^{102}$ and $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms, where the compound represented by General Formula (X-3) excludes the compound represented by General Formula (i))

Such compounds can be used in any combination; in view of solubility at low temperature, transition temperature, electric reliability, birefringence, and another property, the compounds are preferably used alone or in combination.

The compound represented by General Formula (X) is preferably any of compounds represented by General Formula (X-4).

[Chem. 114]

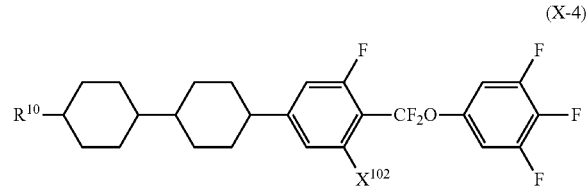

(X-4)

(in the formula, $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

The compound represented by General Formula (X-4), which is used in the liquid crystal composition of the present invention, is preferably any of compounds represented by General Formula (X-4-1).

[Chem. 115]

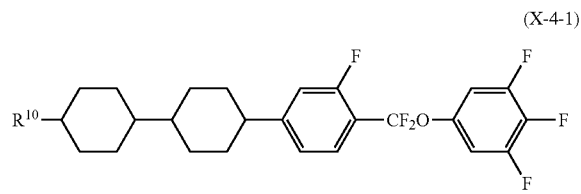

(X-4-1)

(in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

The amount of the compound represented by General Formula (X-4-1) is preferably not less than 2 mass %, more preferably not less than 5 mass %, and further preferably not less than 10 mass % relative to the total amount of the liquid crystal composition of the present invention. The amount is preferably up to 20 mass %, more preferably up to 17 mass %, further preferably up to 15 mass %, and especially preferably up to 13 mass % in view of solubility at low temperature, transition temperature, electric reliability, and another property.

In particular, the compound represented by General Formula (X-4-1), which is used in the liquid crystal composition of the present invention, is preferably any of compounds represented by Formulae (42.1) to (42.4); among these, the compound represented by Formula (42.3) is preferably used.

[Chem. 116]

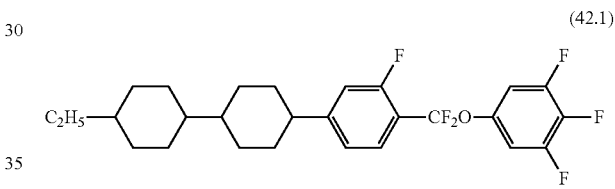

(42.1)

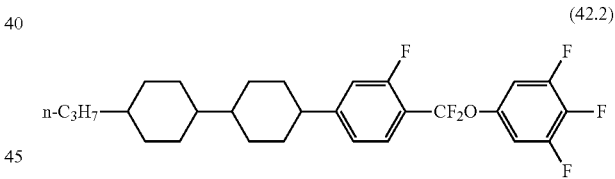

(42.2)

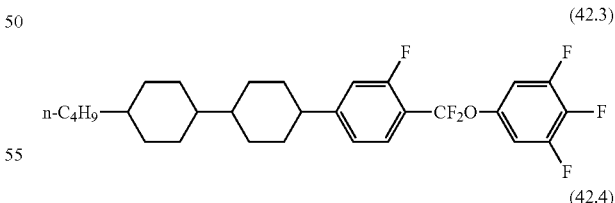

(42.3)

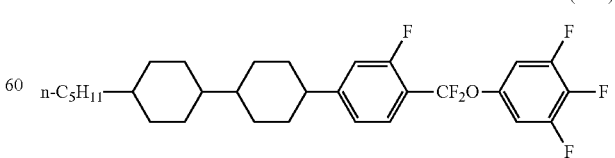

(42.4)

The compound represented by General Formula (X) is preferably any of compounds represented by General Formula (X-5).

[Chem. 117]

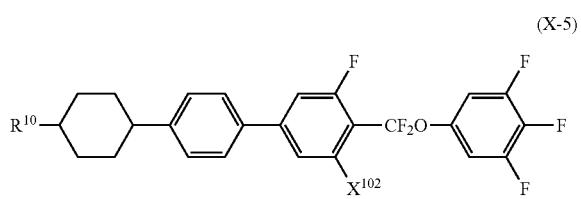

(X-5)

(in the formula, $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

The compound represented by General Formula (X-5), which is used in the liquid crystal composition of the present invention, is preferably any of compounds represented by General Formula (X-5-1).

[Chem. 118]

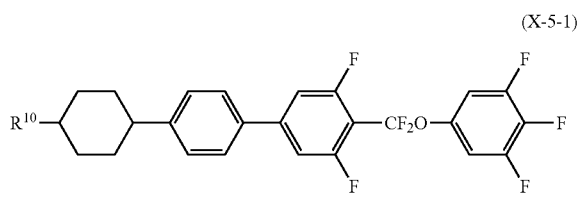

(X-5-1)

(in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

In particular, the compound represented by General Formula (X-5-1), which is used in the liquid crystal composition of the present invention, is preferably any of compounds represented by Formulae (43.1) to (43.4); among these, the compound represented by Formula (43.2) is preferably used.

[Chem. 119]

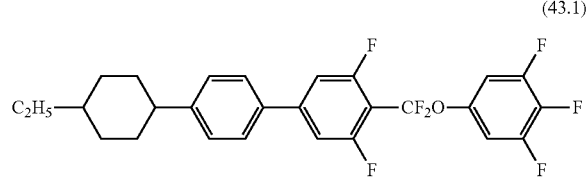

(43.1)

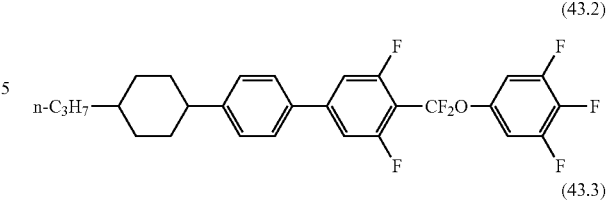

(43.2)

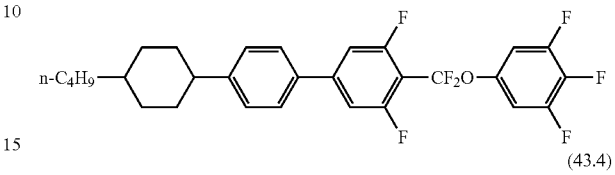

(43.3)

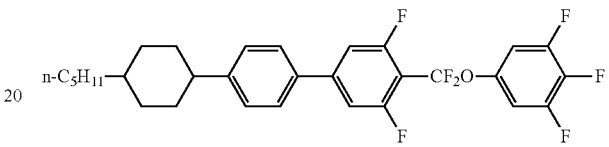

(43.4)

The compound represented by General Formula (X), which is used in the liquid crystal composition of the present invention, is preferably any of compounds represented by General Formula (X-6).

[Chem. 120]

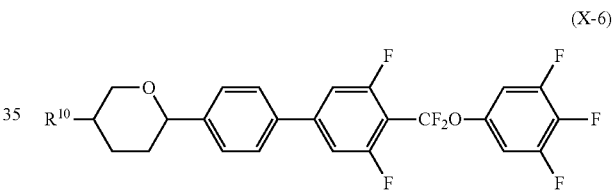

(X-6)

(in the formula, $R^{10}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, the compounds are preferably used alone or in combination.

The upper limit and lower limit of the amount of the compound represented by General Formula (X-6) are determined for an embodiment in view of properties such as solubility at low temperature, transition temperature, electric reliability, and birefringence. The lower limit of the amount is, for example, 4% in an embodiment of the present invention, 5% in another embodiment, 6% in another embodiment, 8% in another embodiment, 9% in another embodiment, 11% in another embodiment, 14% in another embodiment, or 18% in another embodiment relative to the total amount of the liquid crystal composition of the present invention.

The upper limit of the amount is, for instance, 30% in an embodiment of the present invention, 20% in another embodiment, 13% in another embodiment, 10% in another embodiment, 7% in another embodiment, or 3% in another embodiment.

In particular, the compound represented by General Formula (X-6), which is used in the liquid crystal composition of the present invention, is preferably any of compounds represented by Formulae (44.1) to (44.4); among these, the compound represented by Formula (44.1) and/or the compound represented by Formula (44.2) are preferably used.

[Chem. 121]

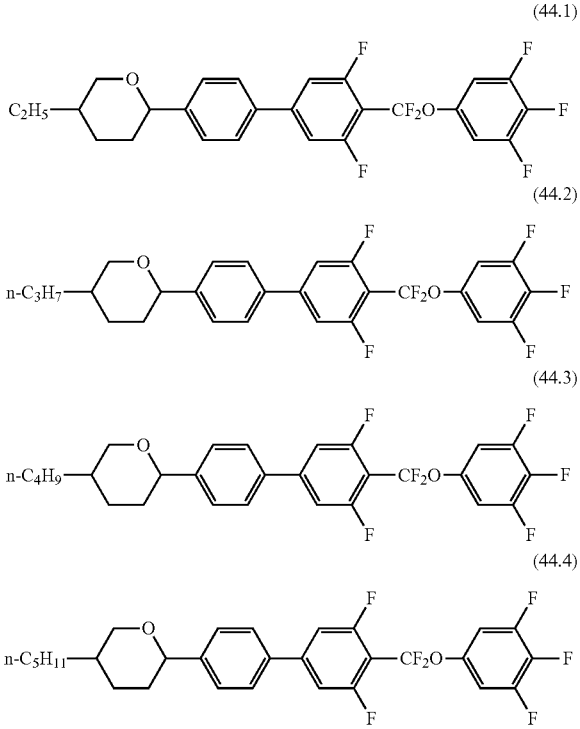

(44.1)

(44.2)

(44.3)

(44.4)

The compound represented by General Formula (L) or (X) is preferably a compound selected from the group consisting of compounds represented by General Formula (XI).

[Chem. 122]

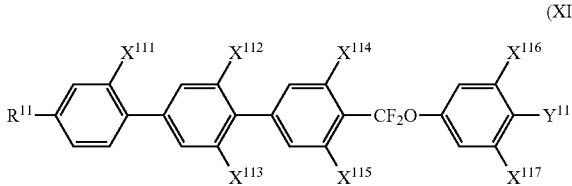

(XI)

(in the formula, $X^{111}$ to $X^{117}$ each independently represent a fluorine atom or a hydrogen atom, and at least one of $X^{111}$ to $X^{117}$ represents a fluorine atom; $R^{11}$ represents an alkyl group having 1 to 5 carbon atoms, an alkenyl group having 2 to 5 carbon atoms, or an alkoxy group having 1 to 4 carbon atoms; and $Y^{11}$ represents a fluorine atom or —$OCF_3$)

Such compounds can be used in any combination; for example, in view of solubility at low temperature, transition temperature, electric reliability, birefringence, and another property, it is preferred that one to three or more of the compounds be used.

The upper limit and lower limit of the amount of the compound represented by General Formula (XI) are determined for an embodiment in view of properties such as solubility at low temperature, transition temperature, electric reliability, and birefringence. The lower limit of the amount is, for example, 2% in an embodiment of the present invention, 4% in another embodiment, 5% in another embodiment, 7% in another embodiment, 9% in another embodiment, 10% in another embodiment, 12% in another embodiment, 13% in another embodiment, 15% in another embodiment, or 18% in another embodiment relative to the total amount of the liquid crystal composition of the present invention.

The upper limit of the amount is, for instance, 30% in an embodiment of the present invention, 25% in another embodiment, 20% in another embodiment, 15% in another embodiment, 10% in another embodiment, or 5% in another embodiment.

In the case where the liquid crystal composition of the present invention is used in a liquid crystal display device having a small cell gap, the appropriate amount of the compound represented by General Formula (XI) is at a higher level. In the case where the liquid crystal composition of the present invention is used in a liquid crystal display device which is driven at a small driving voltage, the appropriate amount of the compound represented by General Formula (XI) is at a higher level. In the case where the liquid crystal composition of the present invention is used in a liquid crystal display device which is used in a low-temperature environment, the appropriate amount of the compound represented by General Formula (XI) is at a lower level. In the case where the liquid crystal composition is used in a liquid crystal display device which quickly responds, the appropriate amount of the compound represented by General Formula (XI) is at a lower level.

The compound represented by General Formula (XI), which is used in the liquid crystal composition of the present invention, is preferably any of compounds represented by General Formula (XI-1).

[Chem. 123]

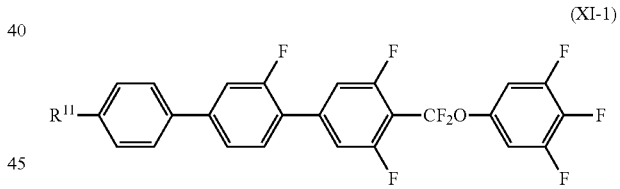

(XI-1)

(in the formula, $R^{11}$ represents an alkyl group having 1 to 5 carbon atoms, an alkenyl group having 2 to 5 carbon atoms, or an alkoxy group having 1 to 4 carbon atoms)

Such compounds can be used in any combination; a proper combination of the compounds for an embodiment can be determined in view of solubility at low temperature, transition temperature, electric reliability, birefringence, and another property. For example, one of the compounds is used in an embodiment of the present invention, two of the compounds are used in another embodiment, and three or more of the compounds are used in another embodiment.

The amount of the compound represented by General Formula (XI-1) is preferably not less than 1 mass %, more preferably not less than 2 mass %, further preferably not less than 3 mass %, further preferably not less than 4 mass %, further preferably not less than 6 mass %, and especially preferably not less than 9 mass % relative to the total amount of the liquid crystal composition of the present invention. The amount is preferably up to 20 mass %, more preferably up to 15 mass %, further preferably up to 12 mass %, and especially preferably up to 8 mass % in view of solubility at low temperature, transition temperature, electric reliability, and another property.

In particular, the compound represented by General Formula (XI-1), which is used in the liquid crystal composition of the present invention, is preferably any of compounds represented by Formulae (45.1) to (45.4); among these, any of the compounds represented by Formulae (45.2) to (45.4) is preferably used, and the compound represented by Formula (45.2) is more preferably used.

[Chem. 124]

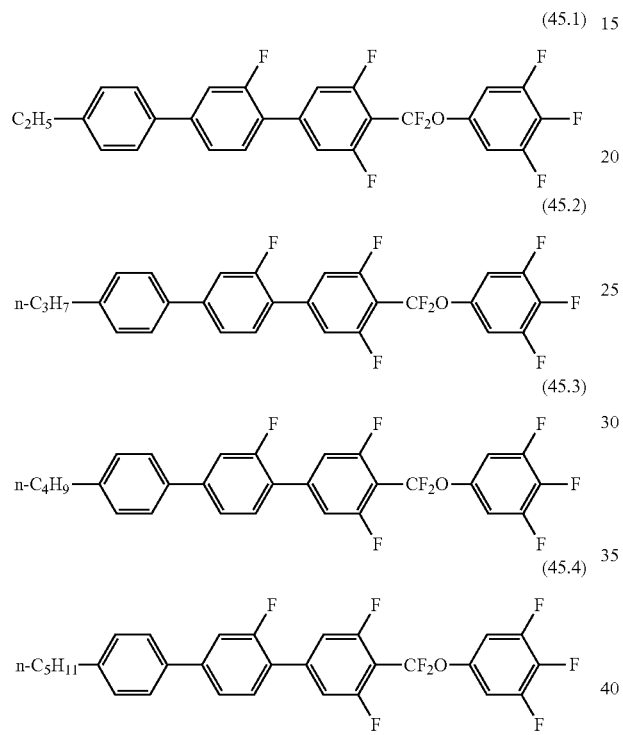

(45.1)
(45.2)
(45.3)
(45.4)

The compound represented by General Formula (L) or (X) is preferably a compound selected from the group consisting of compounds represented by General Formula (XII).

[Chem. 125]

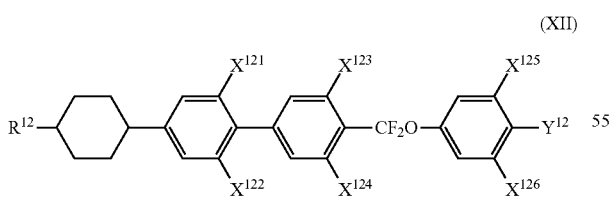

(XII)

(in the formula, $X^{121}$ to $X^{126}$ each independently represent a fluorine atom or a hydrogen atom; $R^{12}$ represents an alkyl group having 1 to 5 carbon atoms, an alkenyl group having 2 to 5 carbon atoms, or an alkoxy group having 1 to 4 carbon atoms; and $Y^{12}$ represents a fluorine atom or —OCF$_3$)

Such compounds can be used in any combination; in view of solubility at low temperature, transition temperature, electric reliability, birefringence, and another property, it is preferred that one to three or more of the compounds be used, and it is more preferred that one to four or more of the compounds be used.

The compound represented by General Formula (XII), which is used in the liquid crystal composition of the present invention, is preferably any of compounds represented by General Formula (XII-1).

[Chem. 126]

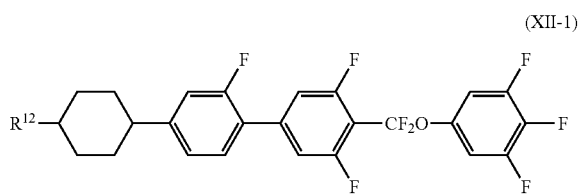

(XII-1)

(in the formula, $R^{12}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

The amount of the compound represented by General Formula (XII-1) is preferably not less than 1 mass %, more preferably not less than 2 mass %, further preferably not less than 3 mass %, and especially preferably not less than 4 mass % relative to the total amount of the liquid crystal composition of the present invention. The amount is preferably up to 15 mass %, more preferably up to 10 mass %, further preferably up to 8 mass %, and especially preferably up to 6 mass % in view of solubility at low temperature, transition temperature, electric reliability, and another property.

In particular, the compound represented by General Formula (XII-1), which is used in the liquid crystal composition of the present invention, is preferably any of compounds represented by Formulae (46.1) to (46.4); among these, any of the compounds represented by Formulae (46.2) to (46.4) is preferably employed.

[Chem. 127]

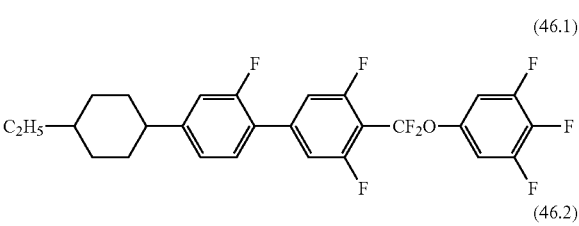

(46.1)
(46.2)

(46.3)
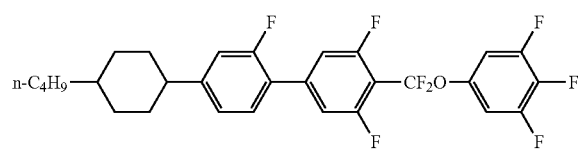

(46.4)
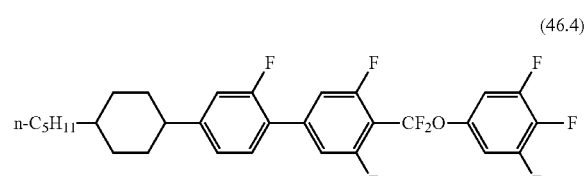

The compound represented by General Formula (XII) is preferably any of compounds represented by General Formula (XII-2).

[Chem. 128]

(XII-2)
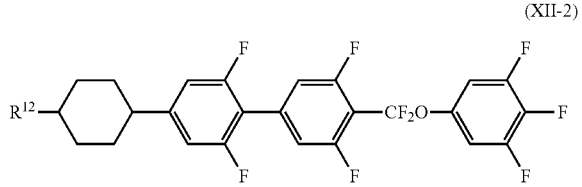

(in the formula, $R^{12}$ represents an alkyl group having 1 to 5 carbon atoms, an alkenyl group having 2 to 5 carbon atoms, or an alkoxy group having 1 to 4 carbon atoms)

Such compounds can be used in any combination; in view of solubility at low temperature, transition temperature, electric reliability, birefringence, and another property, it is preferred that one or two or more of the compounds be used, and it is more preferred that one to three or more of the compounds be used.

The amount of the compound represented by General Formula (XII-2) is preferably not less than 1 mass %, more preferably not less than 3 mass %, further preferably not less than 4 mass %, further preferably not less than 6 mass %, and especially preferably not less than 9 mass % relative to the total amount of the liquid crystal composition of the present invention. The amount of the compound is preferably up to 20 mass %, more preferably up to 17 mass %, further preferably up to 15 mass %, and especially preferably up to 13 mass % in view of solubility at low temperature, transition temperature, electric reliability, and another property.

In particular, the compound represented by General Formula (XII-2), which is used in the liquid crystal composition of the present invention, is preferably any of compounds represented by Formulae (47.1) to (47.4); among these, any of the compounds represented by Formulae (47.2) to (47.4) is preferably employed.

[Chem. 129]

(47.1)
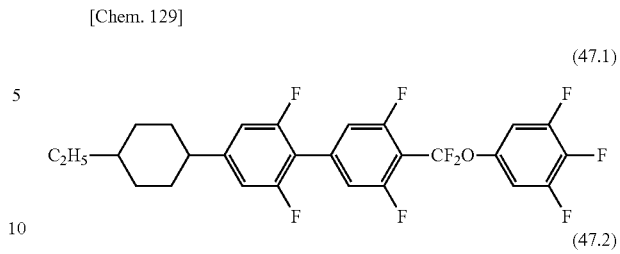

(47.2)

(47.3)
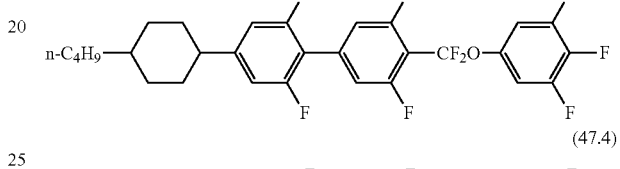

(47.4)
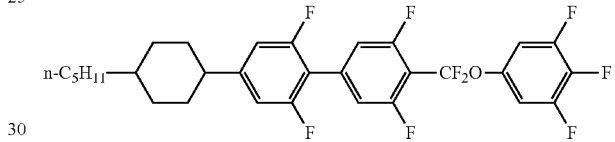

The compound represented by General Formula (M) is preferably a compound selected from the group consisting of compounds represented by General Formula (XIII).

[Chem. 130]

(XIII)
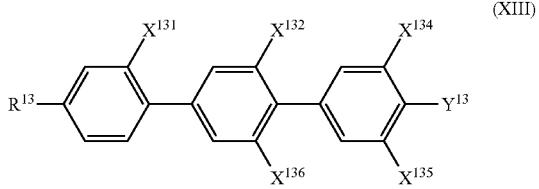

(in the formula, $X^{131}$ to $X^{135}$ each independently represent a fluorine atom or a hydrogen atom; $R^{13}$ represents an alkyl group having 1 to 5 carbon atoms, an alkenyl group having 2 to 5 carbon atoms, or an alkoxy group having 1 to 4 carbon atoms; and $Y^{13}$ represents a fluorine atom or —$OCF_3$)

Such compounds can be used in any combination; it is preferred that one or two of the compounds be used, it is more preferred that one to three of the compounds be used, and it is further preferred that one to four of the compounds be used.

The upper limit and lower limit of the amount of the compound represented by General Formula (XIII) are determined for an embodiment in view of properties such as solubility at low temperature, transition temperature, electric reliability, and birefringence. The lower limit of the amount is, for example, 2% in an embodiment of the present invention, 4% in another embodiment, 5% in another embodiment, 7% in another embodiment, 9% in another embodiment, 11% in another embodiment, 13% in another embodiment, 14% in another embodiment, 16% in another embodiment, or 20% in another embodiment relative to the total amount of the liquid crystal composition of the present invention.

The upper limit of the amount is, for instance, 30% in an embodiment of the present invention, 25% in another embodiment, 20% in another embodiment, 15% in another embodiment, 10% in another embodiment, or 5% in another embodiment.

In the case where the liquid crystal composition of the present invention is used in a liquid crystal display device having a small cell gap, the appropriate amount of the compound represented by General Formula (XIII) is at a higher level. In the case where the liquid crystal composition of the present invention is used in a liquid crystal display device which is driven at a small driving voltage, the appropriate amount of the compound represented by General Formula (XIII) is at a higher level. In the case where the liquid crystal composition of the present invention is used in a liquid crystal display device which is used in a low-temperature environment, the appropriate amount of the compound represented by General Formula (XIII) is at a lower level. In the case where the liquid crystal composition is used in a liquid crystal display device which quickly responds, the appropriate amount of the compound represented by General Formula (XIII) is at a lower level.

The compound represented by General Formula (XIII) is preferably any of compounds represented by General Formula (XIII-1).

[Chem. 131]

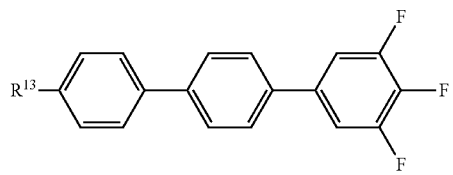

(XIII-1)

(in the formula, $R^{13}$ represents an alkyl group having 1 to 5 carbon atoms, an alkenyl group having 2 to 5 carbon atoms, or an alkoxy group having 1 to 4 carbon atoms)

The amount of the compound represented by General Formula (XIII-1) is preferably not less than 1 mass %, more preferably not less than 3 mass %, further preferably not less than 5 mass %, and especially preferably not less than 10 mass % relative to the total amount of the liquid crystal composition of the present invention. The amount is preferably up to 25 mass %, more preferably up to 20 mass %, and further preferably up to 15 mass %.

The compound represented by General Formula (XIII-1) is preferably any of compounds represented by Formulae (48.1) to (48.4); in particular, the compound represented by Formula (48.2) is preferably employed.

[Chem. 132]

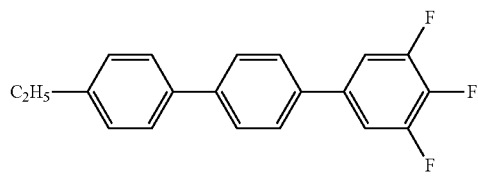

(48.1)

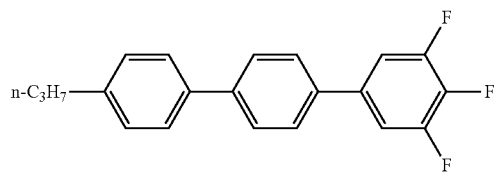

(48.2)

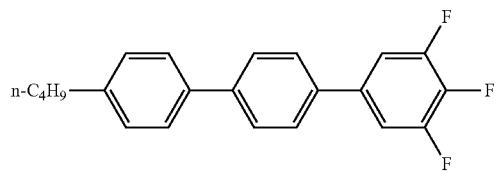

(48.3)

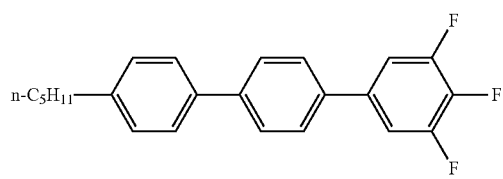

(48.4)

The compound represented by General Formula (XIII) is preferably any of compounds represented by General Formula (XIII-2).

[Chem. 133]

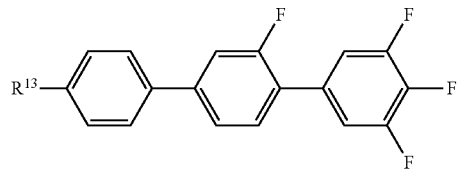

(XIII-2)

(in the formula, $R^{13}$ represents an alkyl group having 1 to 5 carbon atoms, an alkenyl group having 2 to 5 carbon atoms, or an alkoxy group having 1 to 4 carbon atoms)

Such compounds can be used in any combination, and at least one of the compounds is preferably used.

The amount of the compound represented by General Formula (XIII-2) is preferably not less than 3 mass %, more preferably not less than 5 mass %, further preferably not less than 6 mass %, further preferably not less than 8 mass %, and especially preferably not less than 10 mass % relative to the total amount of the liquid crystal composition of the present invention. The amount is preferably up to 25 mass %, more preferably up to 20 mass %, and further preferably up to 15 mass %.

The compound represented by General Formula (XIII-2) is preferably any of compounds represented by Formulae (49.1) to (49.4); among these, the compound represented by Formula (49.1) and/or the compound represented by Formula (49.2) are preferably employed.

[Chem. 134]

(49.1)
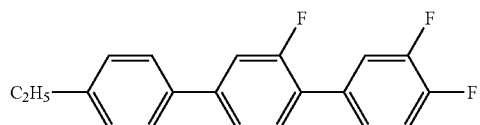

(49.2)
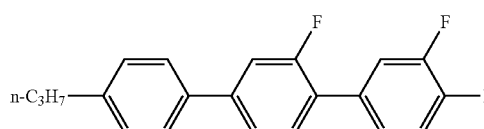

(49.3)

(49.4)
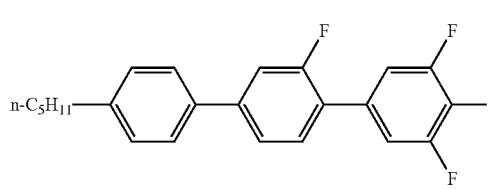

The compound represented by General Formula (XIII) is preferably any of compounds represented by General Formula (XIII-3).

[Chem. 135]

(XIII-3)
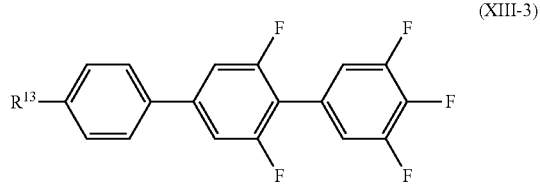

(in the formula, $R^{13}$ represents an alkyl group having 1 to 5 carbon atoms, an alkenyl group having 2 to 5 carbon atoms, or an alkoxy group having 1 to 4 carbon atoms)

Such compounds can be used in any combination, and one or two of the compounds are preferably used.

The amount of the compound represented by General Formula (XIII-3) is preferably not less than 2 mass %, more preferably not less than 4 mass %, further preferably not less than 9 mass %, and especially preferably not less than 11 mass % relative to the total amount of the liquid crystal composition of the present invention. The amount is preferably up to 20 mass %, more preferably up to 17 mass %, and further preferably up to 14 mass %.

The compound represented by General Formula (XIII-3) is preferably any of compounds represented by Formulae (50.1) to (50.4); among these, the compound represented by Formula (50.1) and/or the compound represented by Formula (50.2) are preferably employed.

[Chem. 136]

(50.1)
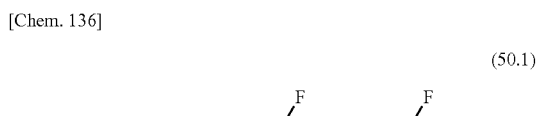

(50.2)

(50.3)
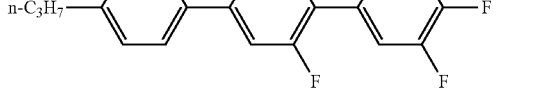

(50.4)
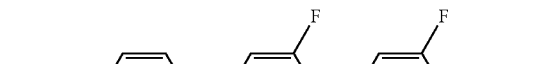

The compound represented by General Formula (M) is preferably a compound selected from the group consisting of compounds represented by General Formula (XIV).

[Chem. 137]

(XIV)
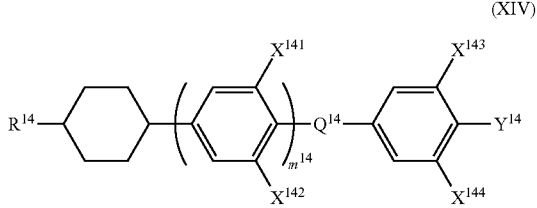

(in the formula, $R^{14}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; $Y^{14}$ represents a fluorine atom, a chlorine atom, or —$OCF_2$; $Q^{14}$ represents a single bond, —COO—, or —$CF_2O$—; and $m^{14}$ represents 0 or 1, where the compound represented by General Formula (XIV) excludes the compound represented by General Formula (i))

Such compounds can be used in any combination; a proper combination of the compounds for an embodiment is determined in view of solubility at low temperature, transition temperature, electric reliability, birefringence, and another property. For example, one of the compounds is used in an embodiment of the present invention, two of the compounds are used in another embodiment of the present invention, three of the compounds are used in another embodiment of the present invention, four of the compounds are used in another embodiment of the present invention, five of the compounds are used in another embodiment of the present invention, and six or more of the compounds are used in another embodiment of the present invention.

The upper limit and lower limit of the amount of the compound represented by General Formula (XIV) are determined for an embodiment in view of properties such as solubility at low temperature, transition temperature, electric reliability, and birefringence. The lower limit of the amount is, for example, 3% in an embodiment of the present invention, 7% in another embodiment, 8% in another embodiment, 11% in another embodiment, 12% in another embodiment, 16% in another embodiment, 18% in another embodiment, 19% in another embodiment, 22% in another embodiment, or 25% in another embodiment relative to the total amount of the liquid crystal composition of the present invention.

The upper limit of the amount is, for instance, 40% in an embodiment of the present invention, 35% in another embodiment, 30% in another embodiment, 25% in another embodiment, 20% in another embodiment, or 15% in another embodiment.

In the case where the liquid crystal composition of the present invention is used in a liquid crystal display device which is driven at a small driving voltage, the appropriate amount of the compound represented by General Formula (XIV) is at a higher level. In the case where the liquid crystal composition is used in a liquid crystal display device which quickly responds, the appropriate amount of the compound represented by General Formula (XIV) is at a lower level.

The compound represented by General Formula (XIV) is preferably any of compounds represented by General Formula (XIV-1).

[Chem. 138]

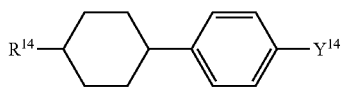

(XIV-1)

(in the formula, $R^{14}$ represents an alkyl group having 1 to 7 carbon atoms, an alkenyl group having 2 to 7 carbon atoms, or an alkoxy group having 1 to 7 carbon atoms; and $Y^{14}$ represents a fluorine atom, a chlorine atom, or —$OCF_3$)

Such compounds can be used in any combination; in view of solubility at low temperature, transition temperature, electric reliability, birefringence, and another property, it is preferred that one to three of the compounds be used.

The compound represented by General Formula (XIV-1) is preferably any of compounds represented by General Formula (XIV-1-1).

[Chem. 139]

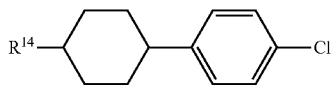

(XIV-1-1)

(in the formula, $R^{14}$ represents an alkyl group having 1 to 7 carbon atoms, an alkenyl group having 2 to 7 carbon atoms, or an alkoxy group having 1 to 7 carbon atoms)

The amount of the compound represented by General Formula (XIV-1) is preferably not less than 2 mass %, more preferably not less than 4 mass %, further preferably not less than 7 mass %, further preferably not less than 10 mass %, and especially preferably not less than 18 mass % relative to the total amount of the liquid crystal composition of the present invention. The amount of the compound is preferably up to 30 mass %, more preferably up to 27 mass %, further preferably up to 24 mass %, and especially preferably less than 21 mass % in view of solubility at low temperature, transition temperature, electric reliability, and another property.

In particular, the compound represented by General Formula (XIV-1-1) is preferably any of compounds represented by Formulae (51.1) to (51.4); among these, the compound represented by Formula (51.1) is preferably used.

[Chem. 140]

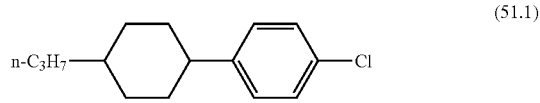

(51.1)

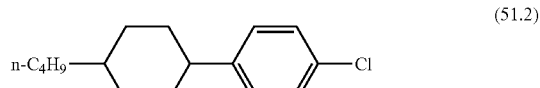

(51.2)

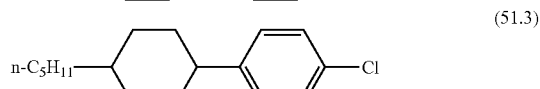

(51.3)

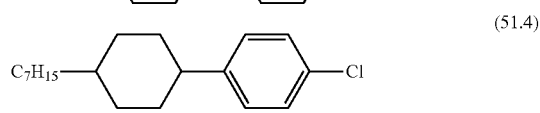

(51.4)

The compound represented by General Formula (XIV-1) is preferably any of compounds represented by General Formula (XIV-1-2).

[Chem. 141]

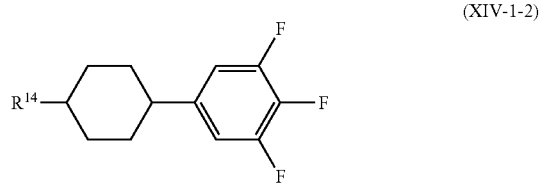

(XIV-1-2)

(in the formula, $R^{14}$ represents an alkyl group having 1 to 7 carbon atoms, an alkenyl group having 2 to 7 carbon atoms, or an alkoxy group having 1 to 7 carbon atoms)

The amount of the compound represented by General Formula (XIV-1-2) is preferably not less than 1 mass %, more preferably not less than 3 mass %, further preferably not less than 5 mass %, and especially preferably not less than 7 mass % relative to the total amount of the liquid crystal composition of the present invention. The amount is preferably up to 15 mass %, more preferably up to 13 mass %, further preferably up to 11 mass %, and especially preferably less than 9 mass % in view of solubility at low temperature, transition temperature, electric reliability, and another property.

In particular, the compound represented by General Formula (XIV-1-2) is preferably any of compounds represented by Formulae (52.1) to (52.4); among these, the compound represented by Formula (52.4) is preferably used.

[Chem. 142]

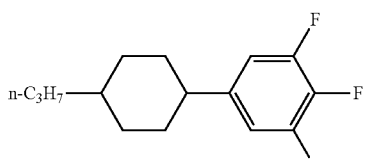
(52.1)

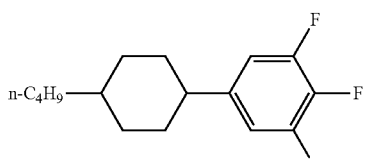
(52.2)

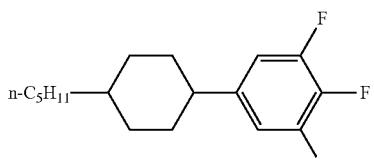
(52.3)

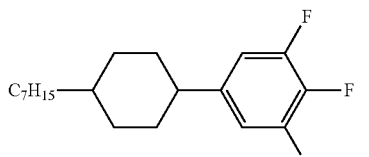
(52.4)

The compound represented by General Formula (XIV) is preferably any of compounds represented by General Formula (XIV-2).

[Chem. 143]

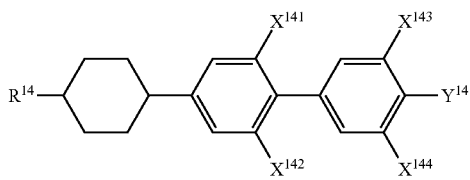
(XIV-2)

(in the formula, $R^{14}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; and $Y^{14}$ represents a fluorine atom, a chlorine atom, or —$OCF_3$)

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, three of the compounds are used in another embodiment of the present invention, four of the compounds are used in another embodiment of the present invention, and five or more of the compounds are used in another embodiment of the present invention.

The upper limit and lower limit of the amount of the compound represented by General Formula (XIV-2) are determined for an embodiment in view of properties such as solubility at low temperature, transition temperature, electric reliability, and birefringence. The lower limit of the amount is, for example, 3% in an embodiment of the present invention, 7% in another embodiment, 8% in another embodiment, 10% in another embodiment, 11% in another embodiment, 12% in another embodiment, 18% in another embodiment, 19% in another embodiment, 21% in another embodiment, or 22% in another embodiment relative to the total amount of the liquid crystal composition of the present invention.

The upper limit of the amount is, for instance, 40% in an embodiment of the present invention, 35% in another embodiment, 25% in another embodiment, 20% in another embodiment, 15% in another embodiment, or 10% in another embodiment.

In the case where the liquid crystal composition of the present invention is used in a liquid crystal display device which is driven at a small driving voltage, the appropriate amount of the compound represented by General Formula (XIV-2) is at a higher level. In the case where the liquid crystal composition is used in a liquid crystal display device which quickly responds, the appropriate amount of the compound represented by General Formula (XIV-2) is at a lower level.

The compound represented by General Formula (XIV-2) is preferably any of compounds represented by General Formula (XIV-2-1).

[Chem. 144]

(XIV-2-1)

(in the formula, $R^{14}$ represents an alkyl group having 1 to 5 carbon atoms, an alkenyl group having 2 to 5 carbon atoms, or an alkoxy group having 1 to 4 carbon atoms)

The amount of the compound represented by General Formula (XIV-2-1) is preferably not less than 1 mass %, more preferably not less than 3 mass %, further preferably not less than 5 mass %, and especially preferably not less than 7 mass % relative to the total amount of the liquid crystal composition of the present invention. The amount is preferably up to 15 mass %, more preferably up to 13 mass %, further preferably up to 11 mass %, and especially preferably less than 9 mass % in view of solubility at low temperature, transition temperature, electric reliability, and another property.

In particular, the compound represented by General Formula (XIV-2-1) is preferably any of compounds represented by Formulae (53.1) to (53.4); among these, the compound represented by Formula (53.4) is preferably used.

[Chem. 145]

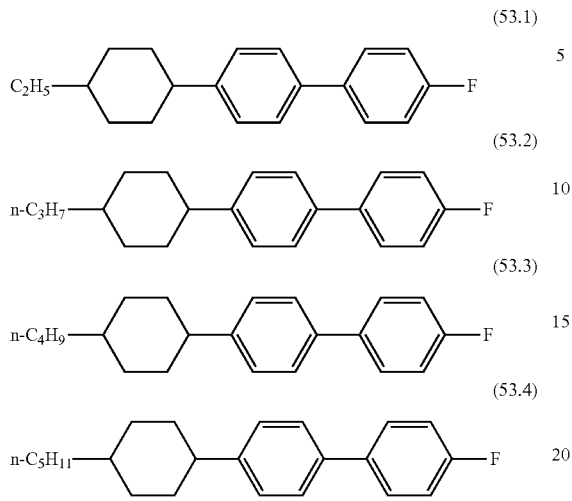

The compound represented by General Formula (XIV-2) is preferably any of compounds represented by General Formula (XIV-2-2).

[Chem. 146]

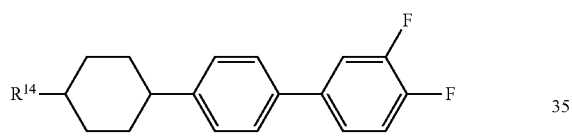

(in the formula, $R^{14}$ represents an alkyl group having 1 to 5 carbon atoms, an alkenyl group having 2 to 5 carbon atoms, or an alkoxy group having 1 to 4 carbon atoms)

The amount of the compound represented by General Formula (XIV-2-2) is preferably not less than 3 mass %, more preferably not less than 6 mass %, further preferably not less than 9 mass %, and especially preferably not less than 12 mass % relative to the total amount of the liquid crystal composition of the present invention. The amount is preferably up to 20 mass %, more preferably up to 17 mass %, further preferably up to 15 mass %, and especially preferably up to 14 mass % in view of solubility at low temperature, transition temperature, electric reliability, and another property.

In particular, the compound represented by General Formula (XIV-2-2) is preferably any of compounds represented by Formulae (54.1) to (54.4); among these, the compound represented by Formula (54.2) and/or the compound represented by Formula (54.4) are preferably used.

[Chem. 147]

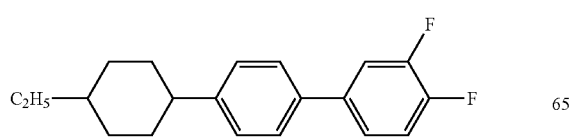

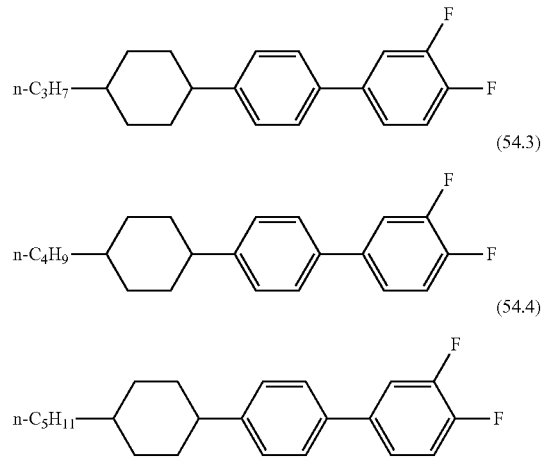

The compound represented by General Formula (XIV-2) is preferably any of compounds represented by General Formula (XIV-2-3).

[Chem. 148]

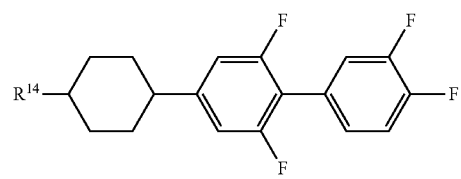

(in the formula, $R^{14}$ represents an alkyl group having 1 to 5 carbon atoms, an alkenyl group having 2 to 5 carbon atoms, or an alkoxy group having 1 to 4 carbon atoms)

The amount of the compound represented by General Formula (XIV-2-3) is preferably not less than 5 mass %, more preferably not less than 9 mass %, and especially preferably not less than 12 mass % relative to the total amount of the liquid crystal composition of the present invention. The amount is preferably up to 30 mass %, more preferably less than 27 mass %, further preferably up to 24 mass %, and especially preferably less than 20 mass % in view of solubility at low temperature, transition temperature, electric reliability, and another property.

In particular, the compound represented by General Formula (XIV-2-3) is preferably any of compounds represented by Formulae (55.1) to (55.4); among these, the compound represented by Formula (55.2) and/or the compound represented by Formula (55.4) are preferably used.

[Chem. 149]

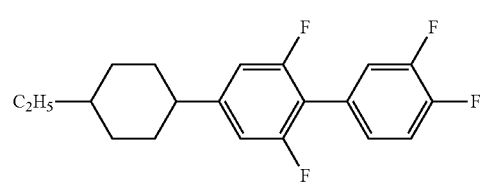

-continued (55.2)
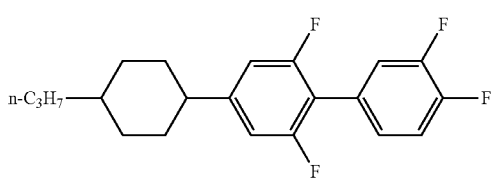

(55.3)
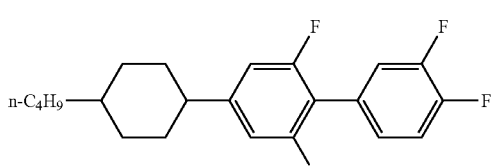

(55.4)
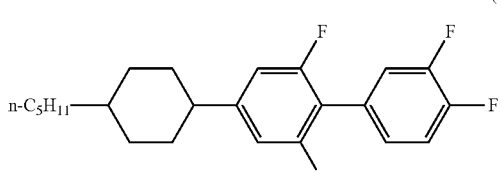

The compound represented by General Formula (XIV-2) is preferably any of compounds represented by General Formula (XIV-2-4).

[Chem. 150]

(XIV-2-4)
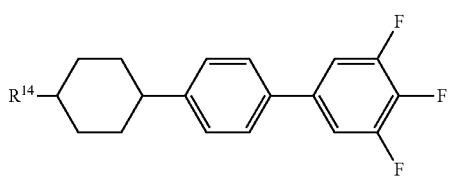

(in the formula, $R^{14}$ represents an alkyl group having 1 to 5 carbon atoms, an alkenyl group having 2 to 5 carbon atoms, or an alkoxy group having 1 to 4 carbon atoms)

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, and three or more of the compounds are used in another embodiment of the present invention.

The upper limit and lower limit of the amount of the compound represented by General Formula (XIV-2-4) are determined for an embodiment in view of properties such as solubility at low temperature, transition temperature, electric reliability, and birefringence. The lower limit of the amount is, for example, 2% in an embodiment of the present invention, 5% in another embodiment, 8% in another embodiment, 9% in another embodiment, 10% in another embodiment, 18% in another embodiment, 21% in another embodiment, 22% in another embodiment, or 24% in another embodiment relative to the total amount of the liquid crystal composition of the present invention.

The upper limit of the amount is, for instance, 35% in an embodiment of the present invention, 30% in another embodiment, 25% in another embodiment, 20% in another embodiment, 15% in another embodiment, or 10% in another embodiment.

In the case where the liquid crystal composition of the present invention is used in a liquid crystal display device which is driven at a small driving voltage, the appropriate amount of the compound represented by General Formula (XIV-2-4) is at a higher level. In the case where the liquid crystal composition is used in a liquid crystal display device which quickly responds, the appropriate amount of the compound represented by General Formula (XIV-2-4) is at a lower level.

In particular, the compound represented by General Formula (XIV-2-4) is preferably any of compounds represented by Formulae (56.1) to (56.4); among these, any of the compounds represented by Formulae (56.1), (56.2), and (56.4) is preferably used.

[Chem. 151]

(56.1)
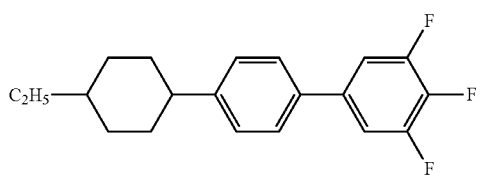

(56.2)
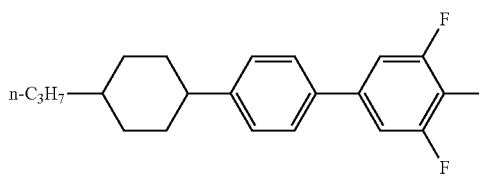

(56.3)
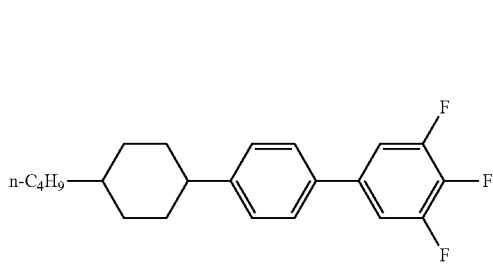

(56.4)
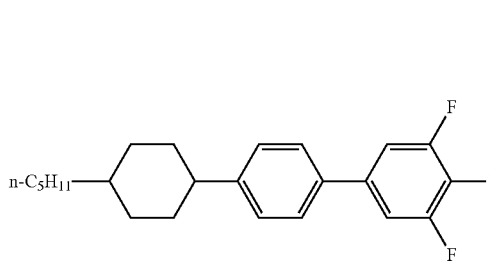

The compound represented by General Formula (XIV-2) is preferably any of compounds represented by General Formula (XIV-2-5).

[Chem. 152]

(XIV-2-5)

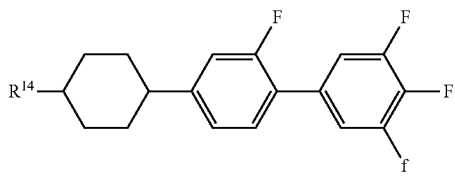

(in the formula, $R^{14}$ represents an alkyl group having 1 to 5 carbon atoms, an alkenyl group having 2 to 5 carbon atoms, or an alkoxy group having 1 to 4 carbon atoms)

The amount of the compound represented by General Formula (XIV-2-5) is preferably not less than 5 mass %, more preferably not less than 10 mass %, and especially preferably not less than 13 mass % relative to the total amount of the liquid crystal composition of the present invention. The amount is preferably up to 25 mass %, more preferably less than 22 mass %, further preferably up to 18 mass %, and especially preferably less than 15 mass % in view of solubility at low temperature, transition temperature, electric reliability, and another property.

In particular, the compound represented by General Formula (XIV-2-5) is any of compounds represented by Formulae (57.1) to (57.4); among these, the compound represented by Formula (57.1) is preferably used.

[Chem. 153]

(57.1)

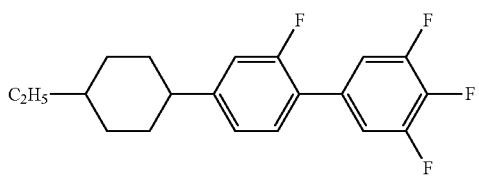

(57.2)

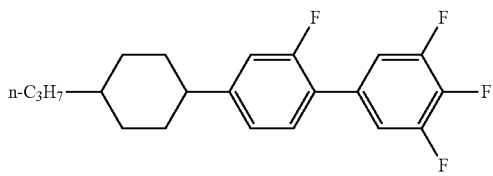

(57.3)

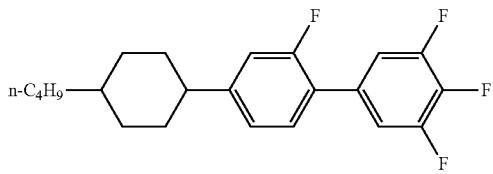

(57.4)

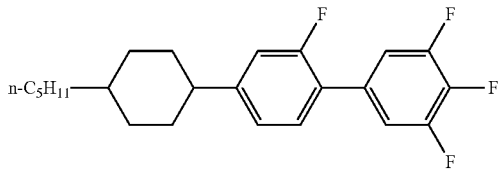

The compound represented by General Formula (XIV-2) is preferably any of compounds represented by General Formula (XIV-2-6).

[Chem. 154]

(XIV-2-6)

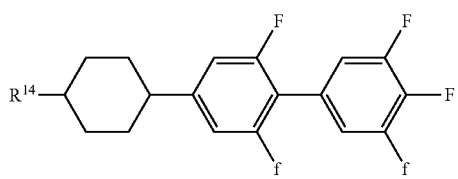

(in the formula, $R^{14}$ represents an alkyl group having 1 to 5 carbon atoms, an alkenyl group having 2 to 5 carbon atoms, or an alkoxy group having 1 to 4 carbon atoms)

The amount of the compound represented by General Formula (XIV-2-6) is preferably not less than 5 mass %, more preferably not less than 10 mass %, and especially preferably not less than 15 mass % relative to the total amount of the liquid crystal composition of the present invention. The amount is preferably up to 25 mass %, more preferably up to 22 mass %, further preferably up to 20 mass %, and especially preferably less than 17 mass % in view of solubility at low temperature, transition temperature, electric reliability, and another property.

In particular, the compound represented by General Formula (XIV-2-6) is preferably any of compounds represented by Formulae (58.1) to (58.4); among these, the compound represented by Formula (58.2) is preferably used.

[Chem. 155]

(58.1)

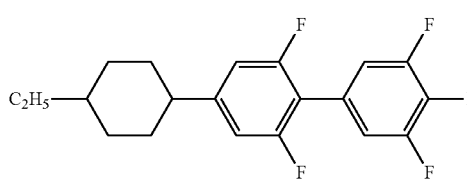

(58.2)

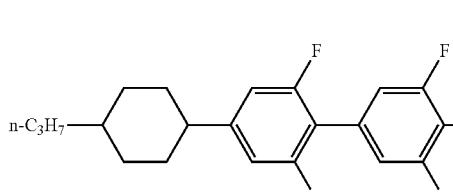

(58.3)

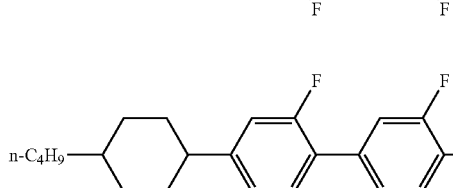

(58.4)

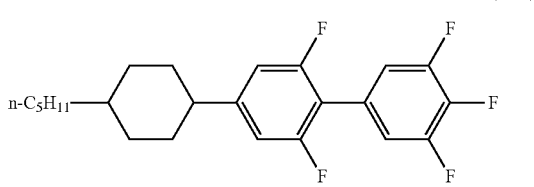

The molecules of compounds used in the present invention are free from the structure of a peroxy acid (—CO—OO—). In terms of the reliability and long-term stability of the liquid crystal composition, it is preferred that a compound having a carbonyl group be not used. In terms of stability to irradiation with UV, it is preferred that a compound substituted with a chlorine atom be not used. It is also preferred that only compounds having molecules in which all of the ring structures are six-membered rings be used.

The liquid crystal composition of the present invention can contain a polymerizable compound for production of a liquid crystal display device of a PS mode, a PSA mode involving use of a horizontal electric field, or a PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which multiple six-membered rings are bonded to each other, such as biphenyl derivatives and terphenyl derivatives. Specifically, the polymerizable compound is preferably a difunctional monomer represented by General Formula (XX).

[Chem. 156]

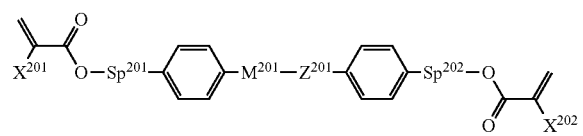
(XX)

(in the formula, $X^{201}$ and $X^{202}$ each independently represent a hydrogen atom or a methyl group;
$Sp^{201}$ and $Sp^{202}$ each independently represent a single bond, an alkylene group having 1 to 8 carbon atoms, or —O—$(CH_2)_s$— (where s represents an integer from 2 to 7, and the oxygen atom is bonded to an aromatic ring);
$Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and
$M^{201}$ represents a 1,4-phenylene group, a trans-1,4-cyclohexylene group, or a single bond, and in each 1,4-phenylene group in the formula, any hydrogen atom is optionally substituted with a fluorine atom)

Diacrylate derivatives in which $X^{201}$ and $X^{202}$ each represent a hydrogen atom and dimethacrylate derivatives in which $X^{201}$ and $X^{202}$ are each a methyl group are preferred, and compounds in which one of $X^{201}$ and $X^{202}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^{201}$ and $Sp^{202}$ each independently represent a single bond, an alkylene group having 1 to 8 carbon atoms, or —O—$(CH_2)_s$—; in an application to PSA display devices, at least one of $Sp^{201}$ and $Sp^{202}$ is preferably a single bond, and compounds in which $Sp^{201}$ and $Sp^{202}$ each represent a single bond and compounds in which one of $Sp^{201}$ and $Sp^{202}$ is a single bond and in which the other one thereof represents an alkylene group having 1 to 8 carbon atoms or —O—$(CH_2)_s$— are preferred. In this case, an alkyl group having 1 to 4 carbon atoms is preferably employed, and s preferably ranges from 1 to 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond; more preferably —COO—, —OCO—, or a single bond; and especially preferably a single bond.

$M^{201}$ represents a 1,4-phenylene group of which any hydrogen atom is optionally substituted with a fluorine atom, a trans-1,4-cyclohexylene group, or a single bond; and a 1,4-phenylene group and a single bond are preferred. In the case where C does not represent a single bond but represents a ring structure, $Z^{201}$ preferably represents a linking group as well as a single bond; in the case where $M^{201}$ represents a single bond, $Z^{201}$ is preferably a single bond.

From these viewpoints, a preferred ring structure between $Sp^{201}$ and $Sp^{202}$ in General Formula (XX) is particularly as follows.

In General Formula (XX), in the case where $M^{201}$ represents a single bond and where the ring structure consists of two rings, the ring structure is preferably represented by any of Formulae (XXa-1) to (XXa-5), more preferably Formulae (XXa-1) to (XXa-3), and especially preferably Formula (XXa-1).

[Chem. 157]

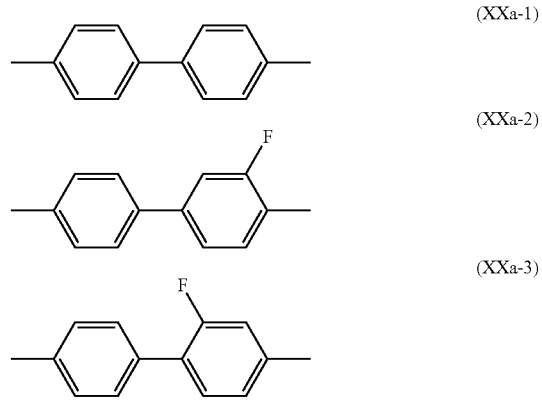

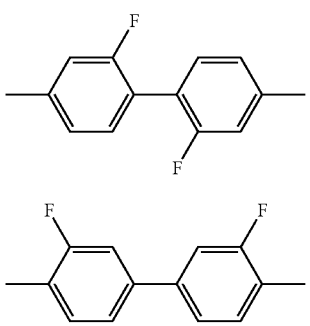

(XXa-4)

(XXa-5)

(in the formulae, the two ends of each structure are bonded to Sp$^{201}$ and Sp$^{202}$, respectively)

Polymerizable compounds having such skeletons enable uneven display to be reduced or eliminated in PSA liquid crystal display devices because such polymerizable compounds have optimum alignment regulating force after being polymerized and thus produce a good alignment state.

Accordingly, the polymerizable monomer is especially preferably any of compounds represented by General Formulae (XX-1) to (XX-4), and most preferably the compound represented by General Formula (XX-2).

[Chem. 158]

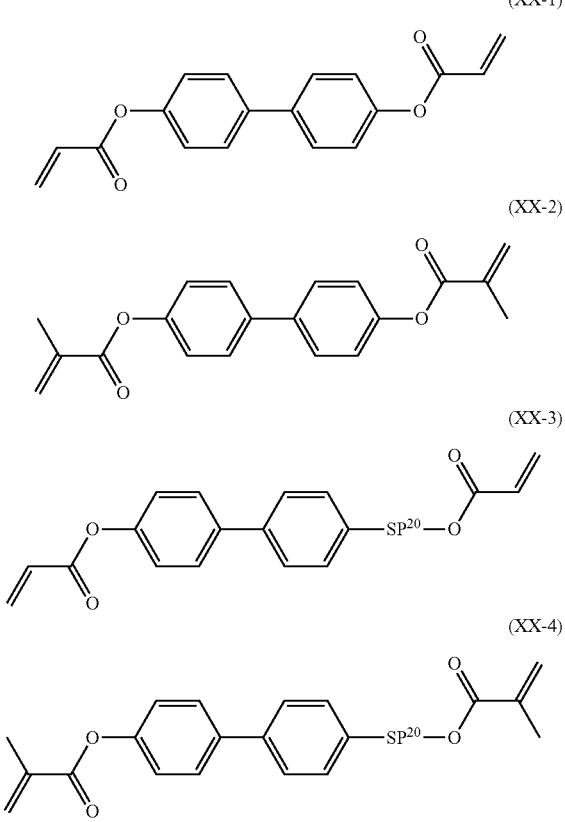

(XX-1)

(XX-2)

(XX-3)

(XX-4)

(in the formulae, Sp$^{20}$ represents an alkylene group having 2 to 5 carbon atoms)

In the case where the monomer is added to the liquid crystal composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

The liquid crystal composition of the present invention can further contain a compound represented by General Formula (Q).

[Chem. 159]

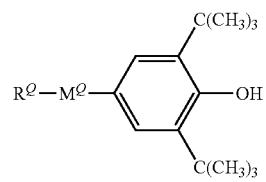

(Q)

(in the formula, R$^Q$ represents a linear or branched alkyl group having 1 to 22 carbon atoms; at least one CH$_2$ group in the alkyl group is optionally substituted with —O—, —CH=CH—, —CO—, —OCO—, —COO—, —C≡C—, —CF$_2$O—, or —OCF$_2$— such that oxygen atoms do not directly adjoin each other; and M$^Q$ represents a trans-1,4-cyclohexylene group, a 1,4-phenylene group, or a single bond)

R$^Q$ represents a linear or branched alkyl group having 1 to 22 carbon atoms, and at least one CH$_2$ group in the alkyl group is optionally substituted with —O—, —CH=CH—, —CO—, —OCO—, —COO—, —C≡C—, —CF$_2$O—, or —OCF$_2$— such that oxygen atoms do not directly adjoin each other. R$^Q$ is preferably a linear alkyl group, a linear alkoxy group, a linear alkyl group of which one CH$_2$ group is substituted with —OCO— or —COO—, a branched alkyl group, a branched alkoxy group, or a branched alkyl group of which one CH$_2$ group is substituted with —OCO— or —COO—, each group having 1 to 10 carbon atoms; and more preferably a linear alkyl group, a linear alkyl group of which one CH$_2$ group is substituted with —OCO— or —COO—, a branched alkyl group, a branched alkoxy group, or a branched alkyl group of which one CH$_2$ group is substituted with —OCO— or —COO—, each group having 1 to 20 carbon atoms. M$^Q$ represents a trans-1,4-cyclohexylene group, a 1,4-phenylene group, or a single bond and is preferably a trans-1,4-cyclohexylene group or a 1,4-phenylene group.

In particular, the compound represented by General Formula (Q) is preferably any of compounds represented by General Formulae (Q-a) to (Q-d).

[Chem. 160]

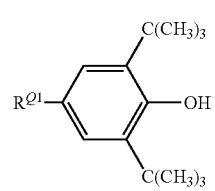

(Q-a)

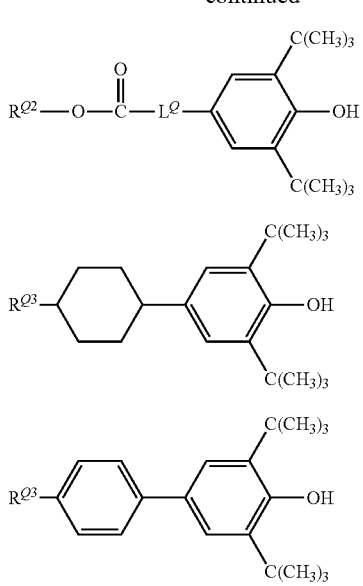

In these formulae, $R^{Q1}$ is preferably a linear or branched alkyl group having 1 to 10 carbon atoms, $R^{Q2}$ is preferably a linear or branched alkyl group having 1 to 20 carbon atoms, $R^{Q3}$ is preferably a linear or branched alkyl or alkoxy group having 1 to 8 carbon atoms, and $L^Q$ is preferably a linear or branched alkylene group having 1 to 8 carbon atoms. Among the compounds represented by General Formulae (Q-a) to (Q-d), the compounds represented by General Formulae (Q-c) and (Q-d) are more preferred.

The liquid crystal composition of the present invention preferably contains one or two compounds represented by General Formula (Q), and more preferably one to five; the amount thereof is preferably in the range of 0.001 to 1 mass %, more preferably 0.001 to 0.1 mass %, and especially preferably 0.001 to 0.05 mass %.

In the liquid crystal composition of the present invention, to which a polymerizable compound has been added, the polymerizable compound is polymerized by being irradiated with ultraviolet, so that liquid crystal molecules can be aligned; thus, such a liquid crystal composition is used in liquid crystal display devices in which the birefringence of the liquid crystal composition is utilized for control of the amount of light that is to be transmitted. Such a liquid crystal composition is useful for liquid crystal display devices, such as an AM-LCD (active-matrix liquid crystal display device), a TN (nematic liquid crystal display device), an STN-LCD (super twisted nematic liquid crystal display device), an OCB-LCD, an FFS mode, and an IPS-LCD (in-plane switching liquid crystal display device), particularly useful for an AM-LCD, and can be used in transmissive or reflective liquid crystal display devices.

Two substrates used in a liquid crystal cell included in a liquid crystal display device can be made of a transparent material having flexibility, such as glass or a plastic material, and one of these substrates may be made of a non-transparent material such as silicon. In order to form a transparent electrode layer on a transparent substrate such as a glass plate, for example, indium tin oxide (ITO) is sputtered on the transparent substrate.

Color filters can be produced by, for instance, a pigment dispersion technique, a printing technique, an electrodeposition technique, or a staining technique. In production of the color filters by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filters. Active elements such as a TFT, a thin-film diode, a metal insulator, and a metal specific resistance element may be provided on the resulting substrate to form pixel electrodes.

The substrates are arranged so as to face each other with the transparent electrode layer interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 μm, and more preferably 1.5 to 10 μm. In the case where a polarizing plate is used, the product of the refractive index anisotropy Δn of liquid crystal and a cell thickness d is preferably adjusted for maximization of contrast. In the case where two polarizing plates are used, the polarization axis of each polarizing plate may be adjusted to give a good viewing angle or contrast. Furthermore, a retardation film may be also used to increase a viewing angle. Examples of the spacer include columnar spacers made of, for instance, glass particles, plastic particles, alumina particles, or photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The polymerizable-compound-containing liquid crystal composition can be put into the space between the two substrates by, for example, a vacuum injection technique or ODF technique which is generally employed. A vacuum injection technique, however, has a problem in which traces of the injection remain while droplet stains are not generated. The present invention can be more suitably applied to display devices manufactured by an ODF technique. In a process for manufacturing a liquid crystal display device by an ODF technique, an optically and thermally curable epoxy-based sealing material is applied to any one of a backplane and a frontplane with a dispenser in the form of a closed loop that serves as a wall, a certain amount of the liquid crystal composition is dropped onto part of the substrate surrounded by the applied sealing material in a degassed atmosphere, and then the frontplane and the backplane are bonded to each other, thereby being able to manufacture a liquid crystal display device. The liquid crystal composition of the present invention can be stably dropped in an ODF process and can be therefore desirably used.

Since a proper polymerization rate is desired to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing liquid crystal composition is polymerized in a state in which the composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjustment of conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjustment of voltage that is to be applied. In MVA-mode liquid crystal display devices which involve use of a horizontal electric field, a pretilt angle is preferably controlled to be from 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically from 15 to 35° C. Preferred examples of a lamp that is usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the liquid crystal composition; it is preferred that an ultraviolet ray in a particular wavelength range be cut off as needed. The intensity of an ultraviolet ray to be emitted is preferably from 0.1 mW/cm$^2$ to 100 W/cm$^2$, and more preferably 2 mW/cm$^2$ to 50 W/cm$^2$. The energy of an ultraviolet ray to be emitted can be appropriately adjusted: preferably from 10 mJ/cm$^2$ to 500 J/cm$^2$, and more preferably 100 mJ/cm$^2$ to 200 J/cm$^2$. The intensity may be changed in the exposure to ultraviolet radiation. The time of the exposure to ultraviolet radiation is appropriately determined on the basis of the intensity of an ultraviolet ray to be emitted: preferably from 10 seconds to 3600 seconds, and more preferably 10 seconds to 600 seconds.

Liquid crystal display devices using the liquid crystal composition of the present invention are practical because they quickly respond and are less likely to suffer from defective display at the same time; in particular, the liquid crystal composition is useful to active-matrix liquid crystal display devices and can be applied to liquid crystal display devices of a VA mode, PSVA mode, PSA mode, IPS mode, FFS mode, and ECB mode.

A liquid crystal display apparatus according to a preferred embodiment of the present invention will now be described in detail with reference to the drawings.

FIG. 1 is a cross-sectional view illustrating a liquid crystal display device which includes two substrates facing each other, a sealing material disposed between the substrates, and liquid crystal confined in a sealed region surrounded by the sealing material.

In particular, FIG. 1 illustrates a specific embodiment of a liquid crystal display device including a backplane, a frontplane, a sealing material 301 disposed between these substrates, and a liquid crystal layer 303 confined in a sealed region surrounded by the sealing material. The backplane includes a first substrate 100, TFT layers 102 and pixel electrodes 103 each formed so as to overlie the first substrate 100, and a passivation film 104 and first alignment film 105 each formed so as to cover these components. The frontplane faces the backplane and includes a second substrate 200; a black matrix 202, color filters 203, planarization film (overcoat layer) 201, and transparent electrode 204 each formed so as to overlie the second substrate 200; and a second alignment film 205 formed so as to cover these components. In addition, protrusions (columnar spacers) 302 and 304 are extending from a surface to which the sealing material 301 has been applied.

Any substantially transparent material can be used for the first substrate or the second substrate; for instance, glass, ceramic materials, and plastic materials can be used. Examples of materials used for the plastic substrate include cellulose derivatives such as cellulose, triacetyl cellulose, and diacetyl cellulose; polyesters such as polycycloolefin derivatives, polyethylene terephthalate, and polyethylene naphthalate; polyolefins such as polypropylene and polyethylene; polycarbonate; polyvinyl alcohol; polyvinyl chloride; polyvinylidene chloride; polyamide; polyimide; polyimideamide; polystyrene; polyacrylate; polymethyl methacrylate; polyethersulfone; polyarylate; and inorganic-organic composite materials such as glass fiber-epoxy resin and glass fiber-acrylic resin.

In the case where the plastic substrate is used, a barrier film is preferably formed. The barrier film serves to reduce the moisture permeability of the plastic substrate, which enhances the reliability of the electrical properties of the liquid crystal display device. Any barrier film having high transparency and low water vapor permeability can be used; in general, a thin film formed of an inorganic material, such as silicon oxide, by vapor deposition, sputtering, or a chemical vapor deposition method (CVD method) can be used.

In the present invention, the first and second substrates may be formed of materials that are the same as or different from each other without limitation. A glass substrate is preferably employed because using the glass substrate enables manufacturing of a liquid crystal display device exhibiting excellent thermal resistance and dimensional stability. A plastic substrate is also preferably employed because it is suitable for manufacturing by a roll-to-roll process and appropriately enables weight reduction and an enhancement in flexibility. In terms of imparting flatness and thermal resistance to the substrate, a combination of a plastic substrate and a glass substrate can give a good result.

In Examples which will be described later, a substrate is used as a material of the first substrate 100 or the second substrate 200.

In the backplane, the TFT layers 102 and the pixel electrodes 103 are disposed so as to overlie the first substrate 100. These components are formed through an arraying process which is generally used. The passivation film 104 and the first alignment film 105 are formed so as to cover these components, thereby completing the formation of the backplane.

The passivation film 104 (also referred to as an inorganic protective film) is a film used for protecting the TFT layers; in general, a nitride film (SiNx), an oxide film (SiOx), or another film is formed by, for example, a chemical vapor deposition (CVD) method.

The first alignment film 105 is a film which serves to align liquid crystal molecules; in general, a polymeric material, such as polyimide, is used in many cases. An alignment agent solution containing a polymeric material and a solvent is used as a coating liquid. The alignment film may reduce adhesion to the sealing material and is therefore applied in patterns in a sealed region. The alignment agent solution is applied by a printing technique, such as flexography, or a droplet ejection technique, such as an ink jet technique. The alignment agent solution which has been applied is temporarily dried for the solvent being evaporated and then baked to be cross-linked and cured. Then, the cured product is subjected to an alignment treatment in order to produce an alignment function.

In general, a rubbing process is employed for the alignment treatment. The polymeric film produced as described above is unidirectionally rubbed with a rubbing cloth formed of a fibrous material such as rayon, which produces a function of aligning liquid crystal molecules.

A photo-alignment technique may be used. In the photo-alignment technique, an alignment function is produced by emission of polarized light onto an alignment film containing a photosensitive organic material, so that damage of a substrate and generation of dusts which are each caused by a rubbing process are eliminated. Examples of the organic materials used in the photo-alignment technique include materials containing dichroic dyes. A material usable as the dichroic dye has a group which induces an optical reaction resulting in production of a function of aligning liquid crystal molecules (hereinafter referred to as photo-alignment group), such as induction of molecular alignment or isomerization reaction (e.g., azobenzene group) caused by the Weigert effect based on photodichroism, a dimerization reaction (e.g., cinnamoyl group), a photo-cross-linking reaction (e.g., benzophenone group), or a photodegradation reaction (e.g., polyimide group). After the applied alignment agent solution is temporarily dried for the solvent being evaporated, the product is irradiated with light having a predetermined polarization (polarized light), thereby being able to produce an alignment film which enables alignment in the intended direction.

In the frontplane, the black matrix 202, the color filters 203, the planarization film 201, the transparent electrode 204, and the second alignment film 205 are disposed so as to overlie the second substrate 200.

The black matrix 202 is formed by, for example, a pigment dispersion technique. In particular, a color resin liquid in which a black colorant has been uniformly dispersed for formation of the black matrix is applied onto the second substrate 200 on which the barrier film 201 has been formed, thereby forming a colored layer. The colored layer is subsequently cured by being baked. A photoresist is applied onto the cured layer and then pre-baked. The photoresist is exposed to light through a mask pattern, and then development is carried out to pattern the colored layer. Then, the photoresist layer is removed, and the colored layer is baked, thereby completing the black matrix 202.

Alternatively, a photoresist-type pigment dispersion liquid may be used. In this case, the photoresist-type pigment dispersion liquid is applied, pre-baked, and then exposed to light through a mask pattern; and development is subsequently carried out to pattern the colored layer. Then, the photoresist layer is removed, and the colored layer is baked, thereby completing the black matrix 202.

The color filters 203 are formed by a pigment dispersion technique, an electrodeposition technique, a printing technique, or a staining technique. In a pigment dispersion technique, for example, a color resin liquid in which a pigment (e.g., red) has been uniformly dispersed is applied onto the second substrate 200 and then cured by being baked, and a photoresist is applied onto the cured product and pre-baked. The photoresist is exposed to light through a mask pattern, and then development is carried out to form a pattern. The photoresist layer is subsequently removed, and baking is carried out again, thereby completing a (red) color filter 203 (203a). The color filters may be formed in any order of colors. A green color filter 203 (203b) and a blue color filter 203 (203c) are similarly formed.

The transparent electrode 204 is formed so as to overlie the color filters 203 (the overcoat layer (201) is optionally formed on the color filters 203 to flatten the surfaces). The transparent electrode 204 preferably has a high light transmittance and low electric resistance. In the formation of the transparent electrode 204, an oxide film of, for example, ITO is formed by sputtering.

In order to protect the transparent electrode 204, a passivation film is formed on the transparent electrode 204 in some cases.

The second alignment film 205 is the same as the above-mentioned first alignment film 105.

Although a specific embodiment of the backplane and frontplane used in the present invention has been described, the present invention is not limited to this specific embodiment and can be freely modified to provide a desired liquid crystal display device.

The columnar spacers may have any shape, and the horizontal section thereof may have any shape such as a circular, square, or polygonal shape; in particular, the horizontal section preferably has a circular shape or a regular polygonal shape in view of a margin for misalignment in the formation process. Furthermore, such protrusions preferably have the shape of a circular truncated cone or truncated pyramid.

Any material which is insoluble in the sealing material, an organic solvent used in the sealing material, and the liquid crystal can be used for the columnar spacers; a synthetic resin (curable resin) is preferably employed in terms of processability and weight reduction. The protrusions can be formed above the surface of the first substrate by photolithography or a droplet ejection technique, the surface being subjected to application of the sealing material. For such a reason, a photocurable resin suitable for photolithography and a droplet ejection technique is preferably employed.

Figure 2:
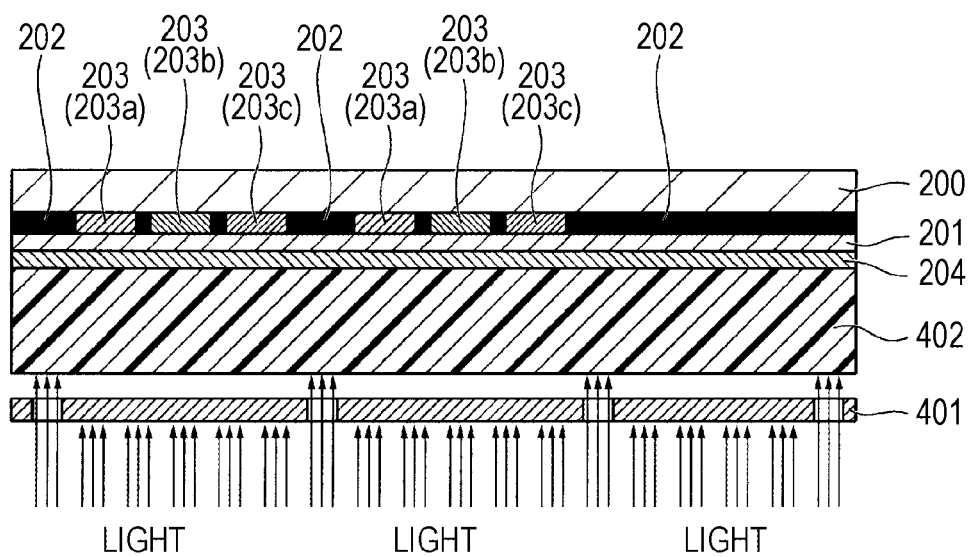
FIG. 2 illustrates an exposure process in which a pattern used for forming columnar spacers above a black matrix is employed as the pattern of a photomask.

An illustrative case in which the columnar spacers are formed by photolithography will now be described. FIG. 2 illustrates an exposure process in which a pattern for forming the columnar spacers above the black matrix is employed as the pattern of a photomask.

A resin solution (not containing a colorant) used for forming the columnar spacers is applied onto the transparent electrode 204 of the frontplane. Then, the resulting resin layer 402 is cured by being baked. A photoresist is applied onto the cured layer and then pre-baked. The photoresist is exposed to light through a mask pattern 401, and then development is carried out to pattern the resin layer. The photoresist layer is subsequently removed, and then the resin layer is baked, thereby completing the columnar spacers (corresponding to 302 and 0304 in FIG. 1).

Positions at which the columnar spacers are to be formed can be appropriately determined on the basis of the mask pattern. Accordingly, both the inside of the sealed region and the outside thereof (part to which the sealing material is to be applied) can be simultaneously formed in the liquid crystal display device. The columnar spacers are preferably formed above the black matrix in order to avoid degrading the quality of the sealed region. The columnar spacers formed by photolithography as described above are also referred to as column spacers or photo spacers.

The material used for forming the spacers is a mixture containing, for example, a negative water-soluble resin, such as a PVA-stilbazo photosensitive resin; a polyfunctional acrylic monomer; an acrylic acid copolymer; and a triazole-based initiator. In another technique, a color rein in which a colorant has been dispersed in a polyimide resin is used. In the present invention, any technique can be employed, and existing materials suitable for liquid crystal and sealing material, which are to be used, can be used to form the spacers.

After the columnar spacers are formed on part of the surface of the frontplane, which serves as the sealed region, in this manner, the sealing material (corresponding to 301 in FIG. 1) is applied to the intended part of the surface of the backplane.

Any material can be used as the sealing material, and a curable resin composition prepared by addition of a polymerization initiator to an epoxy-based or acrylic resin which is photocurable, thermosetting, or optically and thermally curable is used. Fillers containing inorganic or organic materials are added in some cases to adjust moisture permeability, an elastic modulus, viscosity, and another property. Such fillers may have any shape such as a spherical shape, a fibrous shape, or an amorphous shape. Furthermore, a spherical or fibrous gap material having a single dispersion diameter may be mixed to properly control the cell gap, and a fibrous material which can be easily wound around the protrusions formed above the substrate may be mixed to enhance the adhesion to the plates. The diameter of the fibrous material used in this case is desirably from approximately 1/5 to 1/10 of the cell gap, and the length of the fibrous material is desirably shorter than the width of an applied sealing material.

Any substance can be used as the fibrous material provided that the fibrous material can have a predetermined shape; synthetic fibers, such as cellulose, polyamide, and polyester, and inorganic materials, such as glass and carbon, can be appropriately selected.

The sealing material can be applied by a printing technique or a dispensing technique, and a dispensing technique is desirably employed because the amount of the sealing material to be used in the dispensing technique is small. In general, the sealing material is applied to a position corresponding to the position of the black matrix to avoid adverse effect on the sealed region. In order to form a liquid crystal-dropped region used in the subsequent process (to prevent the liquid crystal from leaking), the sealing material is applied in the form of a closed loop.

Liquid crystal is dropped to the closed-loop structure (sealed region) of the frontplane, the closed-loop structure having been formed by application of the sealing material. In general, a dispenser is used. Since the amount of liquid crystal to be dropped should be equivalent to the capacity of a liquid crystal cell, the amount basically corresponds to the volume that is the product of the height of the columnar spacers and the area surrounded by the sealing material. In order to reduce the leakage of liquid crystal in a cell bonding process or to optimize displaying characteristics, the amount of the liquid crystal to be dropped may be appropriately adjusted, or positions to which the liquid crystal are dropped may be dispersed.

Then, the backplane is bonded to the frontplane to which the sealing material has been applied and liquid crystal has been dropped. In particular, the frontplane and the backplane are attached to stages having a mechanism for holding the substrates, such as an electrostatic chuck, and then the frontplane and the backplane are disposed at a position (in a distance) which enables the second alignment film of the frontplane to face the first alignment film of the backplane and which enables the sealing material not to contact the other side. In this state, pressure in the system is reduced. After the reduction in pressure, the positions of the frontplane and backplane are adjusted (alignment process) while parts of the frontplane and backplane which are to be bonded to each other are confirmed. After the adjustment of the positions, the frontplane and the backplane are moved to bring the sealing material on the frontplane into contact with the backplane. In this state, the inside of the system is filled with inert gas, and the vacuum is gradually released into normal pressure. In this process, atmospheric pressure enables the frontplane and the backplane to be bonded to each other, and the height of the columnar spacers defines a cell gap. In this state, the sealing material is cured by being irradiated with ultraviolet light, thereby forming the liquid crystal cell. Then, a heating process is optionally carried out to promote the curing of the sealing material. The heating process is carried out in many cases to enhance the adhesion of the sealing material and the reliability of electrical properties.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

Tni: Nematic phase-isotropic liquid phase transition temperature (° C.)

Δn: Refractive index anisotropy at 295 K (also referred to as birefringence)

Δ∈: Dielectric anisotropy at 295 K

η: Viscosity at 295 K (mPa·s)

γ1: Rotational viscosity at 295 K (mPa·s)

VHR: Voltage holding ratio (%) at 313 K under the conditions including a frequency of 60 Hz and an applied voltage of 5 V Screen Burn-in:

In evaluation of the screen burn-in of a liquid crystal display device, a certain fixed pattern was displayed in a display area for 1440 hours, and then an image was displayed evenly on the whole of the screen. Then, the degree of an afterimage of the fixed pattern was visually observed, and result of the observation was evaluated on the basis of the following four criteria.

Excellent: No afterimage observed

Good: Slight afterimage observed, but acceptable

Bad: Afterimage observed, unacceptable

Poor: Afterimage observed, quite inadequate

Volatility/Contamination of Manufacturing Equipment:

In evaluation of the volatility of a liquid crystal material, operation of a vacuum defoaming mixer was observed with a stroboscope for visual survey of foaming of the liquid crystal material. In particular, 0.8 kg of a liquid crystal composition was put into the 2.0-L container dedicated to the vacuum defoaming mixer, the vacuum defoaming mixer was operated under a vacuum of 4 kPa at an orbital speed of 15 $S^{-1}$ and a rotating velocity of 7.5 $S^{-1}$, and the time taken for the liquid crystal composition to start foaming was measured. The evaluation was made by the following four criteria based on the measured time.

Excellent: Forming started after a lapse of at least three minutes, low possibility of contamination of manufacturing equipment due to volatilization Good: Forming started after a lapse of a minute or more but less than three minutes, possibility of slight contamination of manufacturing equipment due to volatilization Bad: Forming started after a lapse of 30 seconds or more but less than a minute, occurrence of contamination of manufacturing equipment due to volatilization Poor: Forming started within 30 seconds, possibility of significant contamination of manufacturing equipment due to volatilization Process Adaptability:

In an ODF process, 40 pL of liquid crystal was dropped 100000 times with a constant volume metering pump, and every 200-times dropping was defined as one cycle such as "0 to 200, 201 to 400, 401 to 600 . . . , and 99801 to 100000". A variation in the amount of the dropped liquid crystal between the individual cycles was evaluated on the basis of the following four criteria for analysis of process adaptability.

Excellent: Significantly small variation (stable manufacturing of a liquid crystal display device was possible)

Good: Slight variation, but acceptable

Bad: Unacceptable variation (spots were generated with the result that a yield was reduced)

Poor: Quite inadequate variation (liquid crystal leaked, and vacuum bubbles were generated)

Solubility at Low Temperature:

In order to evaluate solubility at low temperature, a liquid crystal composition was prepared, the liquid crystal composition was subsequently weighted to 0.5 g in a 1-mL sample bottle, and the sample bottle was subjected to a continuous temperature change in a temperature controlled chamber in the following cycle: −20° C. (retained for an hour)→heating (0.2° C./min)→0° C. (retained for an hour) →heating (0.2° C./min)→20° C. (retained for an hour) →cooling (−0.2° C./min)→0° C. (retained for an hour) →cooling (−0.2° C./min)→−20° C. Then, precipitate generated in the liquid crystal composition was visually observed, and result of the observation was evaluated on the basis of the following four criteria.

Excellent: No precipitate observed for at least 600 hours

Good: No precipitate observed for at least 300 hours

Bad: Precipitate observed within 150 hours

Poor: Precipitate observed within 75 hours

Example 1

A composition containing the following components was prepared. Table 1 shows the physical properties of the composition of Example 1.

[Chem. 161]

| Chemical Structure | Content | (%) |
|---|---|---|
| 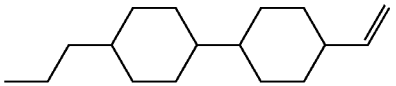 | (2.2) | 20 |
| 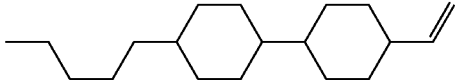 [SMILES: C=CC1CCC(C2CCC(CCCCC)CC2)CC1] | (2.4) | 20 |
| 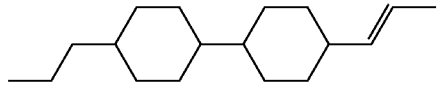 [SMILES: C/C=C/C1CCC(C2CCC(CCC)CC2)CC1] | (1.3) | 20 |
| 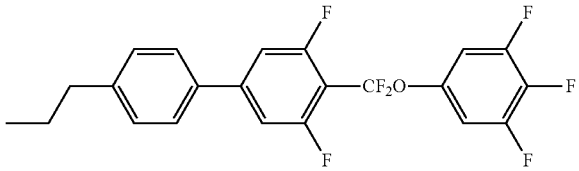 | (26.2) | 5 |
| 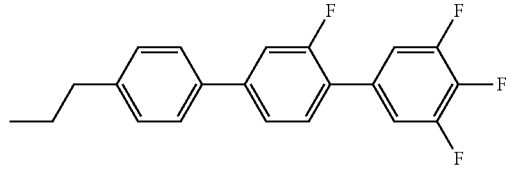 [SMILES: CCCc1ccc(-c2ccc(-c3cc(F)c(F)c(F)c3)c(F)c2)cc1] | (49.2) | 8 |
| 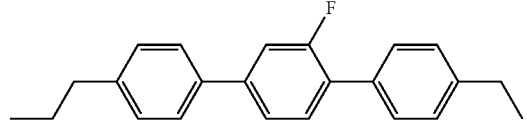 [SMILES: CCCc1ccc(-c2ccc(-c3ccc(CC)cc3)c(F)c2)cc1] | (18.2) | 5 |

-continued

| [Chem. 161] | | |
|---|---|---|
| Chemical Structure | Content | (%) |
| (structure: propyl-phenyl-(F)phenyl-ethyl-phenyl) | (18.5) | 5 |
| (structure: pentyl-phenyl-(F)phenyl-ethyl-phenyl) | (18.7) | 5 |
| (structure: propyl-cyclohexyl-cyclohexyl-(F)phenyl-(F,F,F)phenyl) | (i-1.10) | 7 |
| (structure: propyl-cyclohexyl-phenyl-phenyl-cyclohexyl-propyl) | (ii-2) | 5 |

TABLE 1

| Tni (° C.) | 89.5 |
|---|---|
| Δn | 0.1229 |
| Δε | 5.43 |
| Vth | 1.416 |

Example 2

A composition containing the following components was prepared. Table 2 shows the physical properties of the composition of Example 2.

| [Chem. 162] | | |
|---|---|---|
| Chemical Structure | Content | (%) |
| (propyl-cyclohexyl-cyclohexyl-vinyl) | (2.2) | 20 |
| (pentyl-cyclohexyl-cyclohexyl-vinyl) | (2.4) | 20 |
| (propyl-cyclohexyl-cyclohexyl-propenyl) | (1.3) | 20 |
| (propyl-phenyl-(F,F)phenyl-CF$_2$O-(F,F,F)phenyl) | (26.2) | 5 |
| (propyl-phenyl-(F)phenyl-(F,F,F)phenyl) | (49.2) | 8 |

-continued
| [Chem. 162] | | |
|---|---|---|
| Chemical Structure | Content | (%) |
| 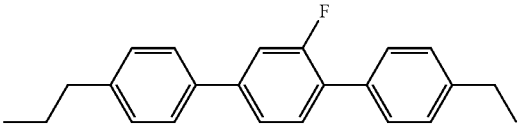 | (18.2) | 5 |
| 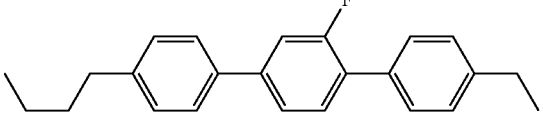 | (18.5) | 5 |
| 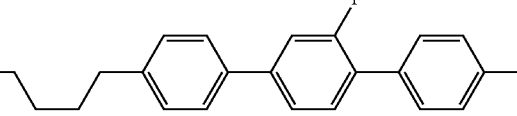 | (18.7) | 5 |
| 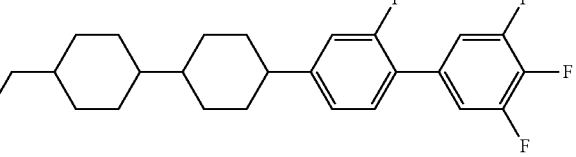 | (i-1.10) | 7 |
| 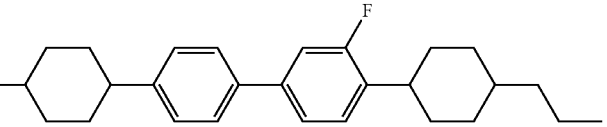 | (ii-10) | 5 |
TABLE 2
| Tni (° C.) | 88.7 |
|---|---|
| Δn | 0.1229 |
| Δε | 5.43 |
| Vth | 1.416 |
Example 3
A composition containing the following components was prepared. Table 3 shows the physical properties of the composition of Example 3.
| [Chem. 163] | | |
|---|---|---|
| Chemical Structure | Content | (%) |
| 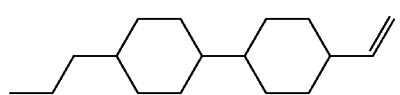 | (2.2) | 20 |
| 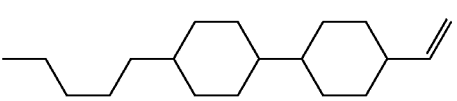 | (2.4) | 20 |
| 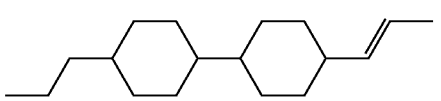 | (1.3) | 20 |

-continued

| Chemical Structure | Content | (%) |
|---|---|---|
| 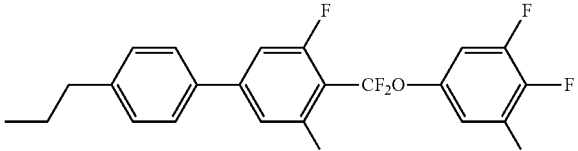 | (26.2) | 5 |
| 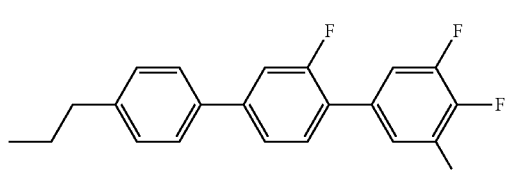 | (49.2) | 8 |
| 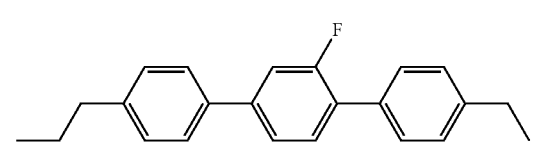 | (18.2) | 5 |
| 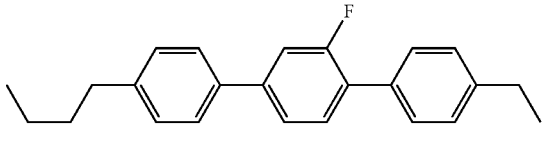 [SMILES: CCCCc1ccc(-c2ccc(-c3ccc(CC)cc3)c(F)c2)cc1] | (18.5) | 5 |
| 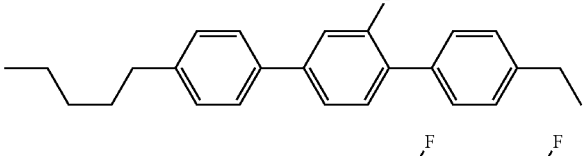 | (18.7) | 5 |
| 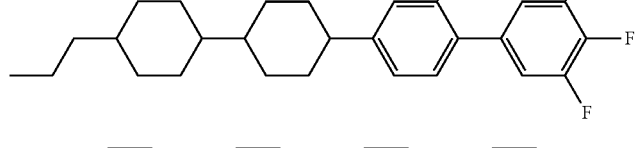 | (i-1.10) | 7 |
| 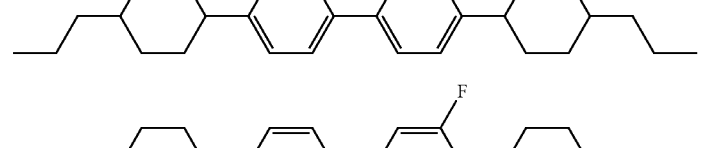 | (ii-2) | 2 |
|  | (ii-10) | 3 |

TABLE 3

| | |
|---|---|
| Tni (° C.) | 89.0 |
| Δn | 0.1229 |
| Δε | 5.43 |
| Vth | 1.416 |

The compositions of Examples 1 to 3 each involving use of the compound represented by General Formula (i) and the compound represented by General Formula (ii) had substantially the same physical properties as each other. The compositions of Examples 1 to 3 had good storage stability; among these, the composition of Example 3 particularly had excellent storage stability.

Comparative Example 1

A composition which did not contain a compound represented by General Formula (ii) but contained the following components was prepared. Table 4 shows the physical properties of the composition of Comparative Example 1.

[Chem. 164]

| Chemical Structure | | Content (%) |
|---|---|---|
| (structure) | (2.2) | 20 |
| (structure) | (2.4) | 20 |
| (structure) | (1.3) | 20 |
| (structure) | (26.2) | 5 |
| (structure) | (49.2) | 8 |
| (structure) | (18.2) | 5 |
| (structure) | (18.5) | 5 |
| (structure) | (18.7) | 5 |
| (structure) | (i-1.10) | 7 |
| (structure) | (5.2) | 5 |

TABLE 4

| | |
|---|---|
| Tni (° C.) | 73.9 |
| Δn | 0.1214 |
| Δε | 5.67 |
| Vth | 1.500 |

The composition of Comparative Example 1 not involving use of a compound represented by General Formula (ii) had a lower Tni than the compositions of Examples 1 to 3 each involving use of the compound represented by General Formula (ii).

Comparative Example 2

A composition which did not contain a compound represented by General Formula (ii) but contained the following components was prepared. Table 5 shows the physical properties of the composition of Comparative Example 2.

[Chem. 165]

| Chemical Structure | | Content | (%) |
|---|---|---|---|
| (structure) | (2.2) | 20 | |
| (structure) | (2.4) | 20 | |
| (structure) | (1.3) | 20 | |
| (structure) | (15.3) | 5 | |
| (structure) | (26.2) | 5 | |
| (structure) | (49.2) | 8 | |
| (structure) | (18.2) | 5 | |
| (structure) | (18.5) | 5 | |
| (structure) | (18.7) | 5 | |
| (structure) | (i-1.10) | 7 | |

TABLE 5

| | |
|---|---|
| Tni (° C.) | 83.3 |
| Δn | 0.1252 |

TABLE 5-continued

| | |
|---|---|
| Δε | 5.51 |
| Vth | 1.556 |

The composition of Comparative Example 2 not involving use of a compound represented by General Formula (ii) had a higher Vth than the compositions of Examples 1 to 3 each involving use of the compound represented by General Formula (ii).

Comparative Example 3

A composition which did not contain a compound represented by General Formula (ii) but contained the following components was prepared. Table 6 shows the physical properties of the composition of Comparative Example 3.

[Chem. 166]

| Chemical Structure | Content | (%) |
|---|---|---|
| 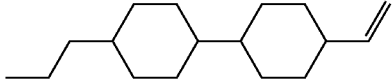 [SMILES: C=CC1CCC(C2CCC(CCC)CC2)CC1] | (2.2) | 21 |
| 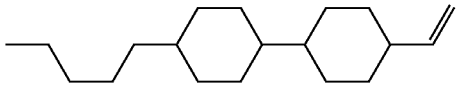 | (2.4) | 21 |
| 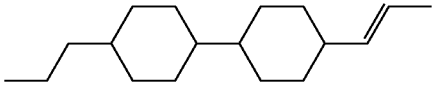 [SMILES: C/C=C/C1CCC(C2CCC(CCC)CC2)CC1] | (1.3) | 20 |
| 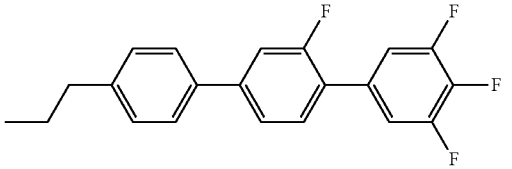 [SMILES: CCCc1ccc(-c2ccc(-c3cc(F)c(F)c(F)c3)c(F)c2)cc1] | (49.2) | 8 |
| 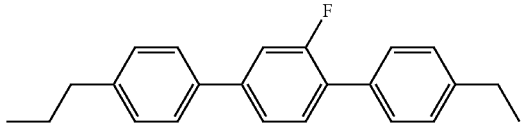 [SMILES: CCCc1ccc(-c2ccc(-c3ccc(CC)cc3)c(F)c2)cc1] | (18.2) | 6 |
| 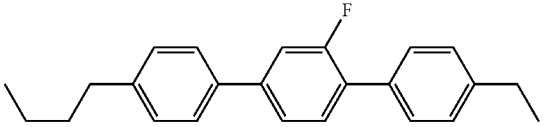 [SMILES: CCCCc1ccc(-c2ccc(-c3ccc(CC)cc3)c(F)c2)cc1] | (18.5) | 6 |
| 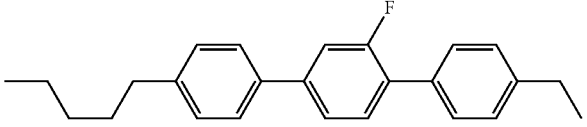 [SMILES: CCCCCc1ccc(-c2ccc(-c3ccc(CC)cc3)c(F)c2)cc1] | (18.7) | 6 |
| 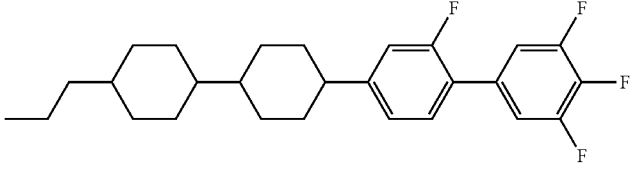 [SMILES: CCCC1CCC(C2CCC(c3ccc(-c4cc(F)c(F)c(F)c4)c(F)c3)CC2)CC1] | (i-1.10) | 12 |

TABLE 6

| | |
|---|---|
| Tni (° C.) | 93.3 |
| Δn | 0.1228 |
| Δε | 5.35 |
| Vth | 1.441 |

The composition of Comparative Example 3 not involving use of a compound represented by General Formula (ii) had a similar Δn to the compositions of Examples 1 to 3 each involving use of the compound represented by General Formula (ii) but had higher Vth than them; however, Vth was higher in Comparative Example 3 than in Examples 1 to 3.

Comparative Example 4

A composition which did not contain a compound represented by General Formula (i) but contained the following components was prepared. Table 5 shows the physical properties of the composition of Comparative Example 4.

[Chem. 167]

| Chemical Structure | | Content (%) |
|---|---|---|
| 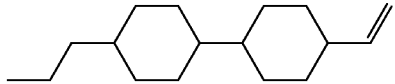 [SMILES: C=CC1CCC(C2CCC(CCC)CC2)CC1] | (2.2) | 20 |
| 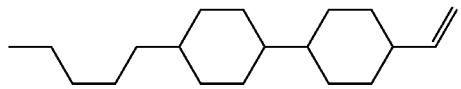 | (2.4) | 20 |
| 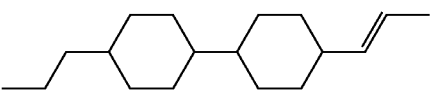 | (1.3) | 20 |
| 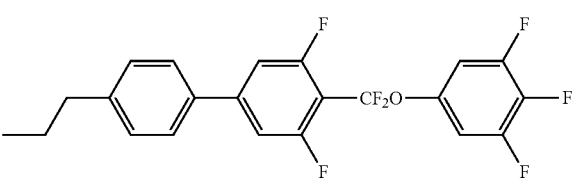 | (26.2) | 5 |
| 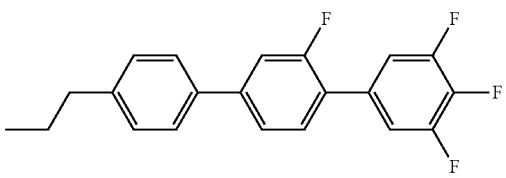 | (49.2) | 8 |
| 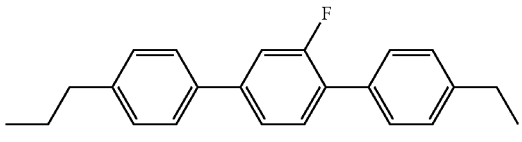 [SMILES: CCCc1ccc(-c2ccc(-c3ccc(CC)cc3)c(F)c2)cc1] | (18.2) | 5 |
| 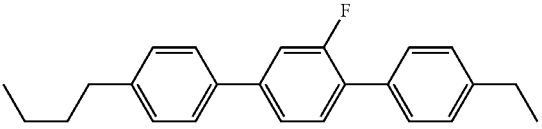 [SMILES: CCCCc1ccc(-c2ccc(-c3ccc(CC)cc3)c(F)c2)cc1] | (18.5) | 5 |
| 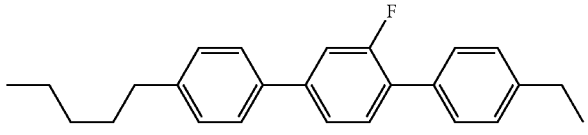 [SMILES: CCCCCc1ccc(-c2ccc(-c3ccc(CC)cc3)c(F)c2)cc1] | (18.7) | 5 |
| 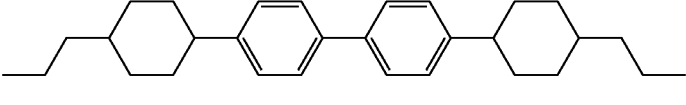 [SMILES: CCCC1CCC(c2ccc(-c3ccc(C4CCC(CCC)CC4)cc3)cc2)CC1] | (ii-2) | 5 |

-continued

[Chem. 167]

| Chemical Structure | | Content (%) |
|---|---|---|
| 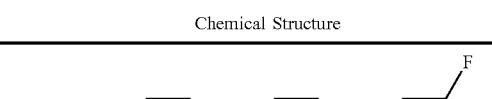 | (54.2) | 4 |
| 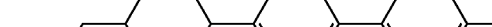 | (49.2) | 3 |

TABLE 7

| | |
|---|---|
| Tni (° C.) | 78.8 |
| Δn | 0.1253 |
| Δε | 5.44 |
| Vth | 1.416 |

The composition of Comparative Example 4 not involving use of a compound represented by General Formula (i) had a similar Δε to the compositions of Examples 1 to 3 each involving use of the compound represented by General Formula (ii); however, Tni was lower in Comparative Example 4 than in Examples 1 to 3.

Comparative Example 5

A composition which did not contain a compound represented by General Formula (i) but contained the following components was prepared. Table 5 shows the physical properties of the composition of Comparative Example 5.

[Chem. 168]

| Chemical Structure | | Content (%) |
|---|---|---|
| 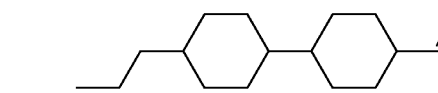 | (2.2) | 20 |
| 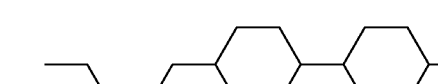 | (2.4) | 20 |
| 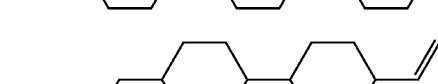 | (1.3) | 20 |
| 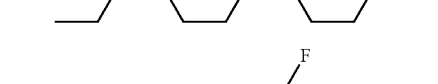 | (26.2) | 5 |
| 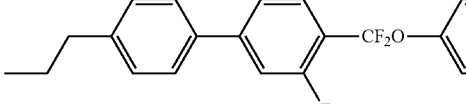 | (49.2) | 8 |
|  | (18.2) | 5 |

-continued

[Chem. 168]

| Chemical Structure | Content (%) | |
|---|---|---|
| 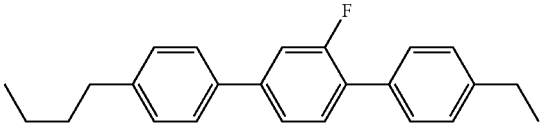 [SMILES: CCCCc1ccc(-c2ccc(-c3ccc(CC)cc3)c(F)c2)cc1] | (18.5) | 5 |
| 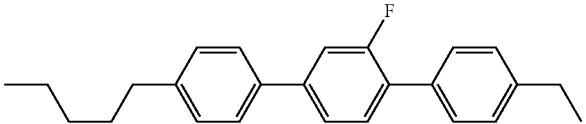 [SMILES: CCCCCc1ccc(-c2ccc(-c3ccc(CC)cc3)c(F)c2)cc1] | (18.7) | 5 |
| 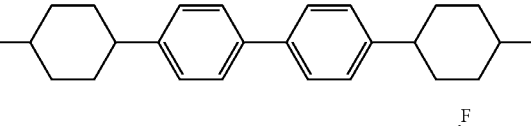 | (ii-2) | 5 |
| 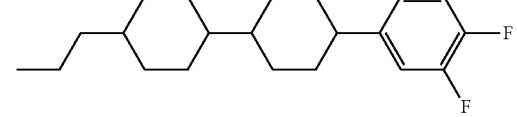 | (34.3) | 3 |
| 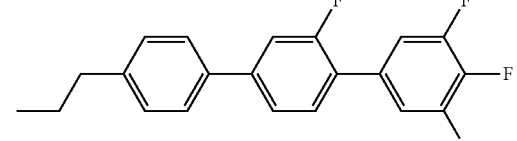 | (49.2) | 4 |

TABLE 8

| | |
|---|---|
| Tni (° C.) | 78.5 |
| Δn | 0.1231 |
| Δε | 5.47 |
| Vth | 1.416 |

The composition of Comparative Example 5 not involving use of a compound represented by General Formula (i) had a similar Δε to the compositions of Examples 1 to 3 each involving use of the compound represented by General Formula (i); however, Tni was lower in Comparative Example 5 than in Examples 1 to 3.

Comparative Example 6

A composition which did not contain a compound represented by General Formula (i) but contained the following components was prepared. Table 6 shows the physical properties of the composition of Comparative Example 6.

[Chem. 169]

| Chemical Structure | Content (%) | |
|---|---|---|
| 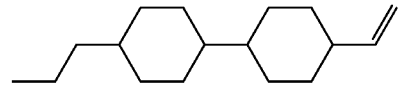 | (2.2) | 20 |
| 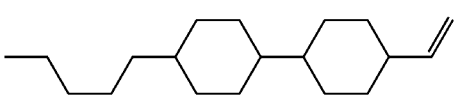 [SMILES: C=CC1CCC(C2CCC(CCCCC)CC2)CC1] | (2.4) | 20 |
| 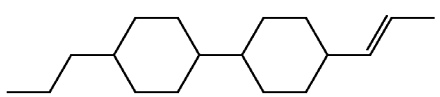 [SMILES: C/C=C/C1CCC(C2CCC(CCC)CC2)CC1] | (1.3) | 20 |

-continued

[Chem. 169]

| Chemical Structure | Content (%) | |
|---|---|---|
| 3-ring compound with CF₂O linkage, tetrafluoro | (26.2) | 5 |
| propyl terphenyl trifluoro | (49.2) | 8 |
| propyl terphenyl monofluoro ethyl | (18.2) | 5 |
| butyl terphenyl monofluoro ethyl | (18.5) | 5 |
| propyl terphenyl monofluoro propyl | (18.7) | 5 |
| bicyclohexyl-biphenyl dipropyl | (ii-2) | 5 |
| cyclohexyl-biphenyl trifluoro propyl | (56.1) | 3 |
| propyl terphenyl trifluoro (difluoro) | (49.2) | 4 |

TABLE 9

| | |
|---|---|
| Tni (° C.) | 77.2 |
| Δn | 0.1246 |
| Δε | 5.50 |
| Vth | 1.416 |

The composition of Comparative Example 6 not involving use of a compound represented by General Formula (i) had a similar Δε to the compositions of Examples 1 to 3 each involving use of the compound represented by General Formula (i); however, Tni was lower in Comparative Example 6 than in Examples 1 to 3.

Example 4

A composition containing the following components was prepared. Table 7 shows the physical properties of the composition of Example 4.

[Chem. 170]
| Chemical Structure | Content | (%) |
|---|---|---|
| 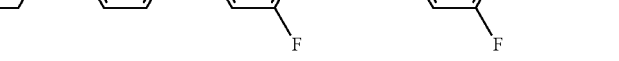 | (26.2) | 5 |
| 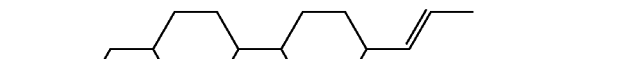 | (1.3) | 10 |
| 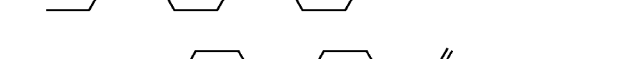 | (2.2) | 30 |
| 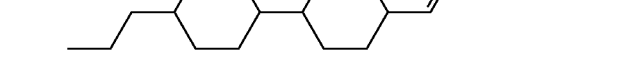 | (18.2) | 4 |
| 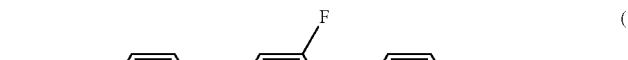 | (i-1.10) | 5 |
| 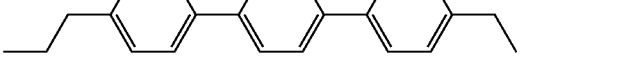 | (18.7) | 7 |
|  | (39.2) | 6 |
| 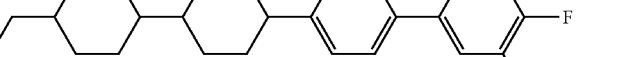 | (49.2) | 10 |
|  | (15.3) | 7 |
| 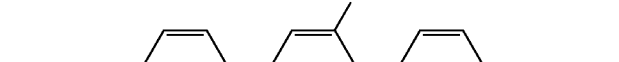 | (49.1) | 10 |

-continued
| [Chem. 170] | |
|---|---|
| Chemical Structure | Content (%) |
| 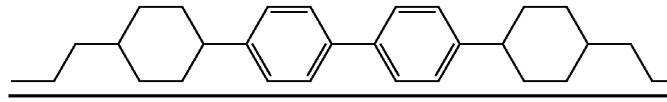 | (ii-2) 5 |
TABLE 10
| | |
|---|---|
| Tni (° C.) | 88.2 |
| Δn | 0.139 |
| Δε | 7.2 |
| η (mPa · s) | 18.2 |
| γ1 (mPa · s) | 76 |
Example 5
A composition containing the following components was prepared. Table 8 shows the physical properties of the composition of Example 5.
| [Chem. 171] | |
|---|---|
| Chemical Structure | Content (%) |
| 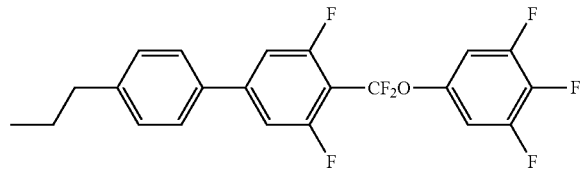 | (26.2) 5 |
| 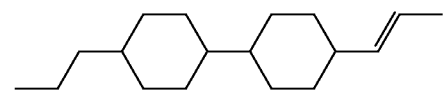 [SMILES: C/C=C/C1CCC(C2CCC(CCC)CC2)CC1] | (1.3) 18 |
| 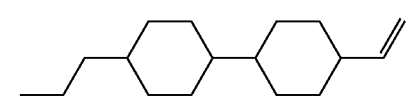 [SMILES: C=CC1CCC(C2CCC(CCC)CC2)CC1] | (2.2) 40 |
| 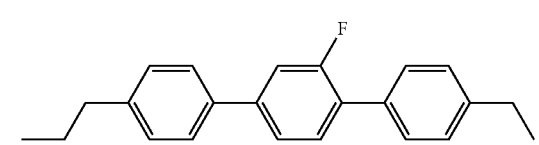 | (18.2) 4 |
| 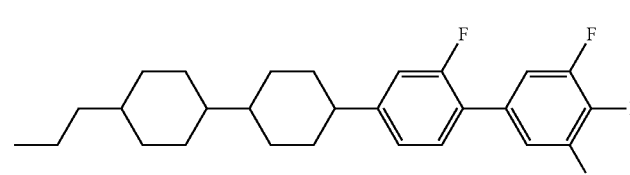 | (i-1.10) 3 |
| 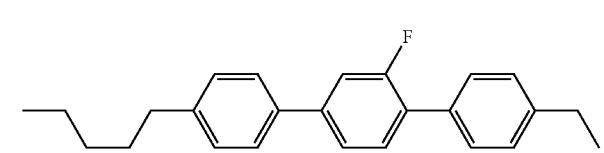 | (18.7) 5 |
| 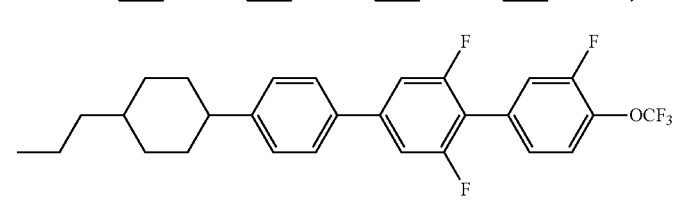 | (39.2) 5 |

-continued
| [Chem. 171] | | |
|---|---|---|
| Chemical Structure | Content | (%) |
| 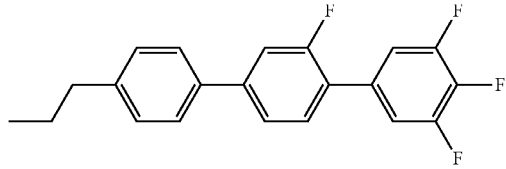 | (49.2) | 3 |
| 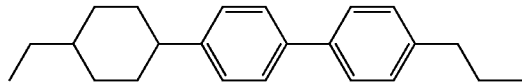 [SMILES: CCCc1ccc(-c2ccc(C3CCC(CC)CC3)cc2)cc1] | (15.3) | 7 |
| 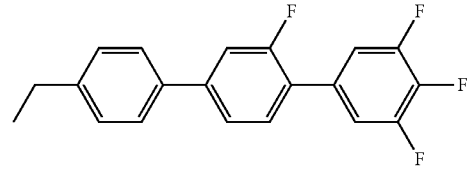 [SMILES: CCc1ccc(-c2ccc(-c3cc(F)c(F)c(F)c3)c(F)c2)cc1] | (49.1) | 3 |
| 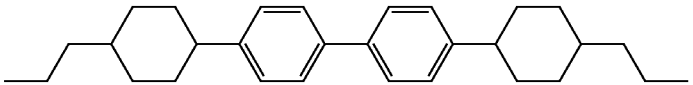 [SMILES: CCCC1CCC(c2ccc(-c3ccc(C4CCC(CCC)CC4)cc3)cc2)CC1] | (ii-2) | 7 |
TABLE 11
| | |
|---|---|
| Tni (° C.) | 98.6 |
| Δn | 0.122 |
| Δε | 3.65 |
| η (mPa · s) | 12.0 |
| γ1 (mPa · s) | 48 |
Example 6
A composition containing the following components was prepared. Table 9 shows the physical properties of the composition of Example 6.
| [Chem. 172] | | |
|---|---|---|
| Chemical Structure | Content | (%) |
| 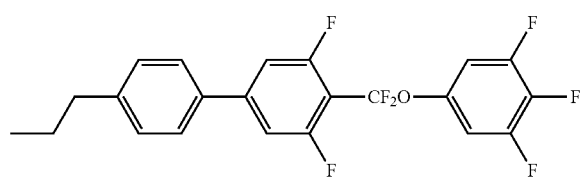 | (26.2) | 8 |
| 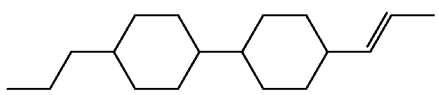 [SMILES: C/C=C/C1CCC(C2CCC(CCC)CC2)CC1] | (1.3) | 10 |
| 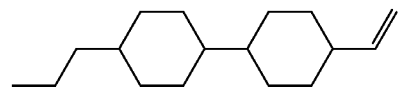 | (2.2) | 30 |
| 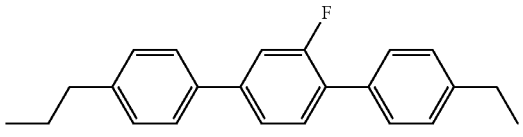 | (18.2) | 4 |

-continued

[Chem. 172]

| Chemical Structure | | Content (%) |
|---|---|---|
| (propyl-Cy-Cy-Ph(2-F)-Ph(3,4,5-F)) | (i-1.10) | 8 |
| (pentyl-Ph-Ph(2-F)-Ph-ethyl) | (18.7) | 7 |
| (propyl-Cy-Ph-Ph(2,3-F,6-F)-Ph(3-F)-OCF₃) | (39.2) | 6 |
| (propyl-Ph-Ph(2-F)-Ph(3,4,5-F)) | (49.2) | 10 |
| (ethyl-Cy-Ph-Ph-propyl) | (15.3) | 5 |
| (ethyl-Ph-Ph(2-F)-Ph(3,4,5-F)) | (49.1) | 10 |
| (ethyl-Cy-Ph-Ph-Cy-ethyl) | (ii-2) | 2 |

TABLE 12

| | |
|---|---|
| Tni (° C.) | 80.6 |
| Δn | 0.136 |
| Δε | 8.92 |
| η (mPa · s) | 19.5 |
| γ1 (mPa · s) | 73 |

Example 7

A composition containing the following components was prepared. Table 10 shows the physical properties of the composition of Example 7.

[Chem. 173]
| Chemical Structure | Content (%) |
|---|---|
| 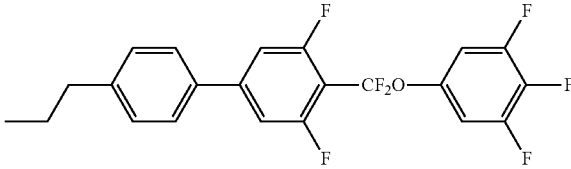 | (26.2) 8 |
| 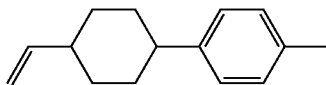 | (6.7) 10 |
| 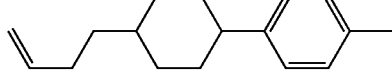 | (6.9) 9 |
| 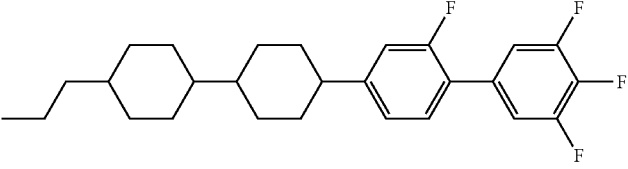 [SMILES: CCCC1CCC(C2CCC(c3ccc(-c4cc(F)c(F)c(F)c4)c(F)c3)CC2)CC1] | (i-1.10) 8 |
| 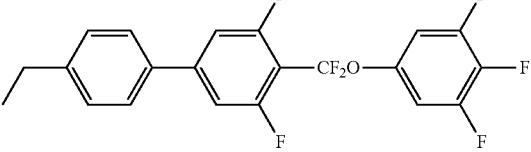 | (26.1) 5 |
| 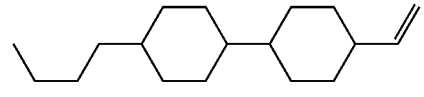 [SMILES: C=CC1CCC(C2CCC(CCCC)CC2)CC1] | (2.3) 15 |
| 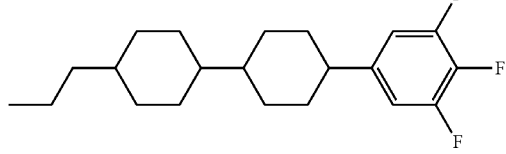 | (34.3) 10 |
| 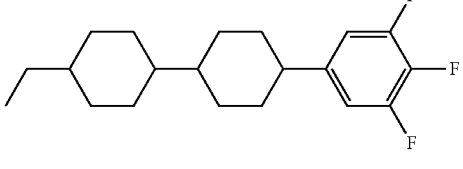 | (34.2) 10 |
| 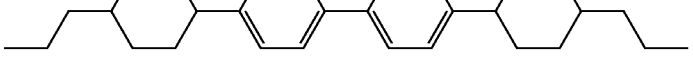 | (ii-2) 5 |
| 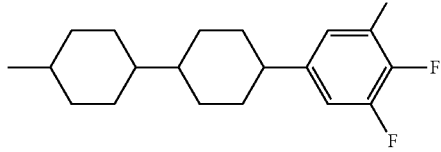 | (34.1) 10 |

-continued
[Chem. 173]
| Chemical Structure | | Content (%) |
|---|---|---|
| 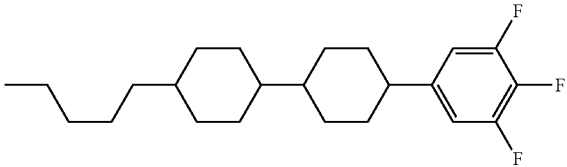 [SMILES: CCCCCC1CCC(C2CCC(c3cc(F)c(F)c(F)c3)CC2)CC1] | (34.5) | 10 |
| 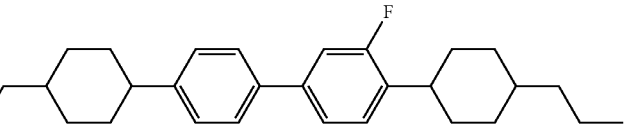 | (ii-10) | 5 |
TABLE 13
| | |
|---|---|
| Tni (° C.) | 102.1 |
| Δn | 0.099 |
| Δε | 8.05 |
| η (mPa · s) | 25.1 |
| γ1 (mPa · s) | 100 |
Example 8
A composition containing the following components was prepared. Table 11 shows the physical properties of the composition of Example 8.
[Chem. 174]
| Chemical Structure | | Content (%) |
|---|---|---|
| 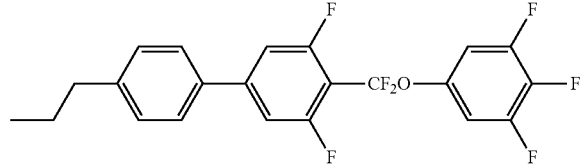 | (26.2) | 10 |
| 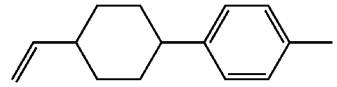 | (6.7) | 10 |
| 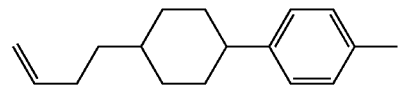 [SMILES: C=CCCC1CCC(c2ccc(C)cc2)CC1] | (6.9) | 10 |
| 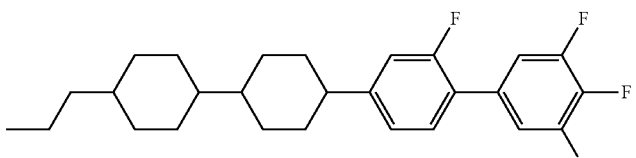 | (i-1.10) | 3 |
| 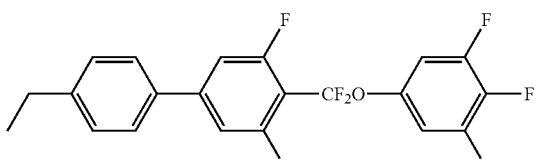 | (26.1) | 5 |
| 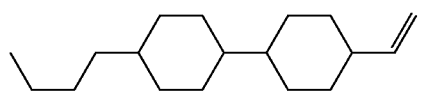 [SMILES: C=CC1CCC(C2CCC(CCCC)CC2)CC1] | (2.3) | 15 |

-continued

[Chem. 174]

| Chemical Structure | Content (%) | |
|---|---|---|
| propyl-Cy-Cy-Ph(3,4,5-F₃) | (34.3) | 10 |
| ethyl-Cy-Cy-Cy-Ph(3,4,5-F₃) | (34.2) | 10 |
| propyl-Cy-Ph-Ph-Cy-propyl | (ii-2) | 5 |
| methyl-Cy-Cy-Ph(3,4,5-F₃) | (34.1) | 10 |
| pentyl-Cy-Cy-Ph(3,4,5-F₃) | (34.5) | 5 |
| propyl-Cy-Ph-Ph(2-F)-Cy-ethyl | (ii-10) | 7 |

TABLE 14

| | |
|---|---|
| Tni (° C.) | 97.5 |
| Δn | 0.099 |
| Δε | 7.56 |
| η (mPa · s) | 24.8 |
| γ1 (mPa · s) | 94 |

Example 9

A composition containing the following components was prepared. Table 12 shows the physical properties of the composition of Example 9.

| [Chem. 175] | | |
|---|---|---|
| Chemical Structure | Content | (%) |
| 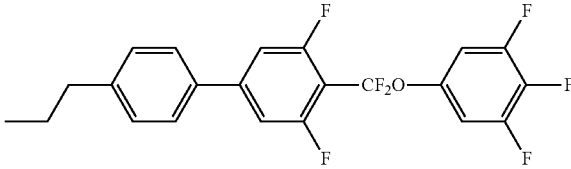 | (26.2) | 5 |
| 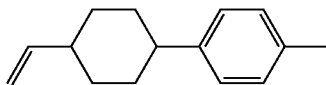 | (6.7) | 10 |
| 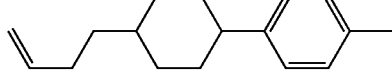 | (6.9) | 9 |
| 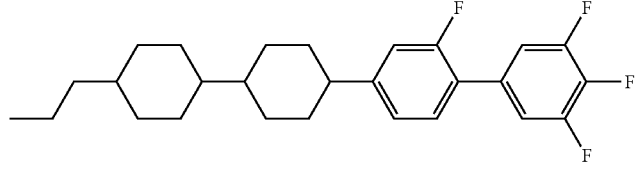 [SMILES: CCCC1CCC(C2CCC(c3ccc(-c4cc(F)c(F)c(F)c4)c(F)c3)CC2)CC1] | (i-1.10) | 10 |
| 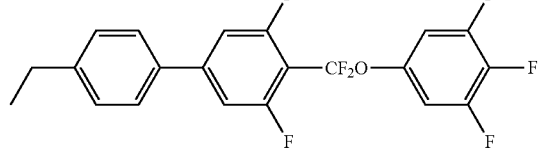 | (26.1) | 5 |
| 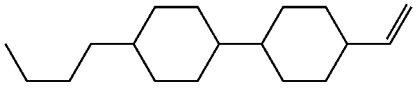 [SMILES: C=CC1CCC(C2CCC(CCCC)CC2)CC1] | (2.3) | 15 |
| 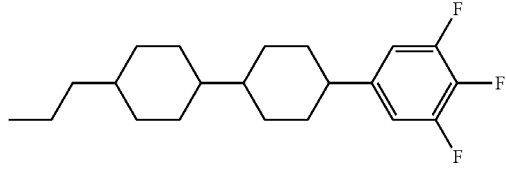 [SMILES: CCCC1CCC(C2CCC(c3cc(F)c(F)c(F)c3)CC2)CC1] | (34.3) | 8 |
| 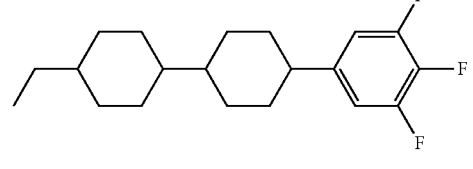 | (34.2) | 8 |
| 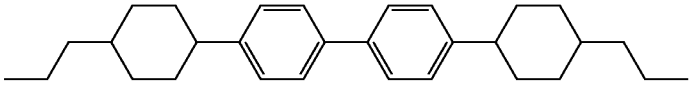 [SMILES: CCCC1CCC(c2ccc(-c3ccc(C4CCC(CCC)CC4)cc3)cc2)CC1] | (ii-2) | 5 |
| 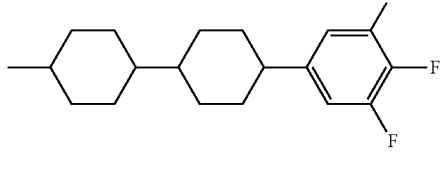 | (34.1) | 10 |

-continued

[Chem. 175]

| Chemical Structure | Content (%) | |
|---|---|---|
| (structure: propyl-Cy-Cy-Ph with 3,4,5-triF) | (34.5) | 5 |
| (structure: propyl-Cy-Ph-Ph(F)-Cy-propyl) | (ii-10) | 5 |
| (structure: ethyl-Ph-Ph(F)-Ph with 3,4,5-triF) | (49.1) | 5 |

TABLE 15

| | |
|---|---|
| Tni (° C.) | 104.6 |
| Δn | 0.101 |
| Δε | 7.79 |
| η (mPa · s) | 24.1 |
| γ1 (mPa · s) | 114 |

Example 10

A composition containing the following components was prepared. Table 13 shows the physical properties of the composition of Example 10.

[Chem. 176]

| Chemical Structure | Content (%) | |
|---|---|---|
| (structure: propyl-Ph-Ph(2,6-diF)-CF$_2$O-Ph(3,5-diF)-4-F) | (26.2) | 5 |
| (structure: propyl-Cy-Cy-CH=CH-CH$_3$) | (1.3) | 10 |
| (structure: propyl-Cy-Cy-CH=CH$_2$) | (2.2) | 40 |
| (structure: propyl-Ph-Ph(F)-Ph-ethyl) | (18.2) | 4 |

-continued
| [Chem. 176] | |
|---|---|
| Chemical Structure | Content (%) |
| 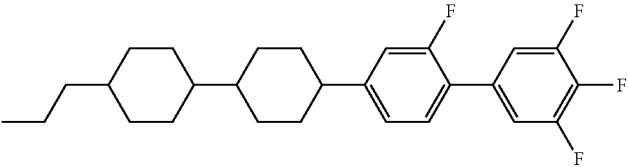 [SMILES: CCCC1CCC(C2CCC(c3ccc(-c4cc(F)c(F)c(F)c4)c(F)c3)CC2)CC1] | (i-1.10) 3 |
| 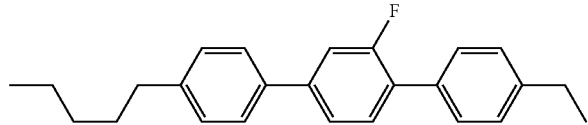 [SMILES: CCCCCc1ccc(-c2ccc(-c3ccc(CC)cc3)c(F)c2)cc1] | (18.7) 6 |
| 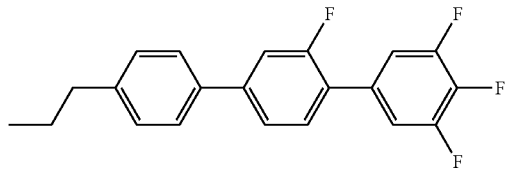 [SMILES: CCCc1ccc(-c2ccc(-c3cc(F)c(F)c(F)c3)c(F)c2)cc1] | (49.2) 10 |
| 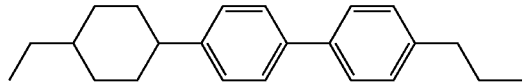 [SMILES: CCCc1ccc(-c2ccc(C3CCC(CC)CC3)cc2)cc1] | (15.3) 7 |
| 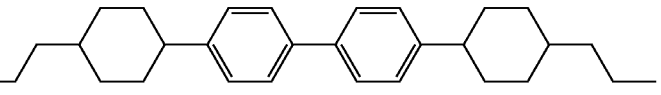 | (ii-2) 5 |
| 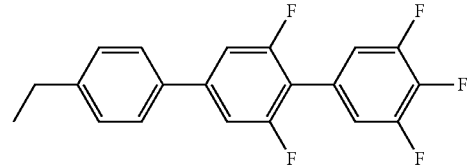 | (50.1) 10 |
TABLE 16
| | |
|---|---|
| Tni (° C.) | 71.6 |
| Δn | 0.12 |
| Δε | 5.14 |
| η (mPa·s) | 12.4 |
| γ1 (mPa·s) | 45 |
Example 11
A composition containing the following components was prepared. Table 14 shows the physical properties of the composition of Example 11.
| [Chem. 177] | |
|---|---|
| Chemical Structure | Content (%) |
| 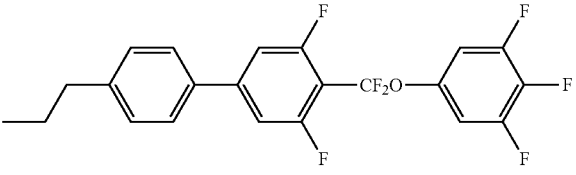 | (26.2) 10 |
| 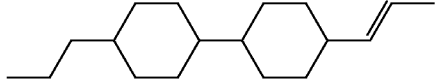 [SMILES: C/C=C/C1CCC(C2CCC(CCC)CC2)CC1] | (1.3) 10 |

-continued
[Chem. 177]
| Chemical Structure | | Content (%) |
|---|---|---|
| 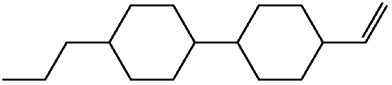 [SMILES: C=CC1CCC(C2CCC(CCC)CC2)CC1] | (2.2) | 46 |
| 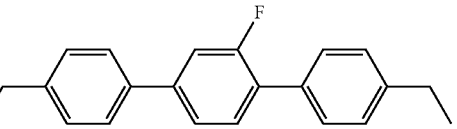 | (18.2) | 4 |
| 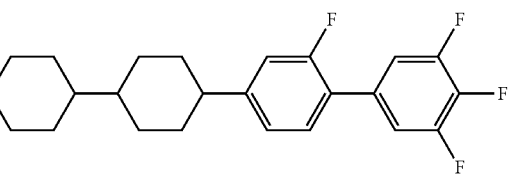 | (i-1.10) | 2 |
| 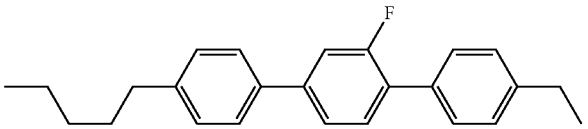 [SMILES: CCCCCc1ccc(-c2ccc(-c3ccc(CC)cc3)c(F)c2)cc1] | (18.7) | 6 |
| 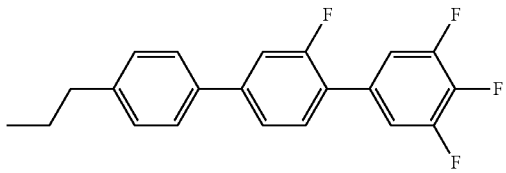 | (49.2) | 5 |
| 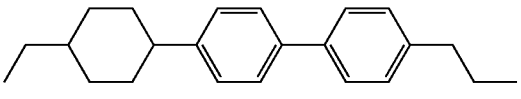 [SMILES: CCCc1ccc(-c2ccc(C3CCC(CC)CC3)cc2)cc1] | (15.3) | 7 |
| 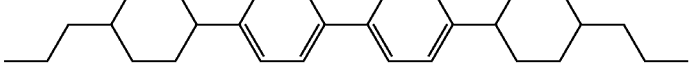 | (ii-2) | 5 |
| 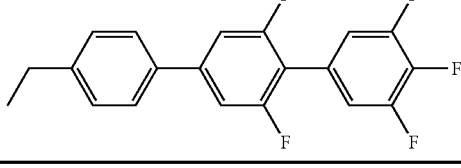 | (50.1) | 5 |
TABLE 17
| | |
|---|---|
| Tni (° C.) | 78.1 |
| Δn | 0.114 |
| Δε | 3.91 |
| η (mPa · s) | 12 |
| γ1 (mPa · s) | 28.8 |
Example 12
A composition containing the following components was prepared. Table 15 shows the physical properties of the composition of Example 12.

[Chem. 178]
| Chemical Structure | | Content (%) |
|---|---|---|
| 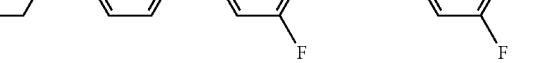 | (26.2) | 5 |
| 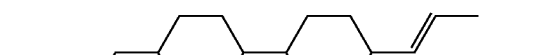 | (1.3) | 10 |
|  | (2.2) | 36 |
| 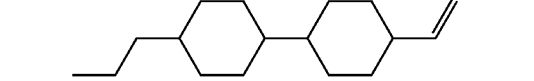 | (18.2) | 4 |
|  | (i-1.10) | 7 |
| 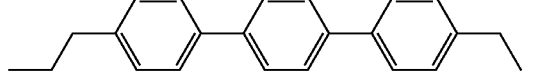 | (18.7) | 6 |
|  | (49.2) | 10 |
| 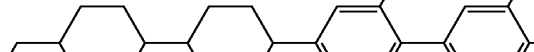 | (15.3) | 7 |
| 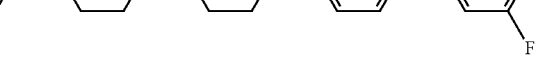 | (ii-2) | 5 |
|  | (50.1) | 10 |
TABLE 18
| | |
|---|---|
| Tni (° C.) | 78.4 |
| Δn | 0.124 |
| Δε | 5.85 |
| η (mPa · s) | 14.4 |
| γ1 (mPa · s) | 53 |

161

Examples of Liquid Crystal Display Apparatus

The liquid crystal compositions of Examples 1 to 3 were used to produce IPS liquid crystal display apparatuses having the structures illustrated in FIGS. 1 and 2. These liquid crystal display apparatuses had excellent display properties (see Table 16), and the display properties were stably maintained for a long time.

TABLE 19

|  | Example 1 | Example 2 | Example 3 |
|---|---|---|---|
| Initial voltage holding ratio/% | 99.0 | 98.8 | 98.9 |
| Voltage holding ratio after one hour at 150° C./% | 98.2 | 98.1 | 98.0 |
| Evaluation of screen burn-in | Excellent | Excellent | Excellent |
| Evaluation of droplet stains | Excellent | Excellent | Excellent |
| Evaluation of process adaptability | Excellent | Excellent | Excellent |
| Solubility at low temperature | Excellent | Excellent | Excellent |

INDUSTRIAL APPLICABILITY

A composition having a positive $\Delta\epsilon$ as a physical property inherent in liquid crystal compositions as well as stability to heat and light can be provided.

REFERENCE SIGNS LIST

100 First substrate
102 TFT layer
103 Pixel electrode
104 Passivation film
105 First alignment film
200 Second substrate
201 Planarization film (overcoat layer)
202 Black matrix
203 Color filter
204 Transparent electrode
205 Second alignment film
301 Sealing material
302 Protrusion (columnar spacer)
303 Liquid crystal layer
304 Protrusion (columnar spacer)
401 Mask pattern
402 Resin layer

The invention claimed is:

1. A composition used in a liquid crystal display device, the composition consisting of:
a compound represented by General Formula (i);
a compound represented by General Formula (ii);
a compound represented by General Formula (VIII-1);
a compound represented by General Formula (I-1-1);
a compound represented by General Formula (I-1-2),
a compound represented by General Formula (L);
a compound represented by General Formula (M);
optionally a compound represented by General Formula (Q); and
optionally a polymerizable compound;

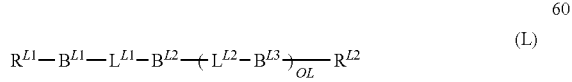
(L)

wherein the total amount of the compound represented by General Formula (I-1-1) and the compound represented by General Formula (I-1-2) is at least 31 mass %

162 relative to the total amount of the composition, and the amount of the compound represented by General Formula (VIII-1) is in the range of 2 mass % to 8 mass % relative to the total amount of the composition,

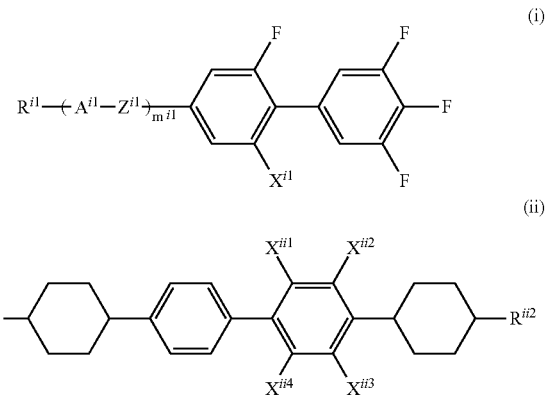

where $R^{i1}$, $R^{ii1}$, and $R^{ii2}$ each independently represent an alkyl group having 1 to 8 carbon atoms; in the alkyl group, one —$CH_2$— group or two or more —$CH_2$— groups not adjoining each other are each independently optionally substituted with —CH=CH—, —C≡C—, —O—, —CO—, —COO—, or —OCO—; $m^{i1}$ represents 2; $A^{i1}$ represents a 1,4-cyclohexylene group; $Z^{i1}$ represents a single bond; and $X^{i1}$ and $X^{ii1}$ to $X^{ii4}$ each independently represent a hydrogen atom or a fluorine atom,

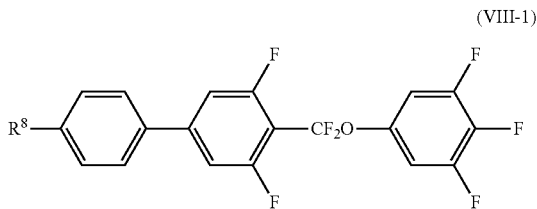
(VIII-1)

where $R^8$ represents an alkyl group having 1 to 5 carbon atoms, an alkenyl group having 2 to 5 carbon atoms, or an alkoxy group having 1 to 4 carbon atoms,

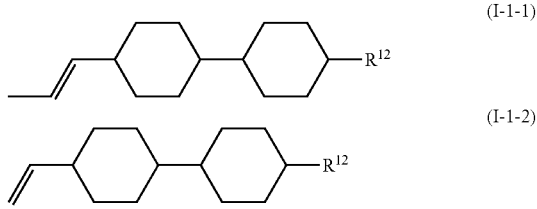
(I-1-1)

(I-1-2)

where $R^{12}$'s each independently represent an alkyl group having 1 to 5 carbon atoms
where $R^{L1}$ and $R^{L2}$ each independently represent a linear alkyl group having 1 to 8 carbon atoms, and one —$CH_2$— group or two or more —$CH_2$— groups not adjoining each other in the alkyl group are each independently optionally substituted with —CH=CH—, —C≡C—, —O—, —CO—, —COO—, or —OCO—;

OL represents 0, 1, 2, or 3; $B^{L1}$, $B^{L2}$, and $B^{L3}$ each independently represent a group selected from the group consisting of (a) a 1,4-cyclohexylene group in which one —$CH_2$— group or two or more —$CH_2$— groups not adjoining each other are optionally substituted with —O—, and (b) a 1,4-phenylene group in which one —CH═ group or two or more —CH═ groups not adjoining each other are optionally substituted with —N═, and the groups (a) and (b) are each independently optionally substituted with a cyano group, or a fluorine atom; $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH═N— N═CH—, —CH═CH—, or —C≡C—; in the case where OL is 2 or 3 and where $L^{L2}$ is multiple, the multiple $L^{L2}$'s are the same as or different from each other; in the case where OL is 2 or 3 and where $B^{L3}$ is multiple, the multiple $B^{L3}$'s are the same as or different from each other; wherein the compound represented by General Formula (L) excludes the compound represented by General Formula (ii), the compound represented by General Formula (I-1-1), and the compound represented by General Formula (I-1-2),

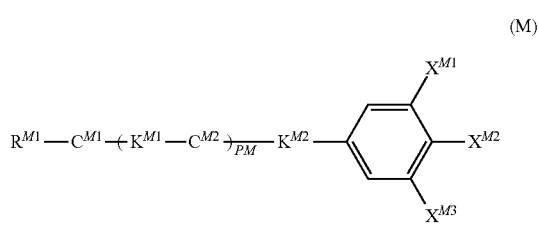

(M)

where $R^{M1}$ represents an alkyl group having 1 to 8 carbon atoms, and one —$CH_2$— group or two or more —$CH_2$— groups not adjoining each other in the alkyl group are each independently optionally substituted with —CH═CH—, —C≡C—, —O—, —CO—, —COO—, or —OCO—; PM represents 0, 1, or 2; $C^{M1}$ and $C^{M2}$ each independently represent a group selected from the group consisting of (d) a 1,4-cyclohexylene group in which one —$CH_2$— group or two or more —$CH_2$— groups not adjoining each other are optionally substituted with —O— or —S—, and (e) a 1,4-phenylene group in which one —CH═ group or two or more —CH═ groups not adjoining each other are optionally substituted with —N═, and the groups (d) and (e) are each independently optionally substituted with a cyano group, or a fluorine atom; $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—; in the case where PM is 2 and where $K^{M1}$ is multiple, the multiple $K^{M1}$'s are the same as or different from each other; in the case where PM is 2 and where $C^{M2}$ is multiple, the multiple $C^{M2}$'s are the same as or different from each other; $X^{M1}$ and $X^{M3}$ each independently represent a hydrogen atom, or a fluorine atom; $X^{M2}$ represents a hydrogen atom, a fluorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by General Formula (i) and the compound represented by General Formula (VIII-1),

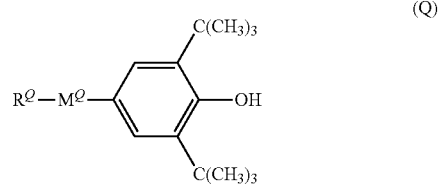

(Q)

where $R^Q$ represents a linear or branched alkyl group having 1 to 22 carbon atoms; at least one $CH_2$ group in the alkyl group is optionally substituted with —O—, —CH═CH—, —CO—, —OCO—, —COO—, —C≡C—, —$CF_2O$—, or —$OCF_2$— such that oxygen atoms do not directly adjoin each other; and $M^Q$ represents a trans-1,4-cyclohexylene group, a 1,4-phenylene group, or a single bond.

2. The composition used in a liquid crystal display device according to claim 1, wherein in the compound represented by General Formula (ii), $X^{ii2}$ is a fluorine atom; and $X^{ii1}$, $X^{ii3}$, and $X^{ii4}$ are hydrogen atoms.

3. The composition used in a liquid crystal display device according to claim 1, wherein the compound represented by General Formula (M) is a compound represented by General Formula (XIII-3)

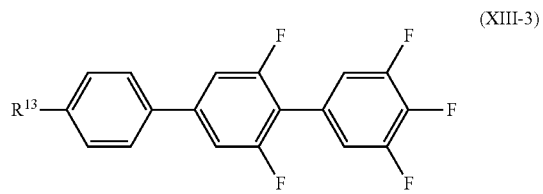

(XIII-3)

where $R^{13}$ represents an alkyl group having 1 to 5 carbon atoms, an alkenyl group having 2 to 5 carbon atoms, or an alkoxy group having 1 to 4 carbon atoms.

4. The composition used in a liquid crystal display device according to claim 1, wherein the compound represented by General Formula (M) comprises at least two compounds represented by General Formula (IX-2-5)

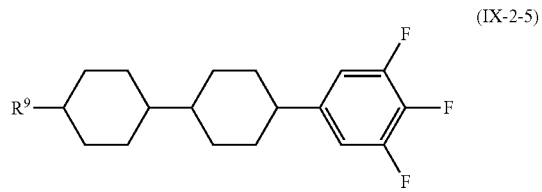

(IX-2-5)

where $R^9$ represents an alkyl group having 1 to 5 carbon atoms, an alkenyl group having 2 to 5 carbon atoms, or an alkoxy group having 1 to 4 carbon atoms.

5. The composition used in a liquid crystal display device according to claim 1, wherein the compound represented by General Formula (L) comprises at least three compounds represented by General Formula (IV-1)

(IV-1)

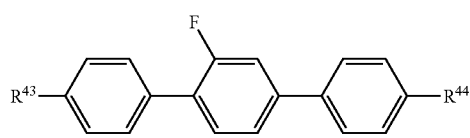

where $R^{43}$ and $R^{44}$ each independently represent an alkyl group having 1 to 5 carbon atoms.

6. The composition used in a liquid crystal display device according to claim 1, wherein at least three compounds represented by General Formula (I-1-2) are used (I-1-2)

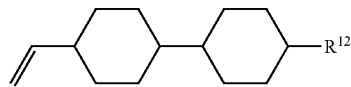

where $R^{12}$ each independently represent an alkyl group having 1 to 5 carbon atoms.

7. The composition used in a liquid crystal display device according to claim 1, wherein at least one of $X^{ii1}$ to $X^{ii4}$ is a fluorine atom.

8. A liquid crystal display device comprising the composition used in a liquid crystal display device according to claim 1.

9. An IPS device comprising the composition used in a liquid crystal display device according to claim 1.

10. An FFS device comprising the composition used in a liquid crystal display device according to claim 1.

* * * * *